(12) United States Patent
Hastings

(10) Patent No.: US 8,388,038 B2
(45) Date of Patent: Mar. 5, 2013

(54) MULTIPLE USE VEHICLE ACCESSORY

(76) Inventor: Daniel K. Hastings, Travelers Rest, SC (US)

( * ) Notice: Subject to any disclaimer, the term of this patent is extended or adjusted under 35 U.S.C. 154(b) by 137 days.

(21) Appl. No.: 12/587,837

(22) Filed: Oct. 14, 2009

(65) Prior Publication Data

US 2010/0032932 A1 Feb. 11, 2010

Related U.S. Application Data

(63) Continuation-in-part of application No. 12/313,974, filed on Nov. 26, 2008, now Pat. No. 8,033,586, which is a continuation-in-part of application No. 11/893,782, filed on Aug. 17, 2007, now abandoned, and a continuation-in-part of application No.

(Continued)

(51) Int. Cl.
  *B62D 39/00* (2006.01)
(52) U.S. Cl. ........... 296/1.07; 296/3; 296/95.1; 14/69.5; 414/462
(58) Field of Classification Search .................. 296/95.1, 296/193.1, 3, 1.07; 280/79.3, 79.4; 293/115, 293/117; 414/462; 14/69.5, 71.1
  See application file for complete search history.

(56) References Cited

U.S. PATENT DOCUMENTS

| | | |
|---|---|---|
| 2,350,129 A | 5/1944 | Richards |
| 2,699,964 A | 1/1955 | Hartung |
| 4,009,762 A | 3/1977 | Bjerkgard |
| D248,229 S | 6/1978 | Baker |
| 4,099,760 A | 7/1978 | Mascotte et al. |
| 4,852,690 A | 8/1989 | Salmi |
| 4,950,010 A | 8/1990 | Denny |
| 5,104,015 A | 4/1992 | Johnson |
| 5,224,636 A | 7/1993 | Bounds |
| 5,277,465 A | 1/1994 | Weir |
| 5,326,142 A | 7/1994 | Dodds et al. |
| 5,364,142 A | 11/1994 | Coiner |
| 5,636,885 A | 6/1997 | Hummel |
| 5,683,128 A | 11/1997 | Heyns |
| 5,836,398 A | 11/1998 | White |
| D410,879 S | 6/1999 | Orth, Sr. |
| 5,941,329 A | 8/1999 | Ichioka et al. |
| 6,039,228 A | 3/2000 | Stein et al. |
| 6,152,504 A | 11/2000 | Dickson et al. |
| 6,158,798 A | 12/2000 | Stedtfeld et al. |
| 6,231,093 B1 | 5/2001 | Storer |
| 6,290,271 B1 | 9/2001 | Geisler |
| 6,318,773 B2 | 11/2001 | Storer |
| 6,357,707 B1 | 3/2002 | Lindsay |
| 6,398,276 B1 | 6/2002 | Smith |

(Continued)

OTHER PUBLICATIONS

International Searching Authority; PCT International Search Report and Written Opinion; mailed Jan. 25, 2008; (6 pages).

(Continued)

*Primary Examiner* — Glenn Dayoan
*Assistant Examiner* — Melissa A Black
(74) *Attorney, Agent, or Firm* — Metz Lewis Brodman Must O'Keefe

(57) ABSTRACT

A multiple use vehicle accessory is provided that has a frame with first and second side members spaced from one another in a lateral direction of the accessory. The first side member carries first and second apertures that are spaced from one another in a longitudinal direction of the accessory and are both oriented in the lateral direction. The frame includes a plurality of cross members that extend in the lateral direction, and a first end that is attached to both the first and second side members. The first end at least partially defines a channel that extends in the lateral direction.

20 Claims, 31 Drawing Sheets

Related U.S. Application Data

11/507,333, filed on Aug. 21, 2006, now Pat. No. 7,469,958, application No. 12/587,837, which is a continuation-in-part of application No. 11/893,782, filed on Aug. 17, 2007.

(56) References Cited

U.S. PATENT DOCUMENTS

| | | |
|---|---|---|
| 6,447,032 B1 | 9/2002 | Howell, Sr. |
| 6,612,595 B1 | 9/2003 | Storer |
| 6,682,111 B1 | 1/2004 | Houseman et al. |
| 6,685,245 B1 | 2/2004 | Houseman et al. |
| 6,798,343 B2 | 9/2004 | Carrier et al. |
| 6,837,534 B2 | 1/2005 | O'Connell |
| 6,932,413 B2 | 8/2005 | Lloyd |
| 6,973,996 B2 | 12/2005 | Huff |
| 6,979,016 B1 | 12/2005 | Wegener |
| 7,201,255 B1 | 4/2007 | Kreikemeier |
| 7,261,346 B1 | 8/2007 | Kubesh |
| 2004/0191037 A1 | 9/2004 | Potts |
| 2006/0279096 A1 | 12/2006 | Helms et al. |
| 2007/0241587 A1* | 10/2007 | Fleming .................. 296/203.01 |
| 2008/0042453 A1 | 2/2008 | Hastings |
| 2008/0203741 A1 | 8/2008 | Hastings |
| 2009/0079209 A1 | 3/2009 | Hastings |

OTHER PUBLICATIONS

United States Patent and Trademark Office; Office Action from U.S. Appl. No. 11/893,782; mailed Sep. 24, 2009; Alexandria, Virginia; pp. 1-12; (12 pages).

United States Patent and Trademark Office; Office Action from U.S. Appl. No. 12/313,974; mailed Dec. 27, 2010; Alexandria, Virginia; pp. 1-5; copy enclosed (5 pages).

* cited by examiner

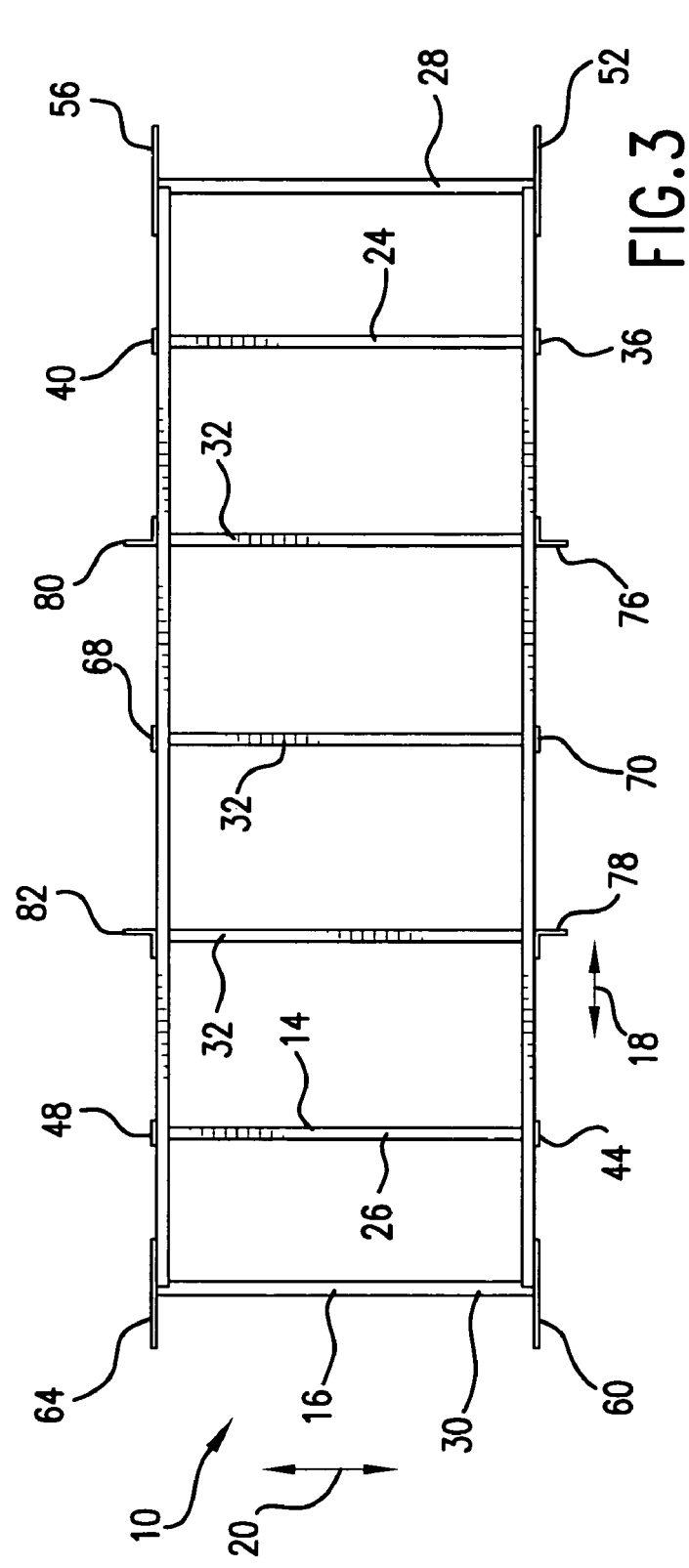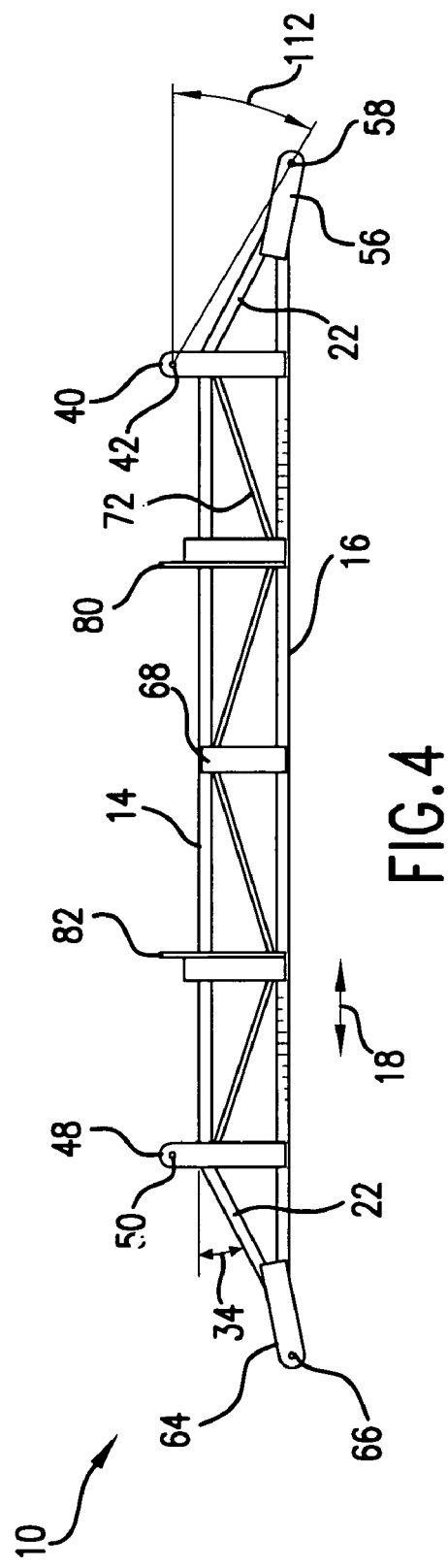

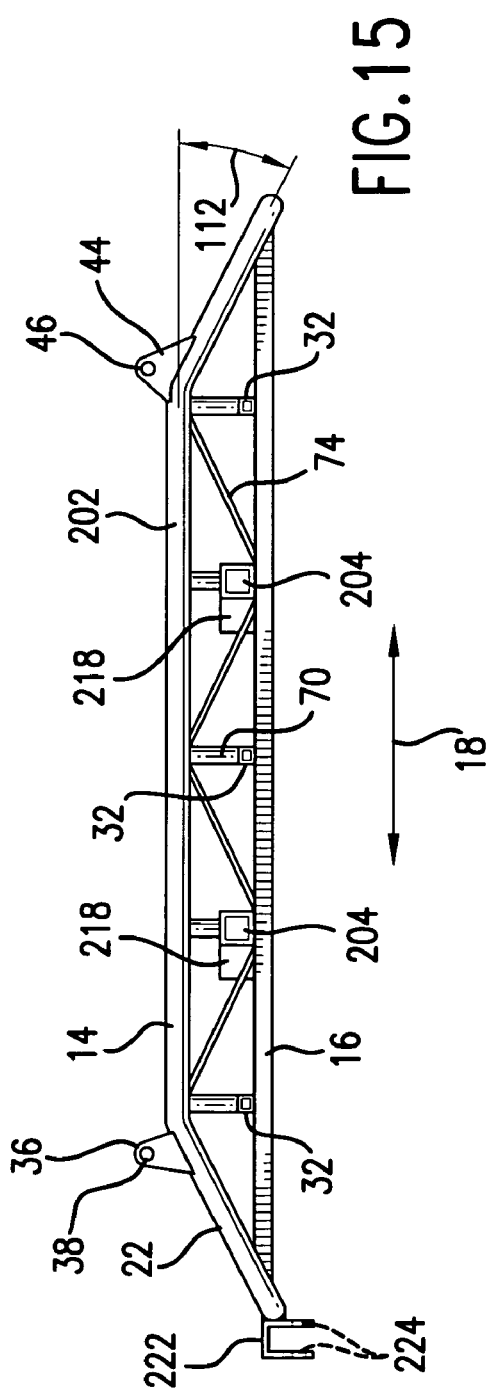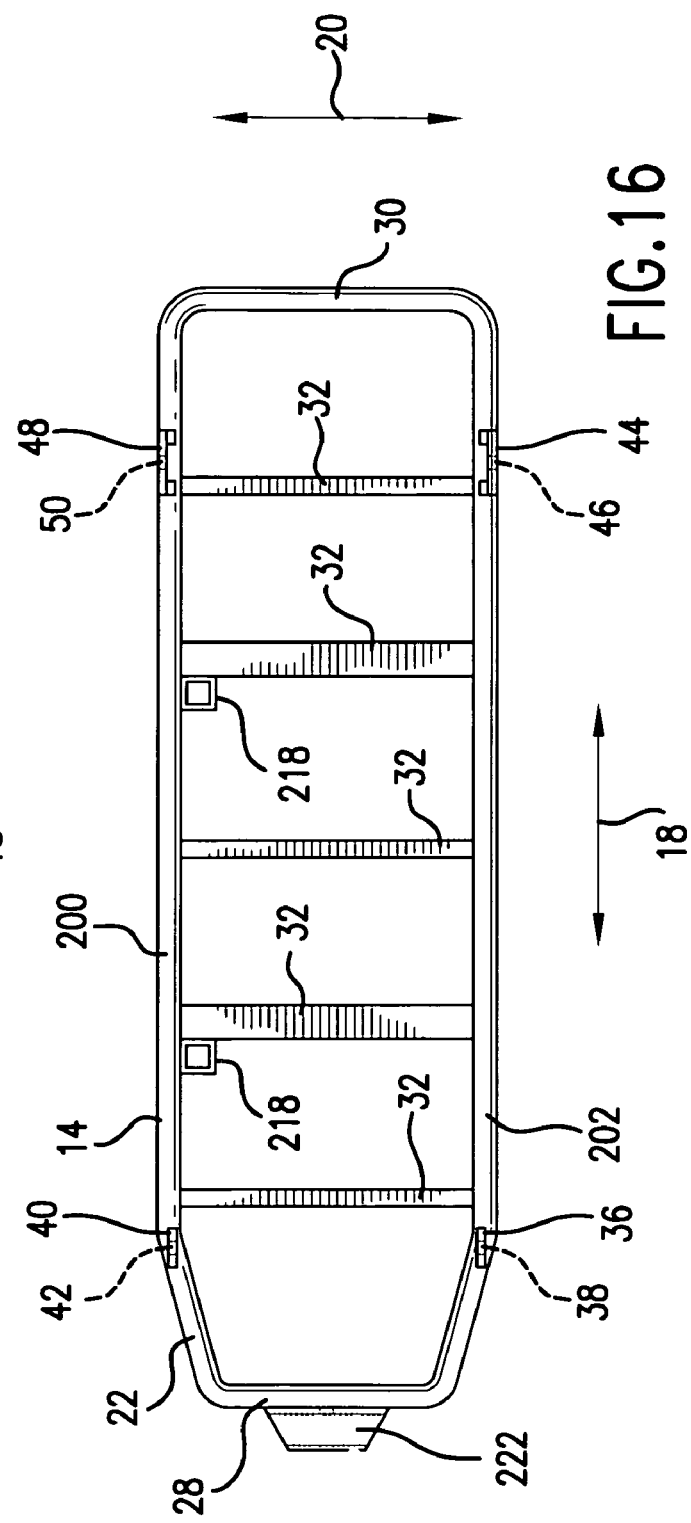

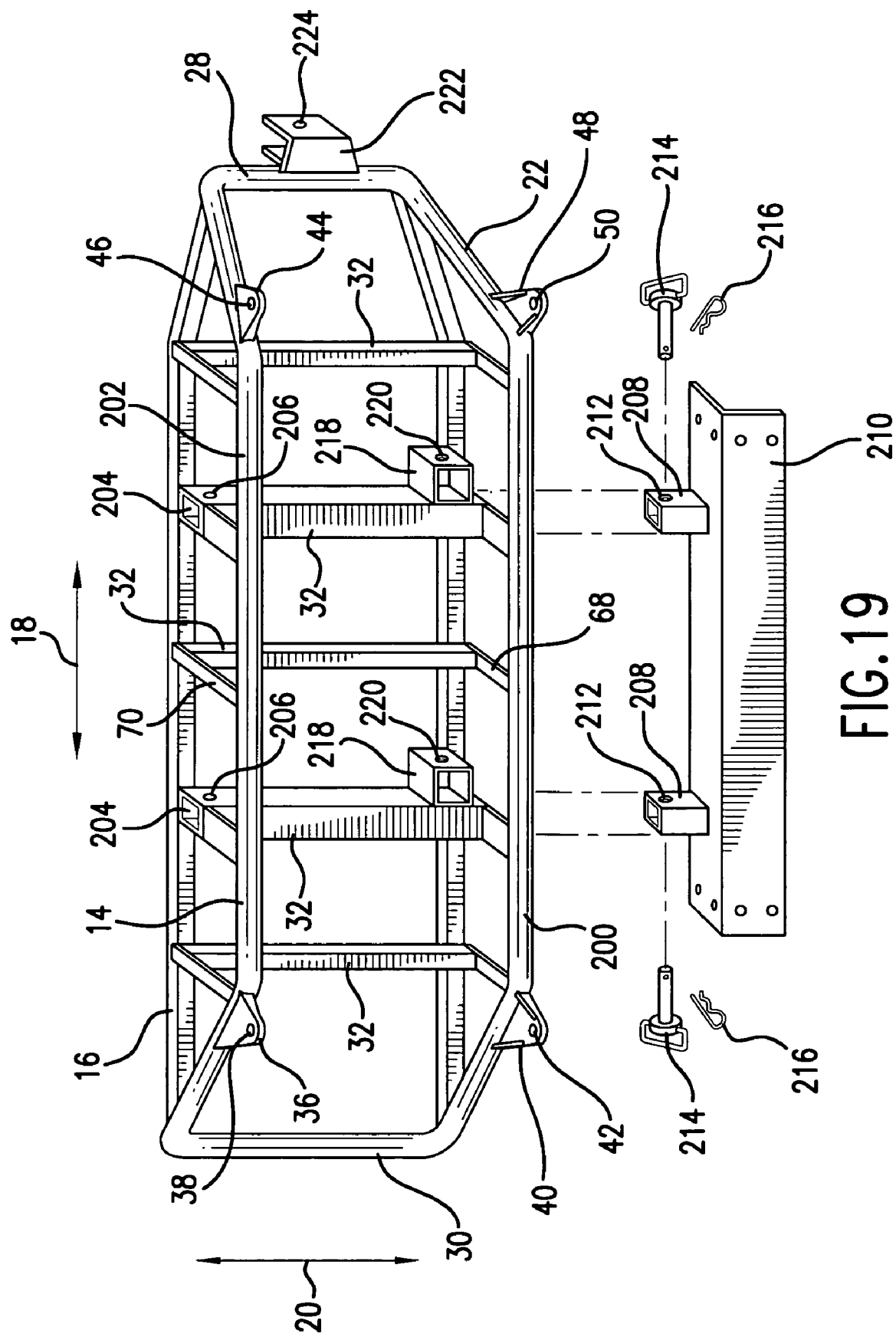

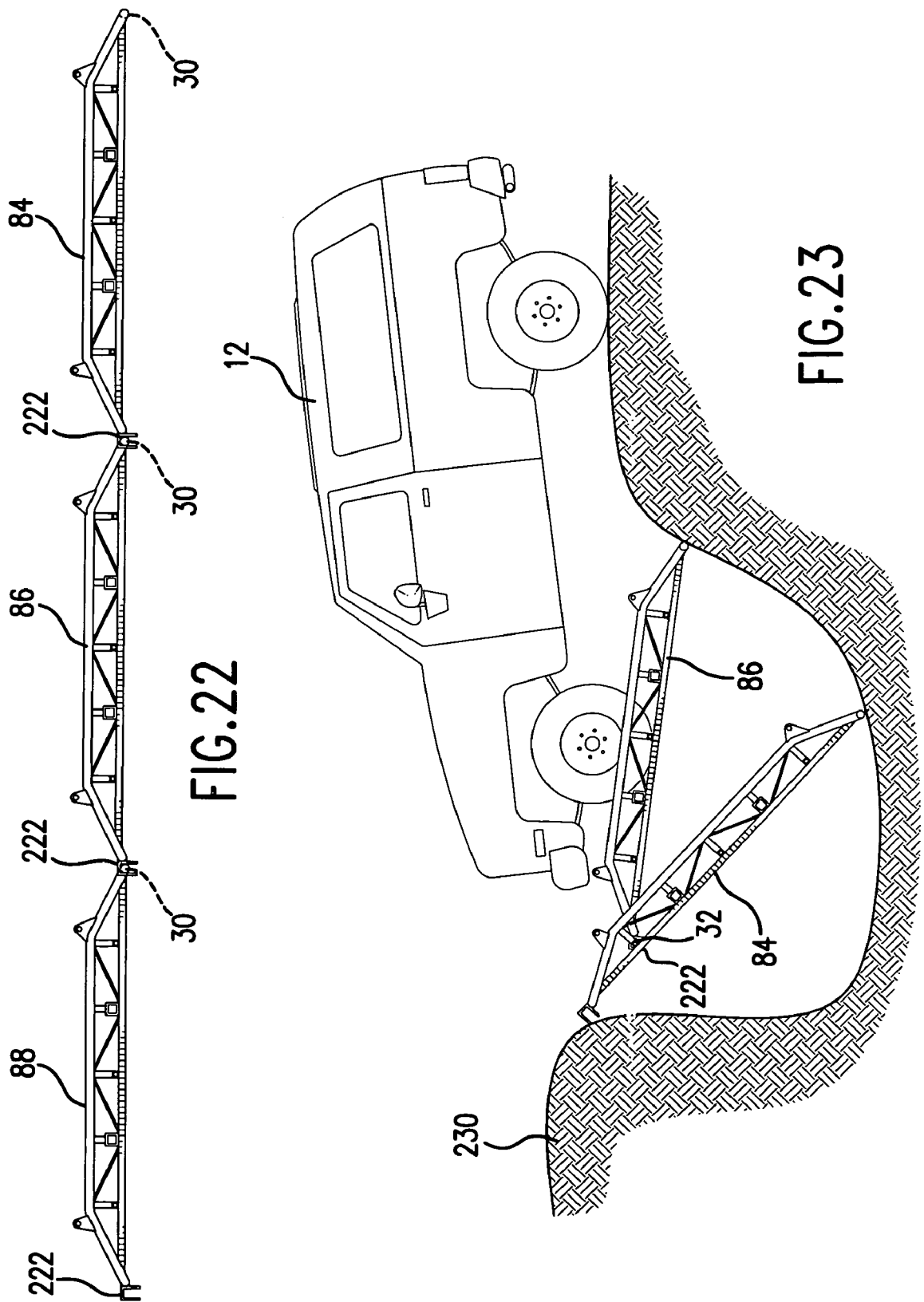

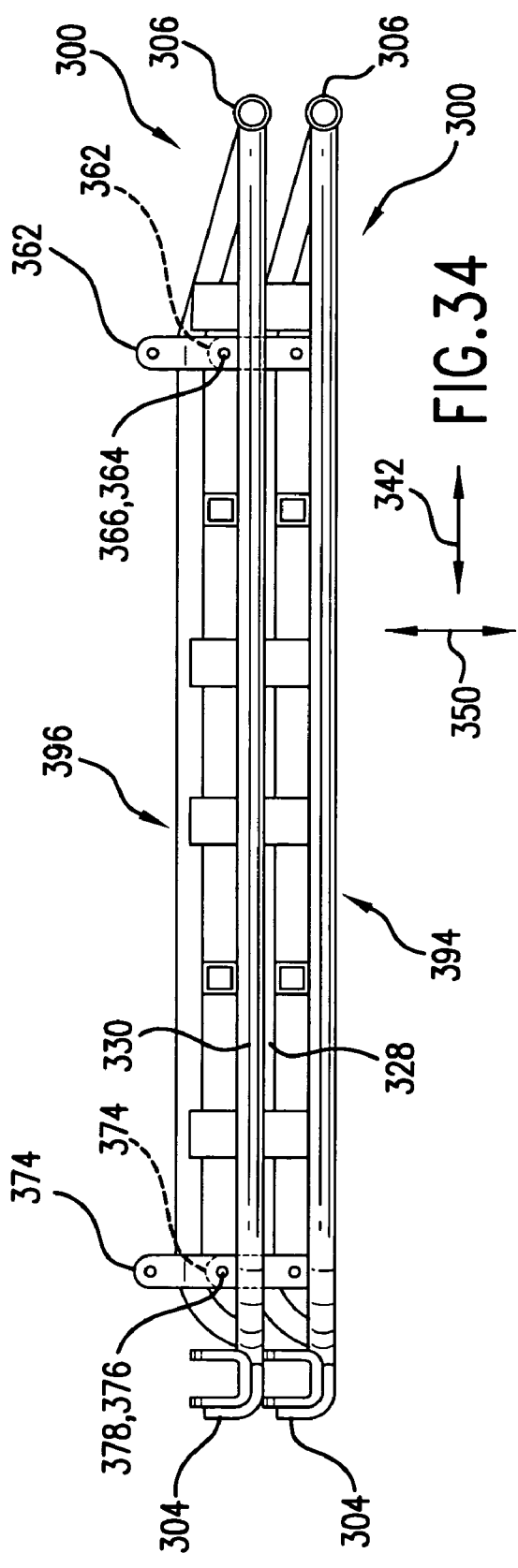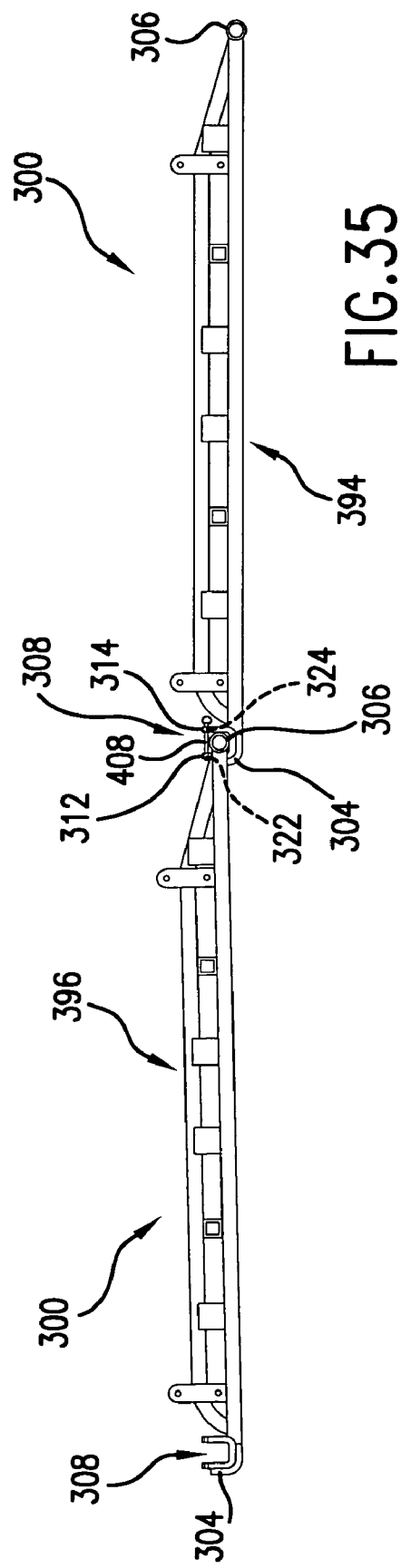

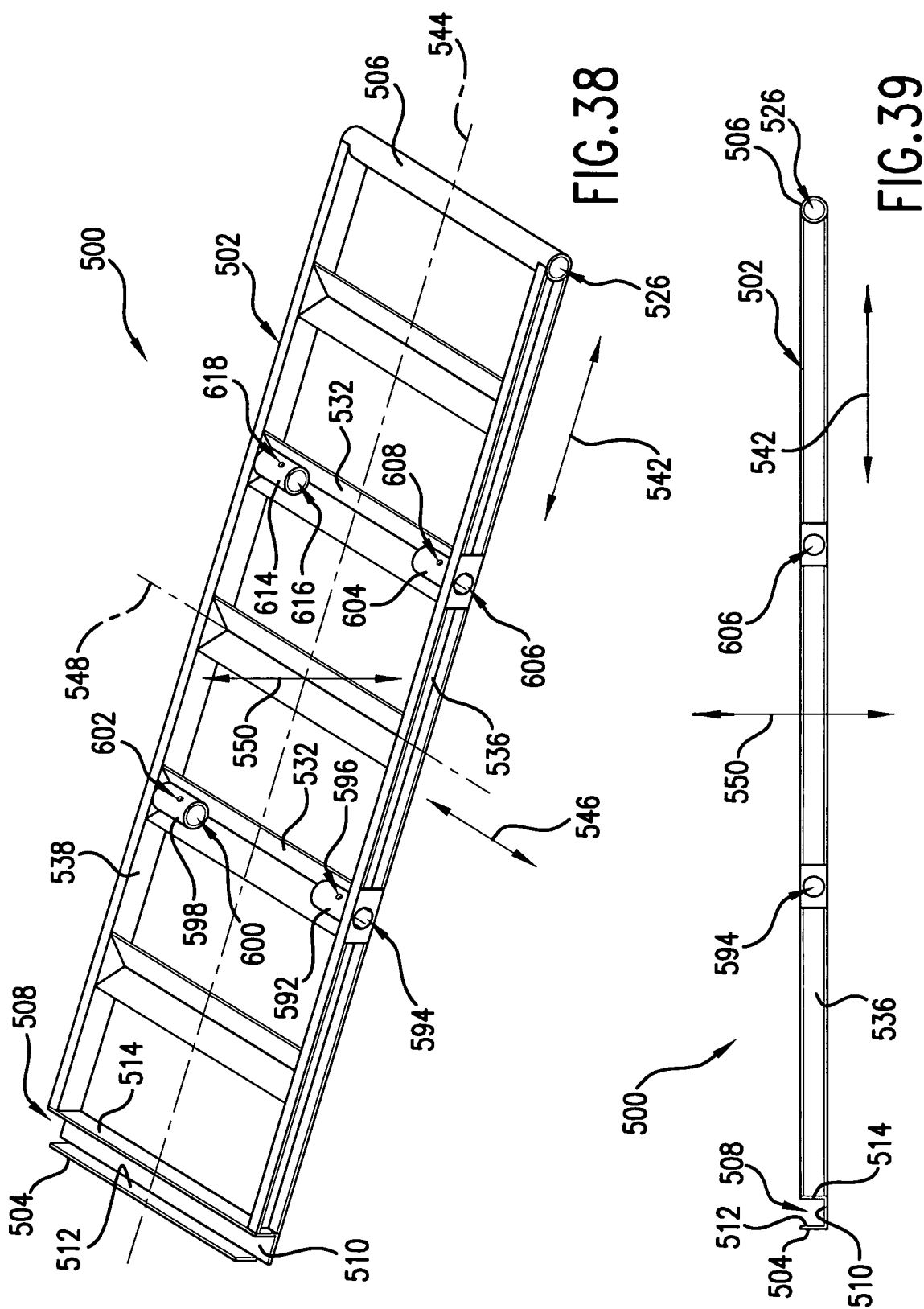

MULTIPLE USE VEHICLE ACCESSORY

CROSS REFERENCE TO RELATED APPLICATION

The present application is a continuation-in-part and claims the benefit of U.S. application Ser. No. 12/313,974 filed Nov. 26, 2008 now U.S. Pat. No. 8,033,586 and entitled, "Multiple Use Vehicle Accessory" which is also incorporated by reference herein in its entirety for all purposes. U.S. application Ser. No. 12/313,974 is a continuation-in-part and claims the benefit of U.S. application Ser. No. 11/893,782 filed on Aug. 17, 2007 now abandoned and entitled, "Multiple Use Vehicle Accessory", and is a continuation-in-part and claims the benefit of U.S. application Ser. No. 11/507,333 now U.S. Pat. No. 7,469,958 filed on Aug. 21, 2006 and entitled, "Multiple Use Vehicle Accessory." U.S. application Ser. No. 11/893,782 is a continuation-in-part and claims the benefit of U.S. Pat. No. 7,469,958. The present application is also a continuation-in-part and claims the benefit of U.S. application Ser. No. 11/893,782 filed on Aug. 17, 2007 and entitled, "Multiple Use Vehicle Accessory" which is also incorporated by reference herein in its entirety for all purposes.

FIELD OF THE INVENTION

The present invention relates generally to a vehicle accessory that can be utilized for a variety of uses. More particularly, the present application involves a multiple use vehicle accessory that can be used, for example, as a brush guard, a ramp, a lever and a ladder.

BACKGROUND

Vehicles are often driven off of conventionally paved roads for purposes of both work and recreation. Travel through and across natural terrain such as sand, gravel, riverbeds, rock, mud and foliage introduces problems and challenges not encountered by the everyday motorist. Vehicles adapted for such driving conditions are often fitted with oversized tires for necessary traction and improved ground clearance. Off road vehicles may be further equipped with a locking differential that delivers all available torque to the wheel on the axle of the vehicle that has the most traction. This arrangement reduces the likelihood of the vehicle becoming stuck in mud, ice or snow.

The front of a vehicle includes numerous expensive parts such as the radiator, headlights, water pump, battery, hood and grill. During off road or even during regular use these parts can be damaged by limbs, brush and other debris. It is therefore known to affix a brush guard to the front of the vehicle in order to protect the front of the vehicle and associated components from damage. A brush guard is generally made of a tubular framework of steel that is bolted directly onto the front bumper, hood and/or frame of the vehicle. The brush guard normally has an open front face to allow air to be drawn into the radiator of the vehicle for cooling purposes. Although smaller items such as stones and twigs can pass through the brush guard, larger more damaging objects like tree limbs are contacted by the brush guard and prevented from damaging the front of the vehicle.

It is sometimes the case that vehicles become stuck in mud or snow during off road use. In order to extract the vehicle a jack or lever may need to be employed to raise a portion of the vehicle. The user of the vehicle needs to keep such instruments handy as brush guards are not designed to be removed from the vehicle and used as a lever. Other situations exist in which the user of the vehicle is in need of a ramp or ladder to move items onto a bed of the vehicle or to access elevated areas such as the limb of a tree when hunting. Here, additional items such as ramps and ladders are stored in the vehicle for these occasions. Further, it is sometimes the case that a particular area, such as a creek, is impassible even to a vehicle equipped for off road use. In such instances a bridge must be laid down in order to allow the vehicle to traverse such an obstacle. Such a bridge must be transported by the vehicle to the location in question for use.

As such, a user of an off road vehicle must transport a multiplicity of items to accomplish expected tasks and to guard against unexpected occurrences. A user could carry a number of these items only to discover that the one item he or she failed to bring was the one that was actually most needed on a particular occasion. Such a situation is of course undesirable and even more so considering the user may be located in a remote, hard to reach area. In other instances, the users of vehicles for work and personal purposes likewise will need to keep on hand a variety of items for accomplishing multiple tasks.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 3 is a back view of the multiple use vehicle accessory of FIG. 1.

FIG. 4 is a side view of the multiple use vehicle accessory of FIG. 1.

FIG. 15 is a side view of the multiple use vehicle accessory of FIG. 14.

FIG. 16 is a top view of the multiple use vehicle accessory of FIG. 14.

FIG. 19 is a perspective view of the multiple use vehicle accessory of FIG. 14 shown oriented with respect to a vehicle engagement bracket to act as a brush guard.

FIG. 22 is a side view of multiple units of the multiple use vehicle accessory of FIG. 14 when configured for use as vehicle traction in swampy terrain.

FIG. 23 is a side view of multiple units of the multiple use vehicle accessory of FIG. 14 when configured for use as an angled bridge in aiding vehicles over crevices, ruts, ditches or other rough terrain.

FIG. 34 is a side view of a pair of multiple use vehicle accessories configured as the embodiment of FIG. 29 arranged in a stacked configuration.

FIG. 35 is a side view of a pair of multiple use vehicle accessories configured as the embodiment of FIG. 29 attached in a front to back manner.

FIG. 38 is a perspective view of a multiple use vehicle accessory in accordance with another exemplary embodiment.

FIG. 39 is a side view of the multiple use vehicle accessory of FIG. 38.

Figure 1:
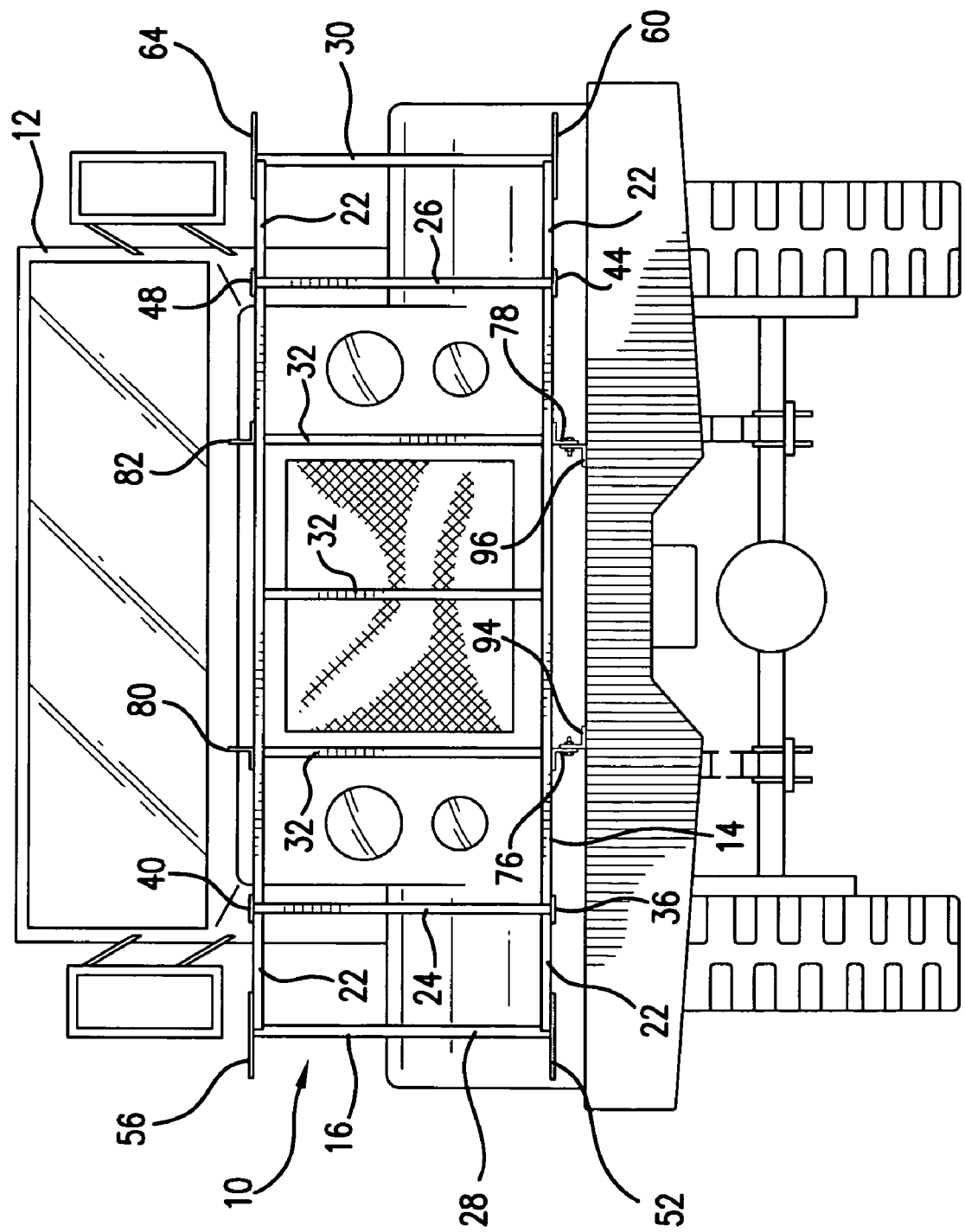
FIG. 1 is a front view of a multiple use vehicle accessory attached to a vehicle so as to be used as a brush guard in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a multiple use vehicle accessory 10 that can be used for a variety of purposes associated with a vehicle 12 and with other activities affiliated with off road activities. The multiple use vehicle accessory 10 can also be utilized in other applications that do not involve off road use. The multiple use vehicle accessory 10 includes one or more units 84 that have a first rectangular member 14 and a second rectangular member 16. One or more end supports 22 are also present and are oriented so as to extend at an angle to the longitudinal direction 18 of the multiple use vehicle accessory 10. The units 84 can be attached to one another in a variety of manners to form structures that allow for various utility.

Figure 2:
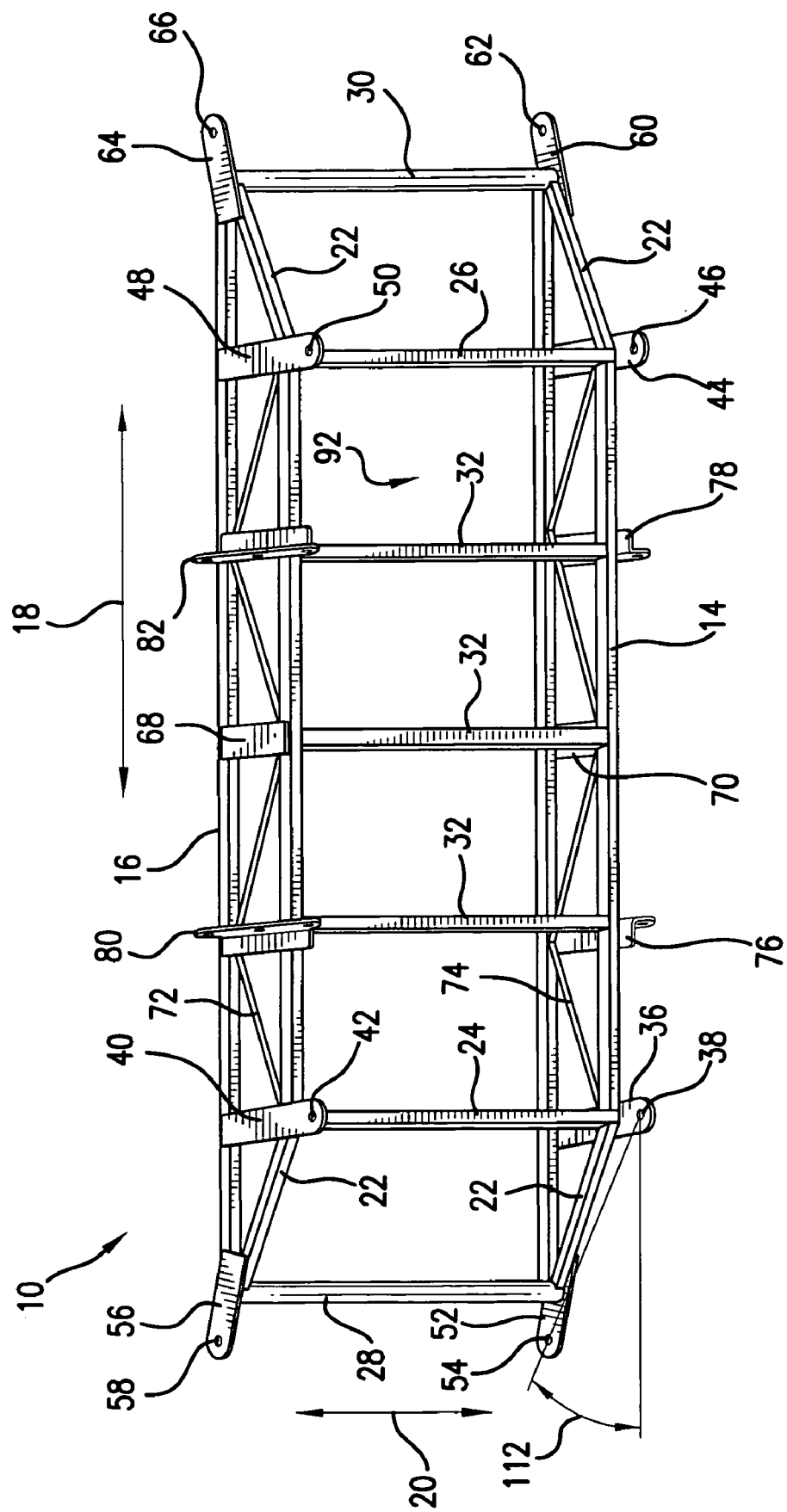
FIG. 2 is a perspective view of the multiple use vehicle accessory of FIG. 1.

The multiple use vehicle accessory 10 is shown attached to a vehicle 12 in FIG. 1 so as to be used as a brush guard. The multiple use vehicle accessory 10 prevents limbs, brush and other debris from contacting the vehicle 12 and damaging parts located at the front of the vehicle 12 such as the radiator, hood, headlights and battery. The multiple use vehicle accessory 10 is made of a material strong enough to withstand impacts normally associated with off road use of the vehicle 12. FIGS. 2 through 4 show various views of the multiple use vehicle accessory 10 when unattached to the vehicle 12.

The multiple use vehicle accessory 10 includes a first rectangular member 14 that is made of $\frac{1}{8}^{th}$ inch square 1 inch by 1 inch tubing. However, other cross-sectional shapes of the first rectangular member 14 are possible. For example, the first rectangular member 14 can have a rectangular, flat (two sided), triangular or circular shaped cross-section. Additionally, the triangular or circular shaped tubing can be employed in other embodiments. Still further, the first rectangular member 14 can have a cross-section in the shape of a channel, an angle or an I-beam. The cross-section of the first rectangular member 14 can be consistent throughout its entirety, or the cross-section can vary. For example, the ends 24 and 26 of the first rectangular member 14 can have a solid circular cross-section while the longitudinally extending portions of the first rectangular member 14 can be square shaped tubing. In the exemplary embodiment of FIGS. 1-5, the entire first rectangular member 14 is made of square shaped tubing. Although described as being made of $1/8^{th}$ inch square 1 inch by 1 inch tubing, the dimensions can vary in other embodiments. For instance, the thickness of the tubing may be from $1/16^{th}$ inch to ½ inch. Likewise, the size of the tubing need not be 1 inch, but may be anywhere from ¼ inch to 6 inches in other embodiments. The first rectangular member 14 can be made of any suitable material. For example, steel, aluminum, fiberglass, chromoly, plastic or a mixture of other materials may be employed in certain exemplary embodiments.

The second rectangular member 16 can be configured in a similar manner as the first rectangular member 14. The second rectangular member 16 has longitudinally extending portions that are made of $1/8^{th}$ inch square 1 inch by 1 inch tubing. The ends 28 and 30 of the second rectangular member 16 have solid cross-sections that are circular in shape. It is to be understood that the cross-section of the second rectangular member 16 can be varied in other embodiments. By way of example, the cross-sections may be square, rectangular or circular in other embodiments. The cross-sectional shape, dimensions and material of the second rectangular member 16 can be selected as those described above with respect to the first rectangular member 14. The second rectangular member 16 defines an open area 92. In the exemplary embodiment shown in FIGS. 1-5, the second rectangular member 16 extends a greater length in the longitudinal direction 18 than does the first rectangular member 14.

The multiple use vehicle accessory 10 includes an end support 22 that extends from an end 24 of the first rectangular member 14 to an end 28 of the second rectangular member 16. As such, the end support 22 extends at an angle 34 to the longitudinal direction 18. The angle 34 can be from 30° to 45° in various exemplary embodiments. Further, the angle 34 can be from 15° to 70° in yet other exemplary embodiments of the present invention. In accordance with one exemplary embodiment, the angle 34 is 30° degrees. The cross-sectional shape, dimensions and material making up the end support 22 can be provided as that described above with respect to the first rectangular member 14. In the exemplary embodiment shown in FIGS. 1-5, the end support 22 is made of $1/8^{th}$ inch square 1 inch by 1 inch tubing. Also in the exemplary embodiment shown in FIGS. 1-5, four end supports 22 are present. Two of the end supports 22 extend from end 24 to end 28. The other two end supports 22 extend from end 26 to end 30. The end supports 22 are connected to the corners of the first rectangular member 14 and second rectangular member 16 and act to tie these two structures together. Although described as employing four end supports 22, other exemplary embodiments exist in which any number of end supports 22 are present. For example, up to eight end supports 22 may be present in accordance with other exemplary embodiments.

A plurality of cross members 32 extend in the lateral direction 20 between the longitudinal portions of the first rectangular member 14. The cross-section, dimensions and material of the cross members 32 can be arranged like that of the first rectangular member 14 described above. Although three cross members 32 are present in the multiple use vehicle accessory 10 shown in FIGS. 1-5, any number may be employed in accordance with various exemplary embodiments. For example from zero to ten cross members 32 may be used. The cross members 32 are arranged so as to extend in a direction parallel to the ends 24 and 26 of the first rectangular member 14. In other embodiments, the cross members 32 can extend at an angle to the ends 24 and 26. The cross members 32 act to strengthen the first rectangular member 14 and also demonstrate various utility as will be described below.

A pair of mounting brackets 76 and 78 are connected to the sides of the first rectangular member 14 and the second rectangular member 16. An additional pair of mounting brackets 80 and 82 are connected to the opposite side of the first and second rectangular members 14 and 16. As shown in FIG. 1, mounting bracket 76 is attached to mounting plate 94 of vehicle 12. Additionally, mounting bracket 78 is attached to mounting plate 96 of vehicle 12. These connections may be made by disposing bolts through apertures defined in the mounting brackets 76, 78 and mounting plates 94, 96. In this manner, the multiple use vehicle accessory 10 is mounted onto the vehicle 12 and is used as a brush guard. Limbs, debris and other objects are prevented from damaging the front portion of the vehicle 12 through contact primarily with the first rectangular member 14, end supports 22 and cross members 32. Although it is to be understood that the second rectangular member 16 provides some protection to the vehicle 12. Aside from using the mounting brackets 76 and 78, the multiple use vehicle accessory 10 can be connected to the vehicle 12 in a variety of manners. For instance, mounting brackets 80 and 82 may be connected to complimentary mounting plates on the vehicle 12. Further, the vehicle 12 may have a recess that receives the multiple use vehicle accessory 10, or a pair of clamps on the vehicle 12 can be used to grasp the multiple use vehicle accessory 10 and hold it in a desired position. Other arrangements are possible in which male or female components on the vehicle 12 may used in order to mount or grasp the multiple use vehicle accessory 10 thereon and hold it in a desired position.

The multiple use vehicle accessory 10 includes a projecting mounting member 36 that is connected to the sides of the first rectangular member 14, second rectangular member 16 and one of the end supports 22. Projecting mounting member 36 defines an aperture 38 for purposes that will be described below. A projecting mounting member 40 is present on an opposite side of the first rectangular member 14, second rectangular member 16 and end support 22. Projecting mounting member 40 defines an aperture 42. Apertures 38 and 42 can be circular holes that are co-axial in accordance with one exemplary embodiment of the present invention. The axes of the apertures 38 and 42 can extend in the lateral direction 20 and be parallel to the lateral direction 20. However, other embodiments exist in which the apertures 38 and 42 are slots or rectangular in shape.

Another pair of projecting mounting members 44 and 48 are located on end 26 of the first rectangular member 14 and define apertures 46 and 50. As described with respect to apertures 38 and 42, apertures 46 and 50 can be holes, slots or rectangular in shape. Apertures 46 and 50 may be holes that are co-axial and have axes that extend in the lateral direction 20 and may be parallel to the lateral direction 20. The projecting mounting members 36, 40, 44 and 48 have utility as will be described below and also act to function so as to tie together and strengthen the multiple use vehicle accessory 10.

A longitudinal mounting member 52 is included and extends from the end 28 of the second rectangular member 16. In this regard, the longitudinal mounting member 52 is connected to the side of the second rectangular member 16 and the end support 22. Although extending in the longitudinal direction 18, the longitudinal mounting member 52 is angled with respect to the longitudinal direction 18. The longitudinal mounting member 52 can be oriented at an angle from 10° to 30° to the longitudinal direction 18. In other embodiments, the longitudinal mounting member 52 is not angled with respect to the longitudinal direction 18. The longitudinal mounting member 52 defines an aperture 54. Aperture 54 is a hole in the exemplary embodiment shown in FIGS. 1-5. However, aperture 54 can be a slot or may be rectangular shaped in other embodiments.

Another longitudinal mounting member 56 extends from the end 28 on an opposite side of the multiple use vehicle accessory 10 from the longitudinal mounting member 52. Longitudinal mounting member 56 has an aperture 58 that is a hole but may be a slot or rectangular shaped in other embodiments. Apertures 54 and 58 are co-axial with one another and have axes that are parallel to and extend in the lateral direction 20. An additional set of longitudinal mounting members 60 and 64 extend from the opposite end 30 and can be configured in a manner similar to that previously discussed with respect to longitudinal mounting member 52. Longitudinal mounting member 60 defines an aperture 62, and longitudinal mounting member 64 defines aperture 66. Apertures 62 and 66 may be provided as previously discussed with respect to aperture 54. In the exemplary embodiment shown, apertures 62 and 66 are holes that are co-axial with one another and have axes that are parallel to and extend in the lateral direction 20.

A pair of support posts 68 and 70 extend between and connect to the first rectangular member 14 and the second rectangular member 16. The support posts 68 and 70 function so as to strengthen the longitudinally extending portions of the first and second rectangular members 14 and 16. Although shown as being rectangular and flat in shape, the support posts 68 and 70 can be variously configured in other embodiments. The multiple use vehicle accessory 10 is also strengthened by the presence of a pair of structural reinforcing members 72 and 74 that are located between the longitudinally extending portions of the first and second rectangular members 14 and 16. The structural reinforcing members 72 and 74 help prevent bowing of the first rectangular member 14 with respect to the second rectangular member 16. Although shown as having a circular cross section, the structural reinforcing members 72 and 74 can have various cross-sectional shapes. Additionally, the structural reinforcing members 72 and 74 need not traverse the entire length of the longitudinally extending portions of the first rectangular member 14 in other embodiments. The support posts 68 and 70 in addition to the structural reinforcing members 72 and 74 can be made of a variety of materials such as steel, aluminum, fiberglass, plastic, chromoly or a mixture of metals.

Figure 10:
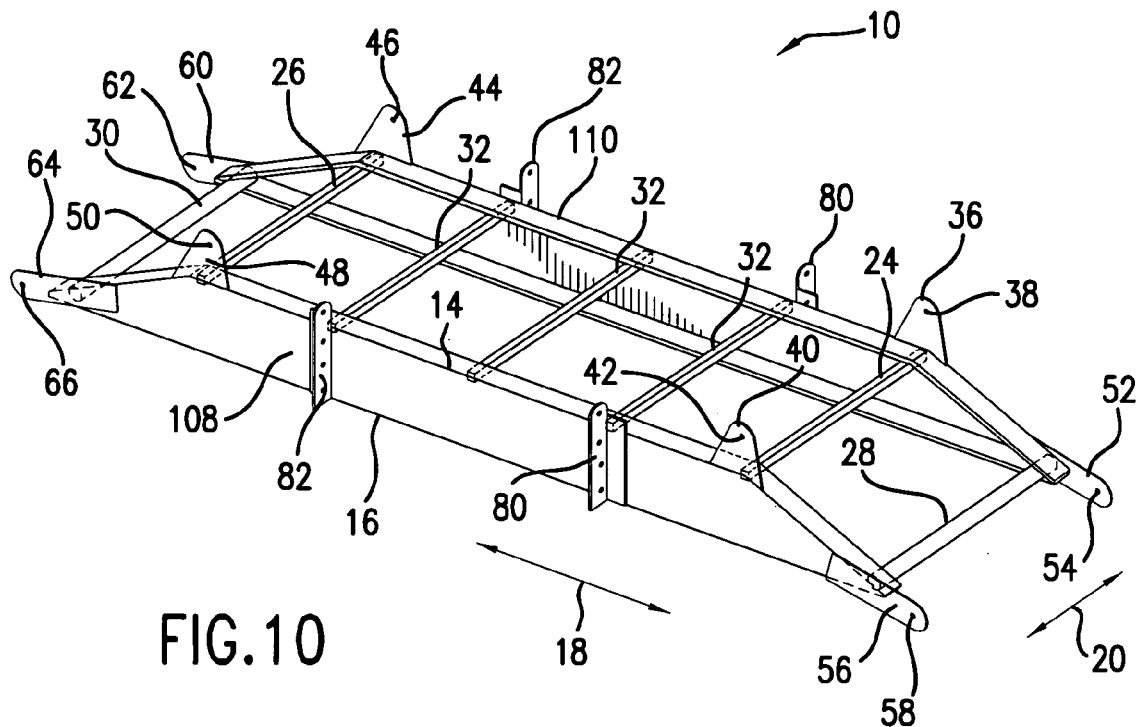
FIG. 10 is a perspective view of the multiple use vehicle accessory in accordance with an alternative exemplary embodiment of the present invention.
Figure 11:
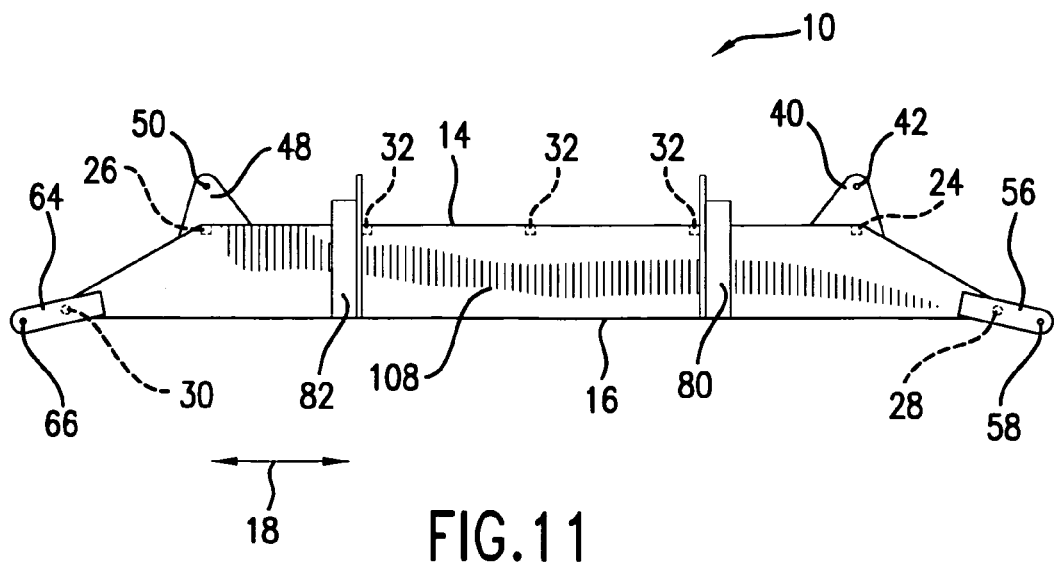
FIG. 11 is a side view of the multiple use vehicle accessory of FIG. 10.

Although shown in the exemplary embodiment of FIGS. 1-4 as having a generally framework shape, the multiple use vehicle accessory 10 can have components that are variously shaped in other embodiments. For instance, FIGS. 10 and 11 show an additional exemplary embodiment in which the multiple use vehicle accessory 10 includes a pair of plates 108 and 110 on either side thereof. The plates 108 and 110 act to form the sides of the first and second rectangular members 14 and 16. In this regard, the first rectangular member 14 can be described as being made of the ends 24 and 26 in addition to the upper portions of the plates 108 and 110. In a similar manner, the second rectangular member 16 is made of the ends 28 and 30 in addition to the lower portions of the plates 108 and 110. The plates 108 and 110 can be made of steel, or the plates 108 and 110 can be made of aluminum, fiberglass or plastic in other embodiments. The plates 108 and 110 can be solid members or may have apertures formed therein. The projecting mounting members 36, 40, 44 and 48 and the longitudinal mounting members 52, 56, 60 and 64 can be integrally formed with or attached to the plates 108 and 110. These components can also be attached to the ends 24, 26, 28 and 30 in certain embodiments. The plates 108 and 110 can be channel pieces, angle pieces or flat pieces. In certain embodiments the plates 108 and 110 are one quarter inch flat stock.

Figure 12:
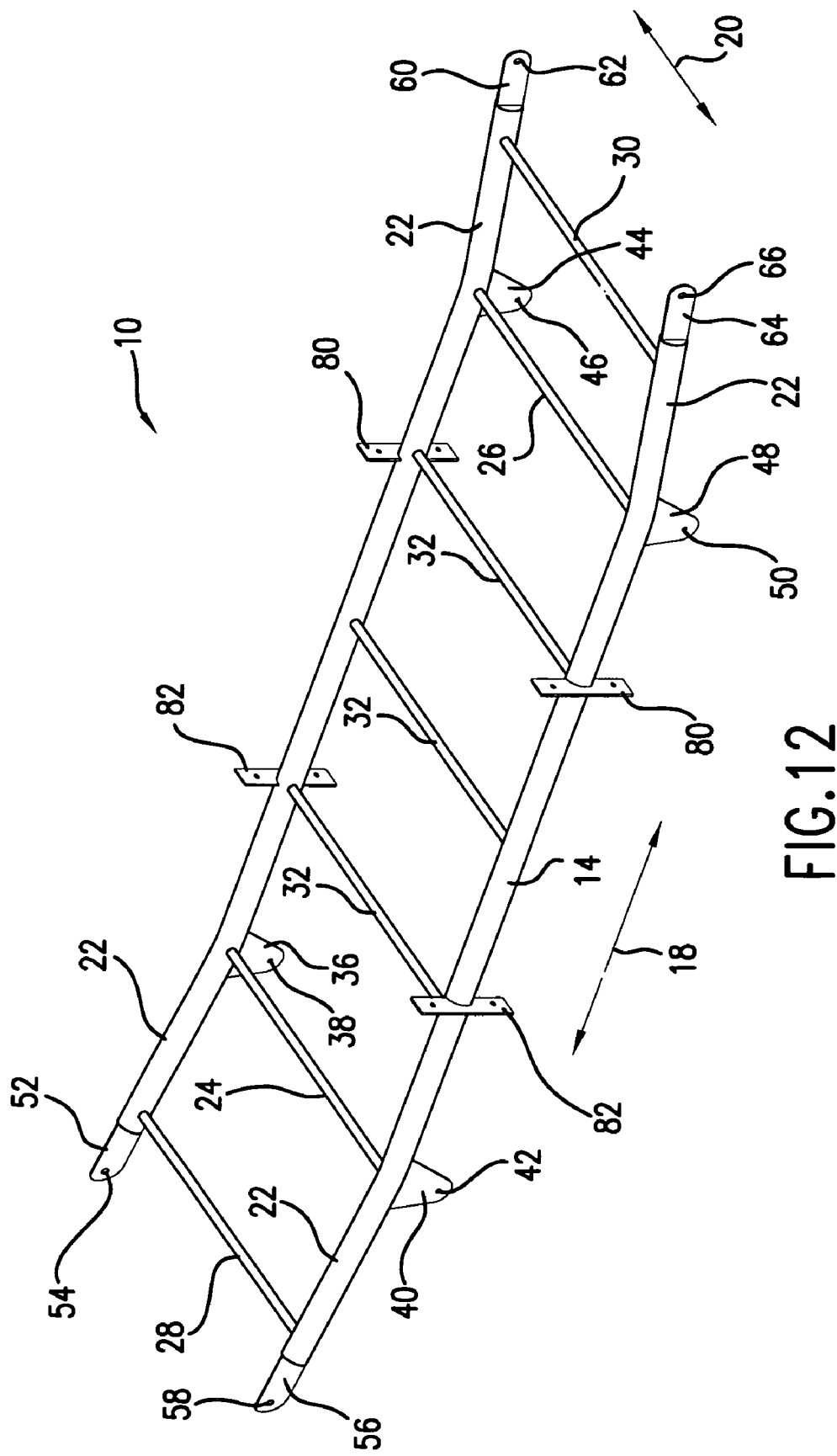
FIG. 12 is a perspective view of the multiple use vehicle accessory in accordance with another exemplary embodiment of the present invention.

FIG. 12 shows an additional exemplary embodiment of the multiple use vehicle accessory 10. In this embodiment, the second rectangular member 16 is not present, although members resembling ends 28 and 30 are present in order to help tie together and strengthen the parts of the multiple use vehicle accessory 10 including end supports 22. The longitudinal mounting members 52, 56, 60 and 64 can extend from these components. The remainder of the multiple use vehicle accessory 10 is configured substantially the same as the one described in relation to FIGS. 1-4. The orientation of apertures 38, 42, 46, 50, 54, 58, 62 and 66 can be the same for the exemplary embodiments in FIGS. 10-12 as described above with respect to the embodiment of FIGS. 1-4. Various components of the exemplary embodiment shown in FIG. 12 are made of round tubing.

The variously described components of the multiple use vehicle accessory 10 can be attached to one another in a variety of manners. For example, the ends 24 and 26 can be welded onto the laterally extending portions of the first rectangular member 14. Likewise, the end support 22 can be welded to the ends 24 and 28. In other versions of the multiple use vehicle accessory, the end support 22 can be attached to the ends 24 and 28 through the use of mechanical fasteners such as bolts. In other embodiments, components of the multiple use vehicle accessory 10 can be integrally formed with one another. In this regard, the ends 24 and 28 may be formed as a single, integral piece with end support 22. As such, the various components of the multiple use vehicle accessory 10 such as the first rectangular member 14, second rectangular member 16, end support 22, cross members 32, support post 68, mounting bracket 76, etc. may be attached through welding, mechanical fasteners or can be made as one or more integral pieces. The components of the multiple use vehicle accessory 10 can be made out of a variety of materials such as steel, fiberglass, aluminum, plastic, chromoly or a mixture of materials.

The multiple use vehicle accessory 10 can be utilized in a number of different applications besides that of a brush guard. For example, the multiple use vehicle accessory 10 can be reoriented on the vehicle 12 so as to be used as a luggage rack. In this regard, the multiple use vehicle accessory 10 can be detached from the vehicle 12 and rotated essentially 90° so that the first rectangular member 14 is located beneath the second rectangular member 16. Mounting brackets 76 and 78 can be attached to mounting plates 94 and 96 in order to connect the multiple use vehicle accessory 10 to the vehicle 12. Luggage, game or other items may be placed within the multiple use vehicle accessory 10 for transport.

Additionally or alternatively, the multiple use vehicle accessory 10 can be attached to the vehicle 12 so as to be configured as a windshield guard. The multiple use vehicle accessory 10 can also be attached to the front or back bumper of the vehicle 12 and used as a tow bar or as a ball hitch adapter. An adapter can also be located into the trailer hitch receiver of the vehicle 12, and the multiple use vehicle accessory 10 can be attached to the adapter. A mounting element may be provided on the multiple use vehicle accessory 10, and a spare tire can be mounted thereon. An additional adapter can be attached to the adapter located into the trailer hitch receiver of the vehicle 12 that includes a tow ball for towing of a trailer. Alternatively, the adapter that is located into the trailer hitch receiver of the vehicle 12 can include a tow ball for towing purposes in addition to holding the multiple use vehicle accessory 10 as previously discussed.

The multiple use vehicle accessory 10 can also find utility when detached from the vehicle 12. For example, the multiple use vehicle accessory 10 can be used as a ladder. Here, one can place an end of the multiple use vehicle accessory 10 on the ground and use the ends 24 and 26 in addition to the cross members 32 as rungs of a ladder. The multiple use vehicle accessory 10 can be employed as a gurney to remove an injured individual from a remote location. Here, the ends 28 and 30 of the second rectangular member 16 can be grasped by two people in order to transport an injured individual placed in the multiple use vehicle accessory 10. Further, the multiple use vehicle accessory 10 can be used as a hand truck for the transport of boxes, game or other items. Here, a set of wheels can be attached to the projecting mounting members 36 and 40. The wheels may be on spindles that are mounted through apertures 38 and 42 of the projecting mounting members 36 and 40. Alternatively, an axle may be placed through the apertures 38 and 42 and the wheels can be attached thereon. A user can grasp end 30 of the second rectangular member 16 in order to push the hand truck. If desired, wheels need not be employed in other applications. Here, the multiple use vehicle accessory 10 can be used as a sled to pull game or other items from a remote location without the use of wheels.

Figure 5:
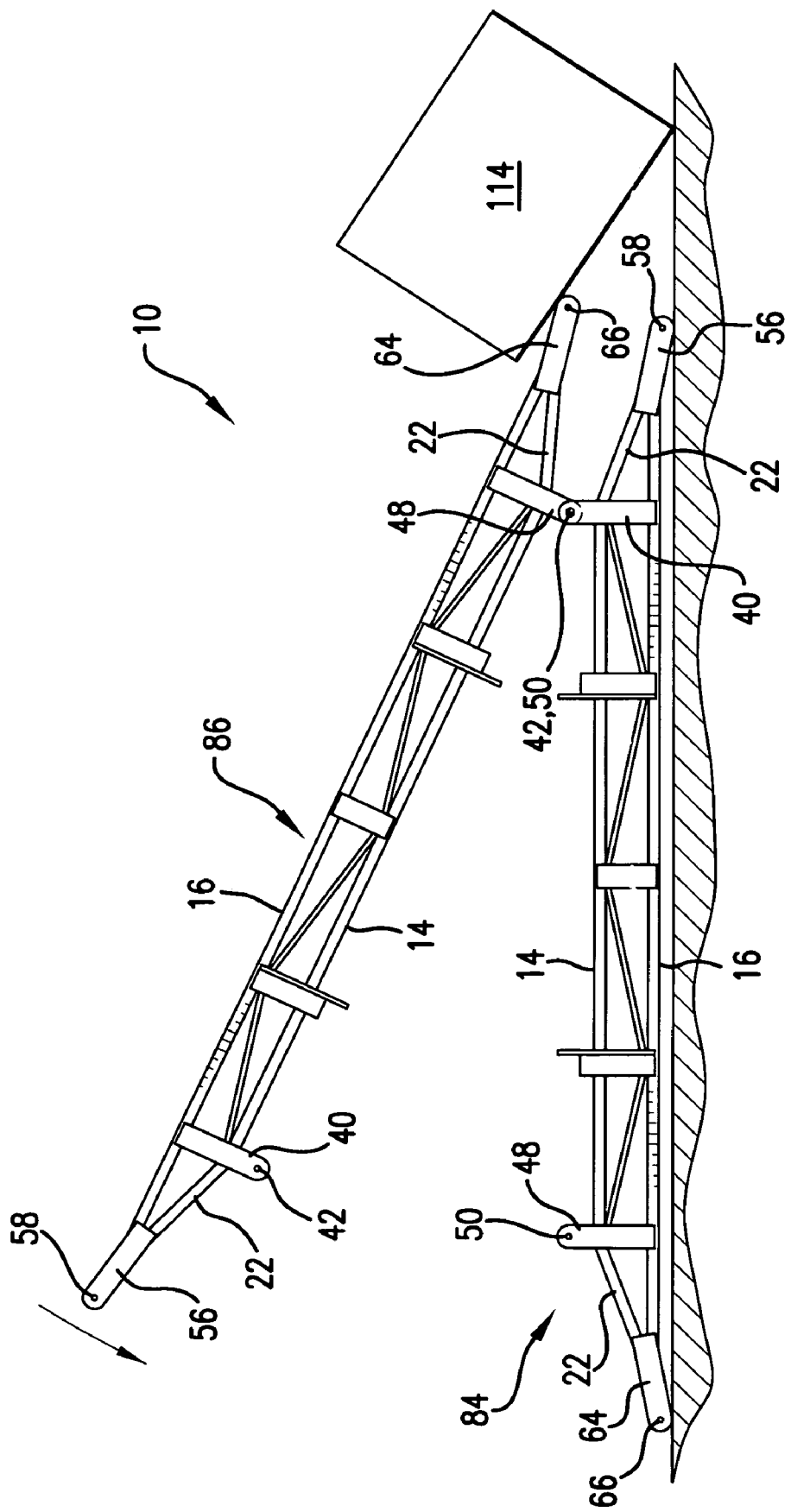
FIG. 5 is a side view of two units of the multiple use vehicle accessory attached to one another and used as a lifting lever in accordance with one exemplary embodiment of the present invention.

The multiple use vehicle accessory 10 also finds utility in applications in which more than one multiple use vehicle accessory 10 is employed. FIG. 5 shows one such embodiment in which a first unit 84 and a second unit 86 are configured as a lever. The units 84 and 86 can be similar to one another or may be different. In this regard, differences between the units 84 and 86 may include but not be limited to the number of cross members 32, angle of extension of the end supports 22 to the longitudinal direction 18, or the presence or absence of support posts 68 and 70 and structural reinforcing members 72 and 74. Likewise, the units 84 and 86 can be configured so as to be substantially identical to one another. However, it may be advantageous for the spacing of certain components to be different between the first unit 84 and the second unit 86. In this regard, the location of the mounting brackets 76, 78, 80 and 82 with respect to the first and second rectangular members 14 and 16 can be varied between the first unit 84 and the second unit 86 so as to be offset. This offsetting will allow a set of mounting brackets 76, 78, 80 and 82 of the first and second units 84 and 86 to nest onto one another so that the first and second units 84 and 86 can be connected to one another in a side by side arrangement. Additional components such as the projecting mounting members 36, 40, 44 and 48 in addition to the longitudinal mounting members 52, 56, 60 and 64 can be offset between the first and second units 84 and 86 so that these components can be connected to one another to allow for connection between the units 84 and 86.

As shown in FIG. 5, the projecting mounting members 36 and 40 of the first unit 84 are connected to the projecting mounting members 44 and 48 of the second unit 86. This connection can be effected with one or more pins, but the use of bolts or an axle placed through the apertures 38, 42, 46 and 50 are also possible. The first unit 84 faces in a direction opposite to the second unit 86, and the two units 84 and 86 pivot with respect to one another so as to form a lifting lever for lifting an object 114. The lifting lever can be used to lift a vehicle 12 that is stuck in mud or on rocks. A variety of other uses for the lifting lever are possible. For example, the vehicle 12 can be raised with the lifting lever in order to change a flat tire. Further, the lifting lever can be used to pry open a portion of the vehicle 12 in the event of an accident in order to extract an individual therefrom. The lifting lever can also be used in other non-vehicle applications. Upon lifting the object 114 or vehicle 12, the lever can be locked in place by placing a bolt, pin or other object through aligned apertures 42 and 50 and/or aligned apertures 38 and 46. For example, when changing a flat tire the vehicle 12 can be lifted and the lever can be locked into place by the user for removing and replacing a tire to the wheel of the vehicle 12.

Figure 6:
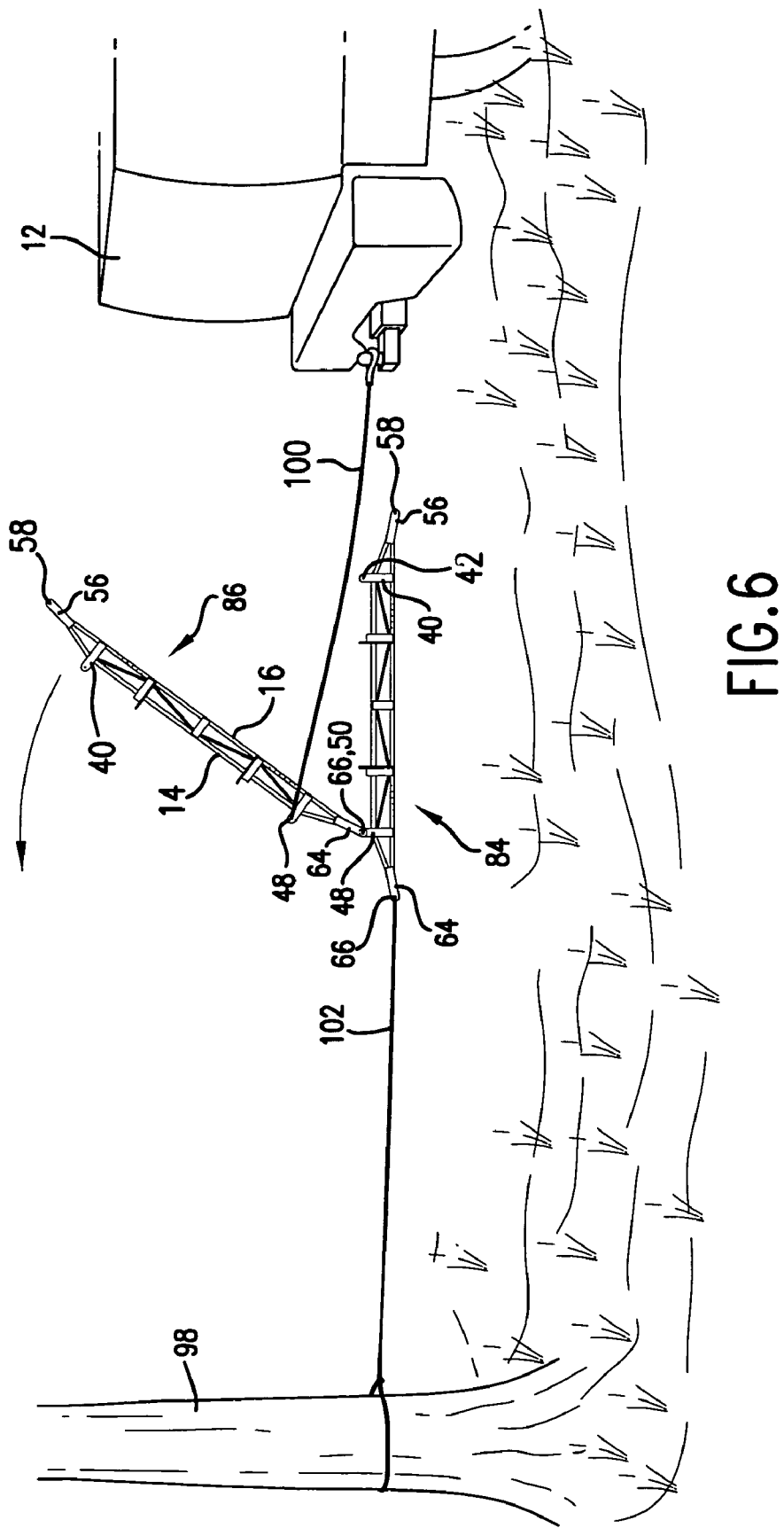
FIG. 6 is a side view of two units of the multiple use vehicle accessory attached to one another and used as a pulling lever in accordance with one exemplary embodiment of the present invention.

Another configuration of the first and second units 84 and 86 is shown in FIG. 6. Here, the units 84 and 86 are arranged as a pulling lever. The projecting mounting members 44 and 48 of the first unit 84 are pivotably connected to the longitudinal mounting members 60 and 64 of the second unit 86. The first unit 84 can be anchored to a tree 98 or other object. In this regard, an anchor line 102 is connected to the tree 98 and to the longitudinal mounting members 60 and 64 of the first unit 84. A hook line 100 is connected to the projecting mounting members 44 and 48. The hook line 100 is connected on an opposite end to a vehicle 12. The user can rotate the second unit 86 with respect to the first unit 84 in order to pull the vehicle 12 with the hook line 100. Such a utilization of the multiple use vehicle accessory 10 can be employed when the vehicle 12 becomes stuck in mud, snow or on rocks. A pin, bolt or other device can be disposed through one or more of the apertures or other portion of the first unit 84 and second unit 86 to lock their relative position with respect to one another during a pulling procedure. For example, a pin may be placed through aligned apertures 50 and 66 and/or aligned apertures 46 and 62 if the second unit 86 is rotated to such an extent so as to be in series with the first unit 84 in order to lock the relative position of units 84 and 86.

The first and second units 84 and 86 can also be utilized in other applications related to the vehicle 12. For example, the first and second units 84 and 86 can be positioned side by side to one another so that the first rectangular members 14 are located above the second rectangular members 16. The vehicle 12 can then be driven onto the first and second units 84 and 86. The units 84 and 86 can serve as ramps to allow one to access the underside of the vehicle 12 to change oil of the vehicle 12 or to perform other tasks of maintenance or repair. Further, the units 84 and 86 can function as a bridge to allow the vehicle 12 to traverse a ditch, stream or other feature.

Figure 7:
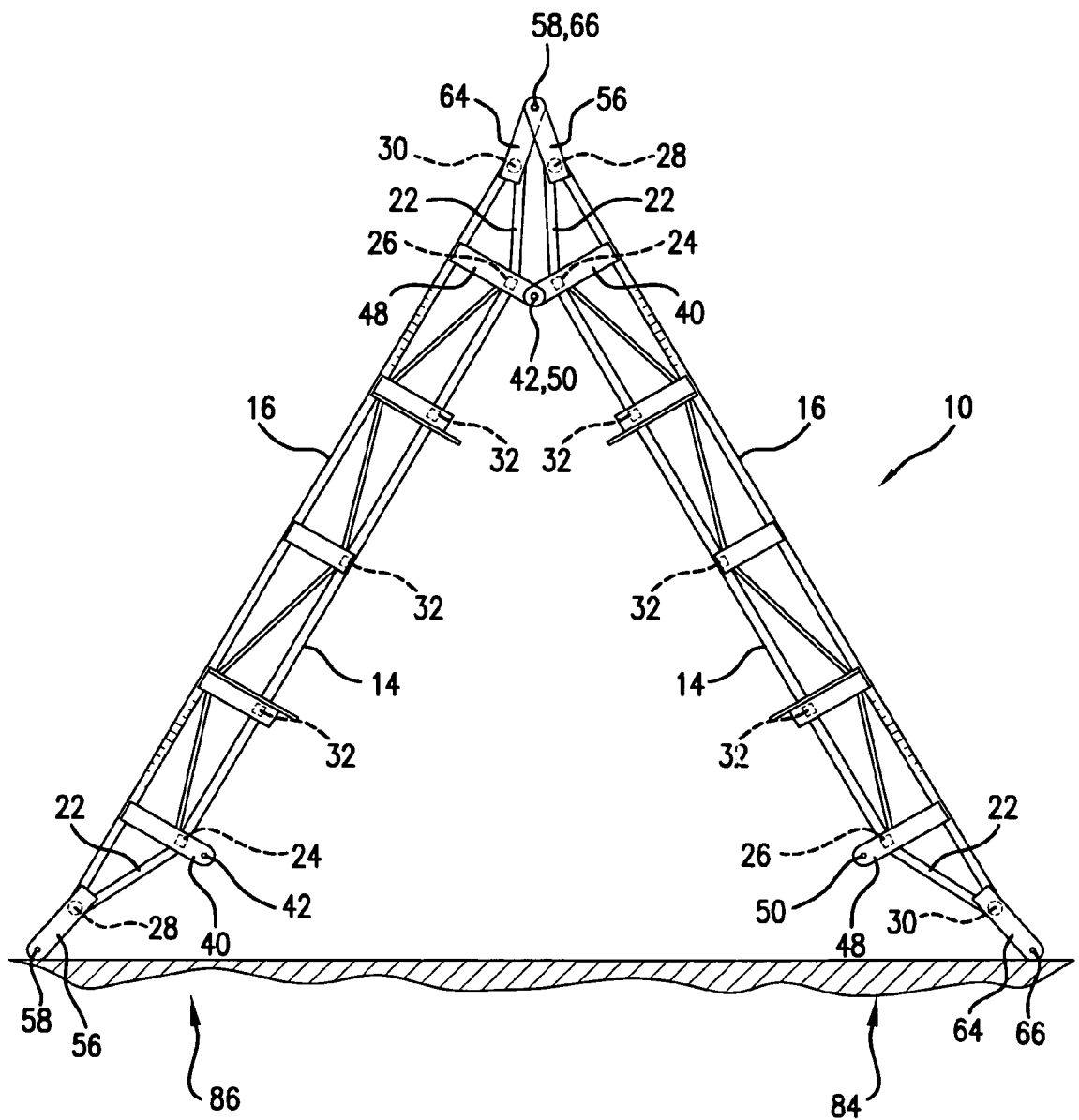
FIG. 7 is a side view of two units of the multiple use vehicle accessory attached to one another and used as a ladder in accordance with one exemplary embodiment of the present invention.

Although described as being used for purposes in connection with a vehicle 12, the first and second units 84 and 86 can be configured with respect to one another to find utility in other applications. FIG. 7 shows one such embodiment in which the units 84 and 86 are utilized as a ladder. Here, the projecting mounting members 44 and 48 and the longitudinal mounting members 60 and 64 of the first unit 84 are connected to the projecting mounting members 36 and 40 and the longitudinal mounting members 52 and 56 of the second unit 86. These connections are made with bolts, pins or other fasteners so that the connection is non-pivotable. An individual can use the cross members 32 and ends 24 and 26 as the rungs of a ladder in order to access an elevated location. In other embodiments, additional units of the multiple use vehicle accessory 10 can be connected to the bottoms of the first and second units 84 and 86 so as to extend the length of the ladder.

A line extending from aperture 38 of projecting mounting member 36 to aperture 54 of longitudinal mounting member 52 extends at an angle 112 that is 30° to a line extending parallel to the top of the longitudinally extending portion of the first rectangular member 14. The other apertures 42, 46, 50, 58 and 66 can be arranged in a similar manner so that they are also oriented at an angle of 30° to the longitudinal direction 18. In this manner, a third unit 88 could be attached to the first and second units 84 and 86 in FIG. 7 so that a triangle having 60° angles is formed. In other embodiments, the apertures 38, 42, 46, 50, 54, 58 and 66 can be oriented at various angles besides 30°. For example, the angular orientation of apertures 38, 42, 46, 50, 54, 58 and 66 can be from 20° to 70° in certain exemplary embodiments. Should the angular orientation be at 45°, four units can be arranged so as to form a square shaped structure. The 30° angle is also advantageous in that the units can be arranged in a triangular configuration for forming various structures as will be discussed. Further, the units can be arranged so that the angular orientation of apertures 38, 42, 46, 50, 54, 58 and 66 are different between different units.

Figure 8:
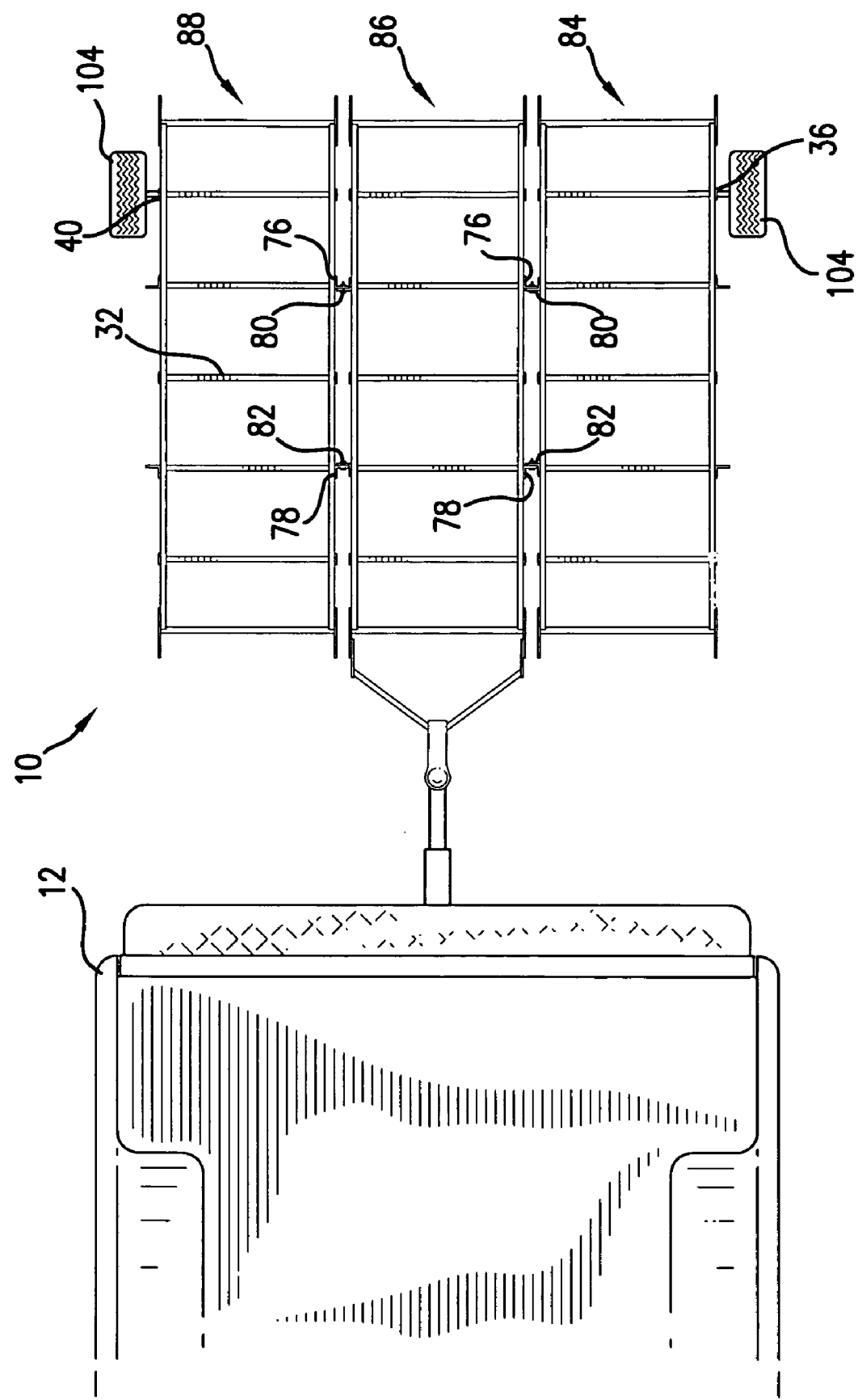
FIG. 8 is a top view of three units of the multiple use vehicle accessory attached to one another and used as a trailer in accordance with one exemplary embodiment of the present invention.

Other embodiments of the multiple use vehicle accessory 10 exist in which a third unit 88 is incorporated. FIG. 8 shows an embodiment in which three units 84, 86 and 88 are configured into a trailer. Here, the second unit 86 is located between the first unit 84 and the third unit 88. The mounting brackets 76, 78, 80 and 82 of the second unit 86 are non-pivotably connected to the mounting brackets 76 and 78 of the first unit 84 and to the mounting brackets 80 and 82 of the third unit 88. Wheels 104 are connected to the projecting mounting member 36 of the first unit 84 and to the projecting mounting member 40 of the third unit 88 and rotate thereon. The wheels 104 can be attached to spindles or to an axle that is disposed from the aperture 38 of the projecting mounting member 36 of the first unit 84 to the aperture 42 of the projecting mounting member 40 of the second unit 88. The trailer can be attached to the vehicle 12 for use in transporting objects located therein.

Figure 9:
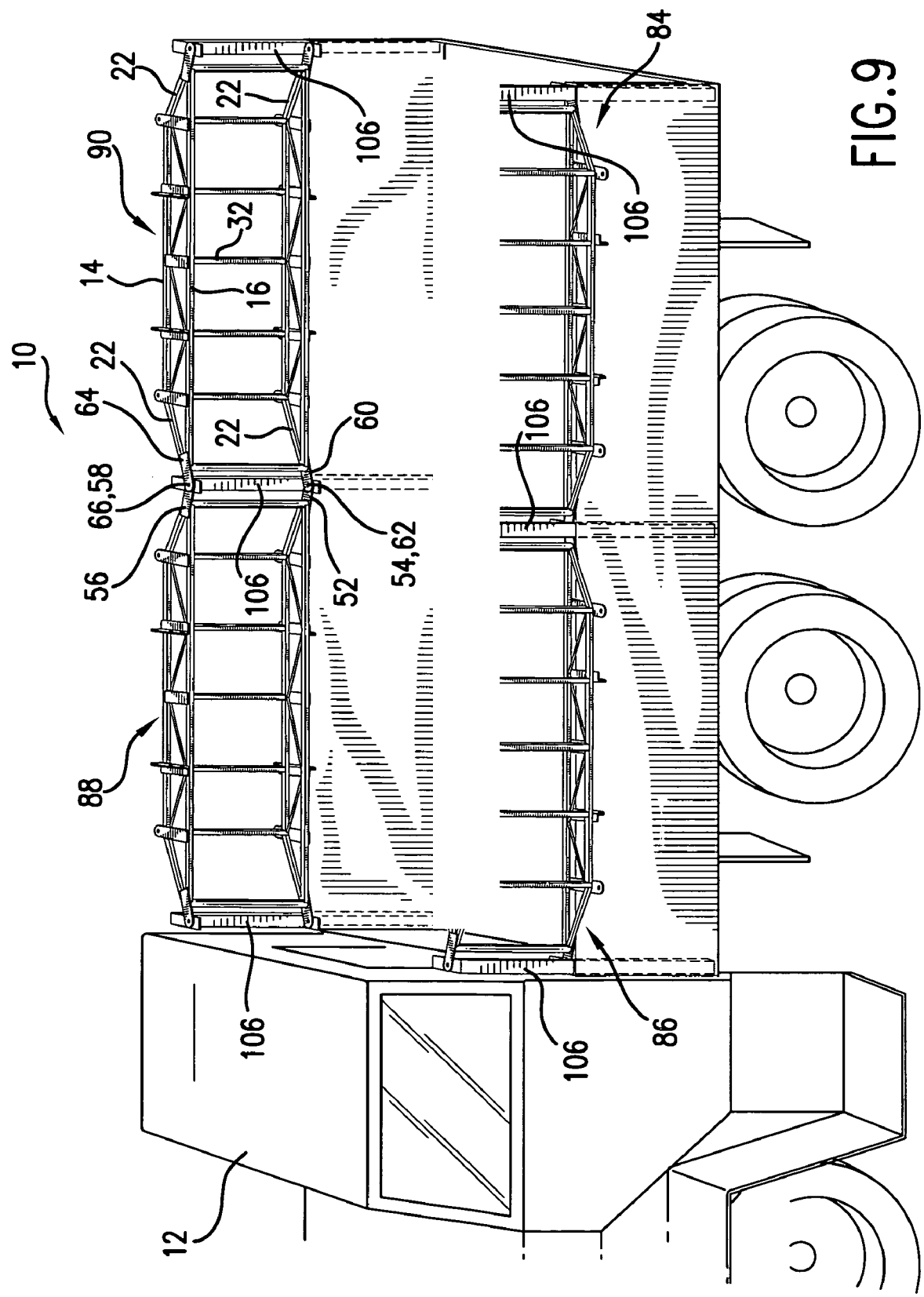
FIG. 9 is a perspective view of four units of the multiple use vehicle accessory used as bedsides of the vehicle in accordance with one exemplary embodiment of the present invention.

Three units 84, 86 and 88 of the multiple use vehicle accessory 10 can be arranged in a number of different manners to achieve various utility. For example, the units 84, 86 and 88 can be rigidly connected to one another in series so as to form a boom. Here, the projecting mounting members 36, 40, 44 and 48 in addition to the longitudinal mounting members 52, 56, 60 and 64 can be connected to one another. The boom may find utility in flipping a vehicle 12 that has become turned over on its side. The units 84, 86 and 88 can also be arranged as a deer stand. In this embodiment, the units 84, 86 and 88 can be attached to one another or may be attached to the tree as needed. Alternatively, the units 84, 86 and 88 may be arranged with one another so as to form a firewood stand. Here, the second unit 86 can be placed flat on the ground while the first unit 84 and the third unit 88 are connected to opposite ends of the second unit 86 and extend vertically. The three units 84, 86 and 88 can also be connected in a side by side arrangement for use in forming a raft. In another embodiment, the three units 84, 86 and 88 can be configured into an engine hoist. Here, the first and second units 84 and 86 can be rigidly connected and arranged in a substantially vertical manner. The third unit 88 can be pivotably connected to the top of the second unit 86 and a hook line can extend therefrom in order to be attached to the engine of the vehicle 12. The third unit 88 can be pivoted by the user with respect to the first and second units 84 and 86 in order to lift the engine. A rope or an additional unit may be used and may be connected to the first two units in order to increase the structural integrity of the engine hoist A fourth unit 90 may also be incorporated into the multiple use vehicle accessory 10 to achieve even greater utility. As shown in FIG. 9, the three units 84, 86, 88 and 90 are configured as bedsides of the vehicle 12. The units 84, 86, 88 and 90 can be attached to standards 106 of the vehicle 12 in a variety of manners. The units 84, 86, 88 and 90 find utility as bedsides of the vehicle 12 and can also be detached to be used in the variety of manners previously discussed. The units of the multiple use vehicle accessory 10 can be transported in the bed of the vehicle 12 or may be transported by being attached to the vehicle 12 as brush guards, windshield guards, spare tire holders, or as a front or rear luggage racks. One or more units may also be attached to the roof of the vehicle 12 and used as a roof top luggage rack. Other devices can be constructed with a plurality of units. For example, the units can be placed, either attached or unattached to one another, on top of an opening in the ground for use as a fox hole cover.

Multiple units can also be arranged with respect to one another to form a bridge. Here, one or more of the units can be arranged as the truss of the bridge while other units act as a ramp for the vehicle 12 and for the driving surface of the vehicle 12 over the bridge. Although a bridge can have one or more truss elements, other embodiments are possible in which multiple units are arranged to form a bridge that does not include a truss. Multiple units may be configured in series to produce a swamp bridge for traversing swampy or sandy terrain. Intermittent units can also be arranged at 90° angles to the units arranged in series to reinforce the structural integrity of the resulting swamp bridge or in response to a necessary point of placement.

Multiple units can also be arranged as a sandbag fort or as a hinged road block or gate. In other embodiments, the units can be configured into a box like structure. Items can be placed into the box and the box may be used as a parachute box for dropping supplies into a remote area.

Further, units can be arranged with respect to one another to form an A-frame or to form a tent. In this regard, first and second units 84 and 86 can be rigidly connected to one another and arranged in a vertical manner while third and fourth units 88 and 90 are offset but also rigidly connected and arranged in a vertical manner. A pole or other member can be disposed between the two sets of units and can be located at the top of the units. A canvas can be draped over the pole for use in forming the tent. Should a larger tent be desired, additional units can be rigidly connected to the bottom of the two sets of units. The two sets of units can then be moved farther apart and a larger pole and canvas can be employed to achieve a tent that is greater in size. The units can also be arranged in other embodiments so as to form scaffolding. As such, the multiple use vehicle accessory 10 can be arranged in a variety of manners to achieve items of various utility. It is to be understood that the previously described arrangements and items are only exemplary embodiments of the various uses of the multiple use vehicle accessory 10 and that other arrangements and items are possible in other embodiments.

Figure 13:
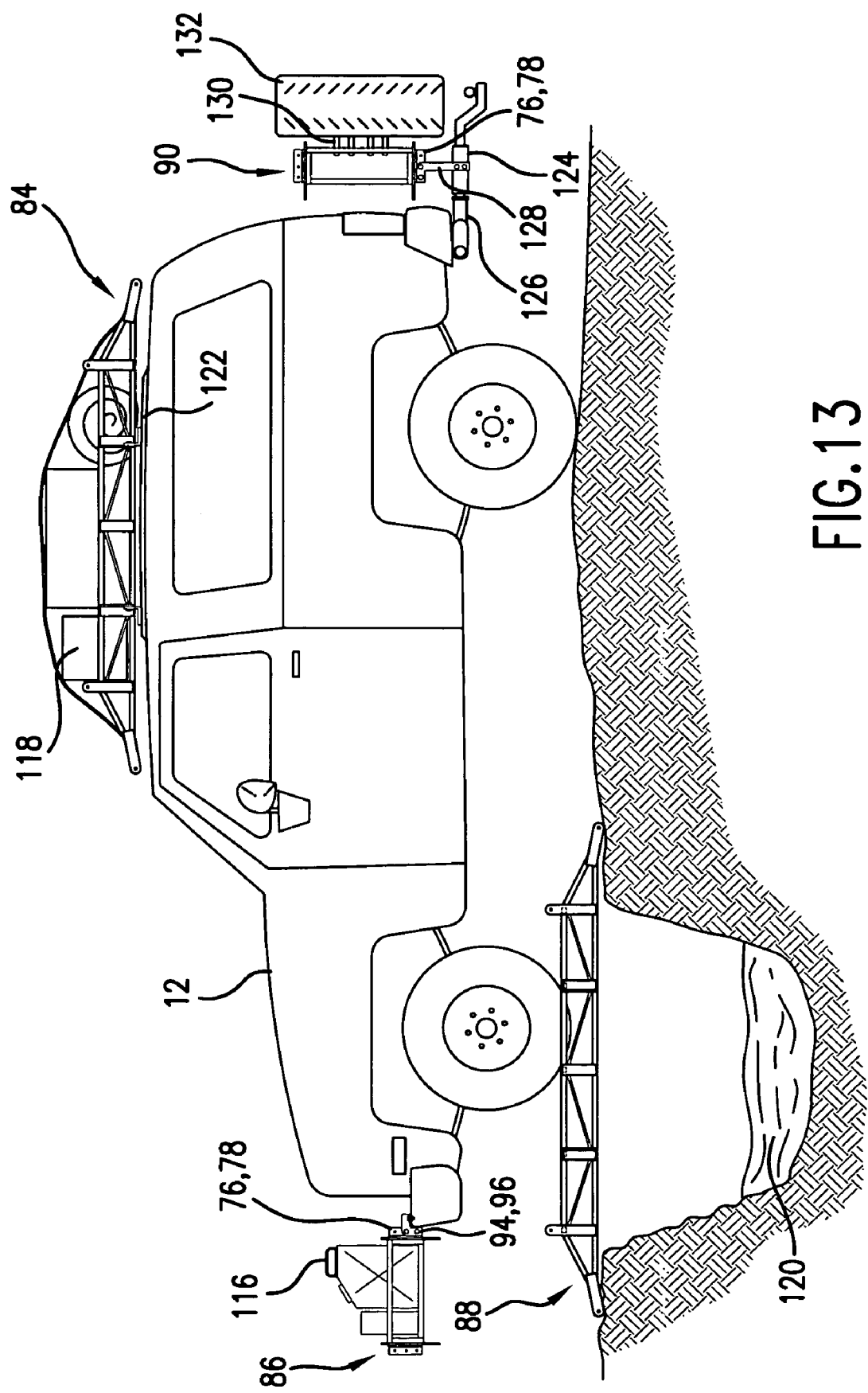
FIG. 13 is a side view of a sport utility vehicle implementing multiple use vehicle accessories in accordance with another exemplary embodiment of the present invention.
Figure 14:
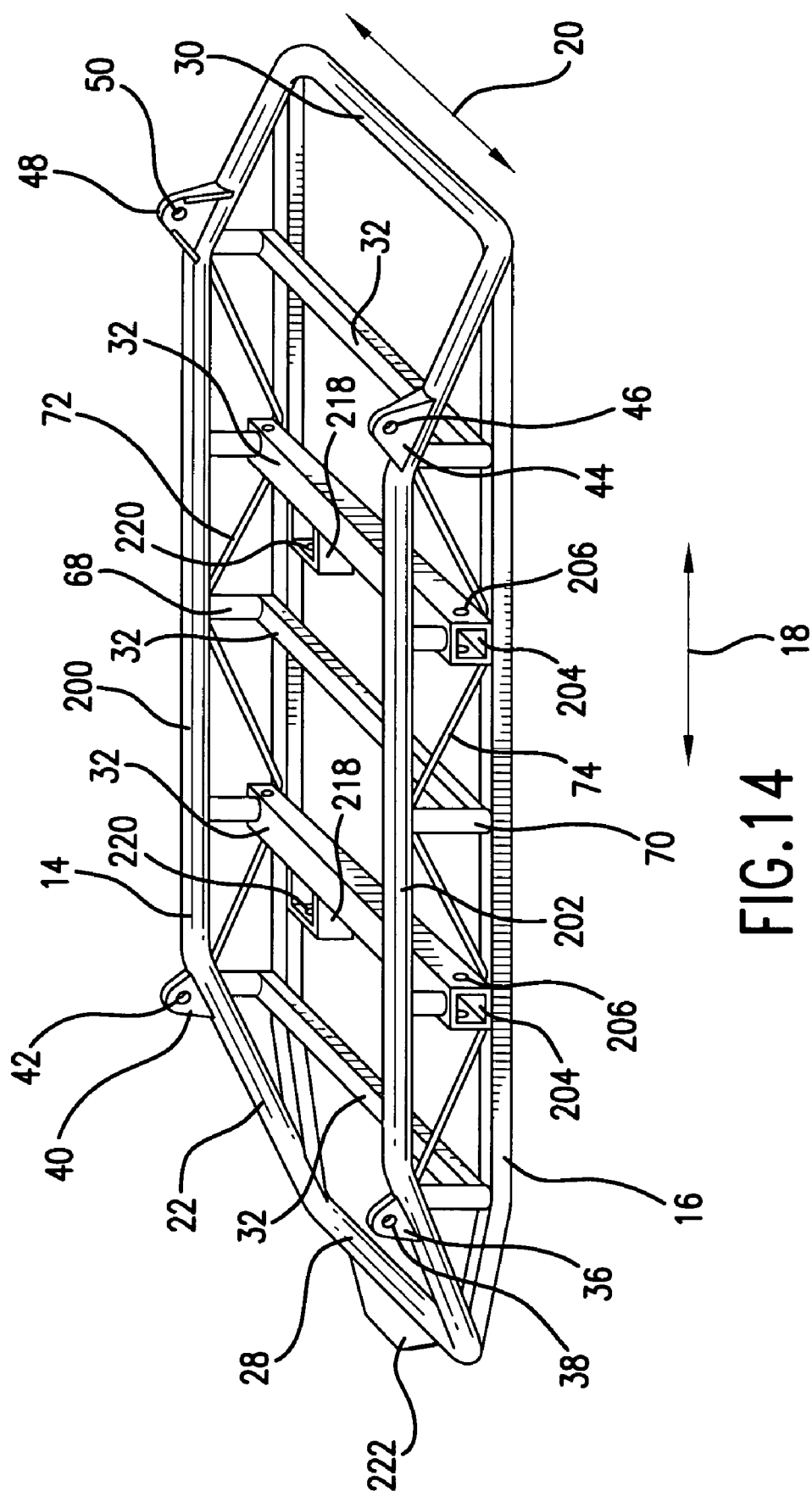
FIG. 14 is a perspective view of a multiple use vehicle accessory in accordance with another exemplary embodiment of the present invention.

FIG. 13 shows one exemplary embodiment of the present invention in which the multiple use vehicle accessory 10 is used in conjunction with a vehicle 12 that is a sports utility vehicle. It is to be understood, however, that the multiple use vehicle accessory 10 can be used with vehicles 12 other than a sports utility vehicle in accordance with various exemplary embodiments of the present invention. A first unit 84 is attached to the roof of the vehicle 12 through the use of mounting brackets 76, 78, 80 and 82 that engage a roof rack 122 of the vehicle 12. Camping equipment 118 can be placed inside of the first unit 84 and secured thereon with the use of rope and/or a canvas tarp. Although a single unit 84 can be placed onto the roof of the vehicle 12 for transportation purposes, additional units may also be placed onto the roof to allow for additional storage.

A second unit 86 is located at the front of the vehicle 12 and is likewise attached thereto through the use of mounting brackets 76 and 78. Attachment of this sort has been shown in relation to FIG. 1 as described above with the exception that the second unit 86 is oriented at 90° to that of FIG. 1. The second unit 86 provides additional storage capability for fuel 116 or other items to be transported by the sport utility vehicle 12. A pair of third units 88 are placed so as to span a creek 120. The third units 88 can be transported inside of the sport utility vehicle 12 or may be attached to the exterior of the vehicle 12 as desired. In one exemplary embodiment, the multiple use vehicle accessory 10 can be attached to the roof of the vehicle 12 and used as a roof rack until use as a bridge is needed. At such time, the multiple use vehicle accessory 10 can be removed from the roof and positioned across a creek 120 or other obstacle. The vehicle 12 can be driven over the pair of third units 88 so that the left side tires traverse one of the units 88 and the right side tires traverse the other unit 88.

FIG. 13 also shows a fourth unit 90 used with the vehicle 12. Here, a tow hitch attachment 124 is attached to a hitch 126 of the sport utility vehicle 12. The tow hitch attachment 124 has a bracket 128 that extends in the vertical direction and is spaced from the rear of the vehicle 12. The fourth unit 90 is mounted onto the bracket 128 through the use of mounting brackets 76 and 78. A plurality of tire studs 130 are mounted to portions of the fourth unit 90. The tire studs 130 may be mounted, for instance, to the cross members 32 of the fourth unit 90. A spare tire 132 is attached to the tire studs 130 in turn so that the forth unit 90 acts to retain the spare tire 132 to the sport utility vehicle 12.

The vehicle 12 that makes use of the multiple use vehicle accessory 10 can be any type of vehicle in accordance with various exemplary embodiments. For example, the vehicle 12 can be a car, truck, sport utility vehicle, boat, all terrain vehicle (ATV), or motorcycle in accordance with certain embodiments.

The units 84 and 86 of the present invention can be arranged with respect to one another in a number of ways in order to form devices that have various utility. The units 84 and 86 can be connected in series so that apertures 66 and 62 of one unit are aligned with apertures 38 and 42 of another in addition to having apertures 54 and 58 of one unit aligned with apertures 46 and 50 of another. A further configuration of the units 84 and 86 involves having the apertures 62 and 66 of one unit aligned with apertures 54 and 58 of another so that the second rectangular members 16 of the units 84 and 86 are in series with one another.

A further arrangement of the units 84 and 86 involves a connection between the units 84 and 86 as shown in the top of FIG. 7 in which the units 84 and 86 are connected so as to be angled with respect to one another. An additional arrangement of the units exits in which apertures 62 and 66 of one unit 84 are connected to apertures 62 and 66 of another unit 86. Also, apertures 54 and 58 of unit 84 are connected to apertures 54 and 58 of unit 86 so that the units 84 and 86 are stacked on top of one another and their second rectangular members 16 touch. The units 84 and 86 can also be arranged so that they are flipped in that the first rectangular members 14 touch. Here, apertures 46 and 50 of one unit 84 connect apertures 46 and 50 of unit 86, and apertures 38 and 42 of unit 84 connect to apertures 38 and 42 of unit 86.

A further arrangement exists in which apertures 62 and 66, or apertures 54 and 58, of one unit 84 connect to apertures of mounting brackets 80 and 82, or 76 and 78, of another unit 86. In this arrangement, the units 84 and 86 extend at right angles to one another. An additional embodiment exists in which the mounting brackets 76, 78, 80 and 82 themselves connect to one another. Such an embodiment is shown in FIG. 8. Although described as being connected to apertures in the previously described arrangements, it is to be understood that the units 84 and 86 can be connected via clamps, bolts or other mechanical fasteners so that the projecting mounting members, longitudinal mounting members, mounting brackets, cross members, first rectangular members or second rectangular members are connected.

Another exemplary embodiment of the multiple use vehicle accessory 10 is shown in FIGS. 14-18. The multiple use vehicle accessory 10 again includes a first member 14 and a second member 16. Although described previously as being rectangular in shape, the members 14 and 16 need not be rectangular but can assume any shape in accordance with various exemplary embodiments. The members 14 and 16 are longer in the longitudinal direction 18 than in the lateral direction 20. The first member 14 is shown as being made of a first component 200 and a second component 202 that are spaced from one another in the lateral direction 20 and are two separate components. However, other exemplary embodiments are possible in which the first member 14 is a single piece and is not made of two or more components 200 and 202.

End supports 22 are present and are attached to the ends of the first and second components 200 and 202 of the first member 14. The end supports 22 are again angled with respect to the longitudinal direction 18. The second member 16 forms an enclosed perimeter. However, it is to be understood that other exemplary embodiments are possible in which the second member 16 does not form an enclosed perimeter but instead has one or more openings. The second member 16 has an end 30 that extends generally in the lateral direction 20. A pair of supports 22 engages the second member 16 on either side of the end 30. The sides of the second member 16 extend generally in the longitudinal direction 18 but have portions proximate to end 28 that are angled with respect to the longitudinal direction 18. End 28 extends generally in the lateral direction 20. As shown with reference to FIG. 15, the sides of the second member 16 are located vertically above the ends 28 and 30. In this regard, the second member 16 may still be thought of as forming an enclosed perimeter as the downward portions can be considered part of its side or as part of the ends 28 and 30. The vertically offset arrangement of the second member 16 and ends 28 and 30 allows the multiple use vehicle accessory 10 to engage other multiple use vehicle accessories 10 in order to construct various items.

The multiple use vehicle accessory 10 shown in FIGS. 14-18 has four projecting mounting members 36, 40, 44 and 48 located thereon. The projecting mounting members 36, 40, 44 and 48 are shown as being located at the upper part of the end supports 22. However, in other embodiments the projecting mounting members 36, 40, 44 and 48 can be located on the first member 14 or may be located on both the first member 14 and the end supports 22. Although shown as defining apertures 38, 42, 46 and 50 the projecting mounting members 36, 40, 44 and 48 can be variously configured to be capable of connection with similar projecting mounting members of additional multiple use vehicle accessories 10 as previously described.

Figure 18:
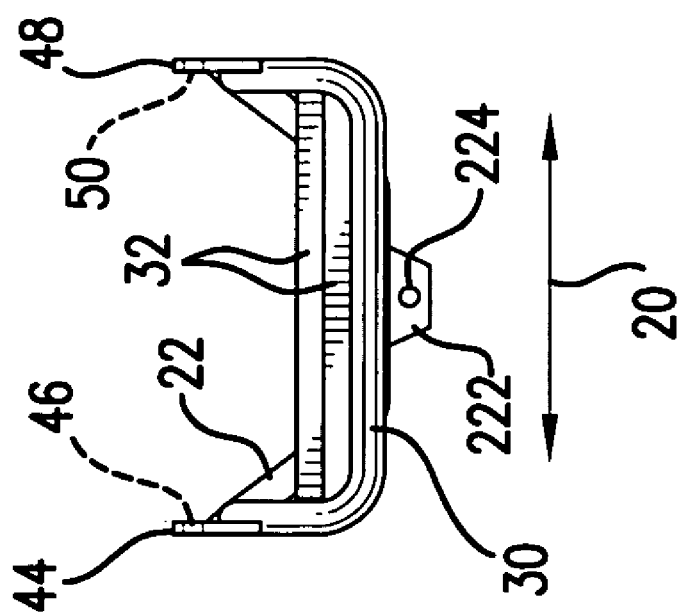
FIG. 18 is a back view of the multiple use vehicle accessory of FIG. 14.
Figure 17:
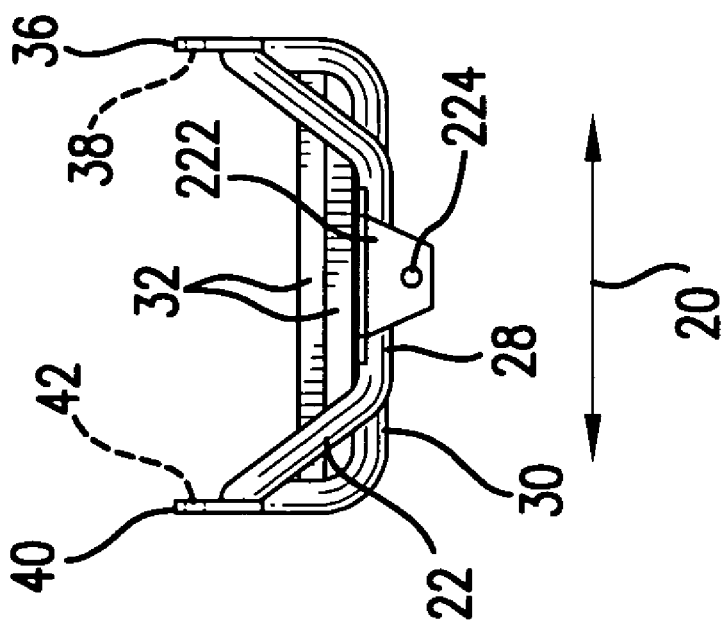
FIG. 17 is a front view of the multiple use vehicle accessory of FIG. 14.

The multiple use vehicle accessory 10 has a plurality of cross members 32. Although five cross members 32 are shown it is to be understood that any number may be present in accordance with various exemplary embodiments. As shown, the cross members 32 are sized and shaped differently. However, the cross members 32 may all be similarly arranged in other embodiments. Two of the cross members 32 define mounting apertures 204. The mounting aperture 204 can extend the entire distance through the cross members 32. Alternatively, the cross members 32 can have some solid portions so that the mounting apertures 204 extend only a portion of the distance therethrough. While shown as having a square shape, the mounting apertures 204 can be variously shaped in accordance with other exemplary embodiments. The cross members 32 define apertures 206 that are in communication with the mounting apertures 204. The cross members 32 are attached to and span the lateral distance between the sides of the second member 16. As shown in FIGS. 17 and 18 the cross members 32 are located vertically below the first member 14. The cross members 32 can be constructed so that they are capable of supporting the weight placed thereon through a tire of a vehicle 12 when driving over the multiple use vehicle accessory 10 when it is used as a bridge or as a traction device. The cross members 32 can be sized so that their length is long enough to accommodate the width of the tires of the vehicle 12. The tire of the vehicle 12 will move over and contact the ends 28 and 30 and the cross members 32 but will not necessarily contact the first member 14. However, it is to be understood that other arrangements are possible in which the cross members 32 can contact the first member 14. In this regard, the tire of the vehicle 12 may need to move upwards and downwards a greater elevation when traversing the multiple use vehicle accessory 10.

The multiple use vehicle accessory 10 also includes a pair of mounting brackets 218. The mounting brackets 218 are tied into corners formed through the intersections of cross members 32 and the second member 16. The mounting brackets 218 form a generally square aperture therethrough. Although shown as being square shaped, the mounting brackets 218 can be variously shaped in accordance with other exemplary embodiments. The mounting brackets 218 define apertures 220 therethrough. Any number of mounting brackets 218 can be present in other exemplary embodiments. A hooking member 222 is located on the end 28. The hooking member 222 has a side view as shown in FIG. 15 that is generally channel shaped, although other shapes are possible. An aperture 224 shown more clearly in FIGS. 17 and 18 is defined through the hooking member 222. The hooking member 222 may be arranged so as to extend vertically below the second member 16 and the end supports 22.

The mounting brackets 218 are utilized in order to orient the multiple use vehicle accessory 10 into a desired position. FIG. 19 shows one such orientation in which the multiple use vehicle accessory 10 is oriented into a vertical orientation. It may be desired, for instance, to utilize the multiple use vehicle accessory 10 as a brush guard. A vehicle engagement bracket 210 can be provided and may be bolted or otherwise secured onto a front portion of the vehicle 12. The vehicle engagement bracket 210 has a pair of mounting posts 208 that each define an aperture 212. The mounting posts 208 are sized and configured so as to receive the mounting apertures 204. The multiple use vehicle accessory 10 can thus be positioned over the mounting posts 208 so as to be oriented into a vertical position for use as a brush guard or as bedsides of the vehicle 12. Upon positioned the mounting posts 208 into the mounting apertures 204, the apertures 212 will align with the apertures 220. A pin 214 can be disposed through both of the apertures 204 and 212 and retained therein through the use of a clip 216. The pin 214 and clip 216 can thus function to help retain the multiple use vehicle accessory 10 to the mounting posts 208 to maintain the multiple use vehicle accessory 10 in the vertical position. Although described as being connected to the vehicle engagement bracket 210, the mounting posts 208 need not be connected to the vehicle engagement bracket 210 in other embodiments. For example, the mounting posts 208 can be attached directly to a portion of the vehicle 12.

Figure 20:
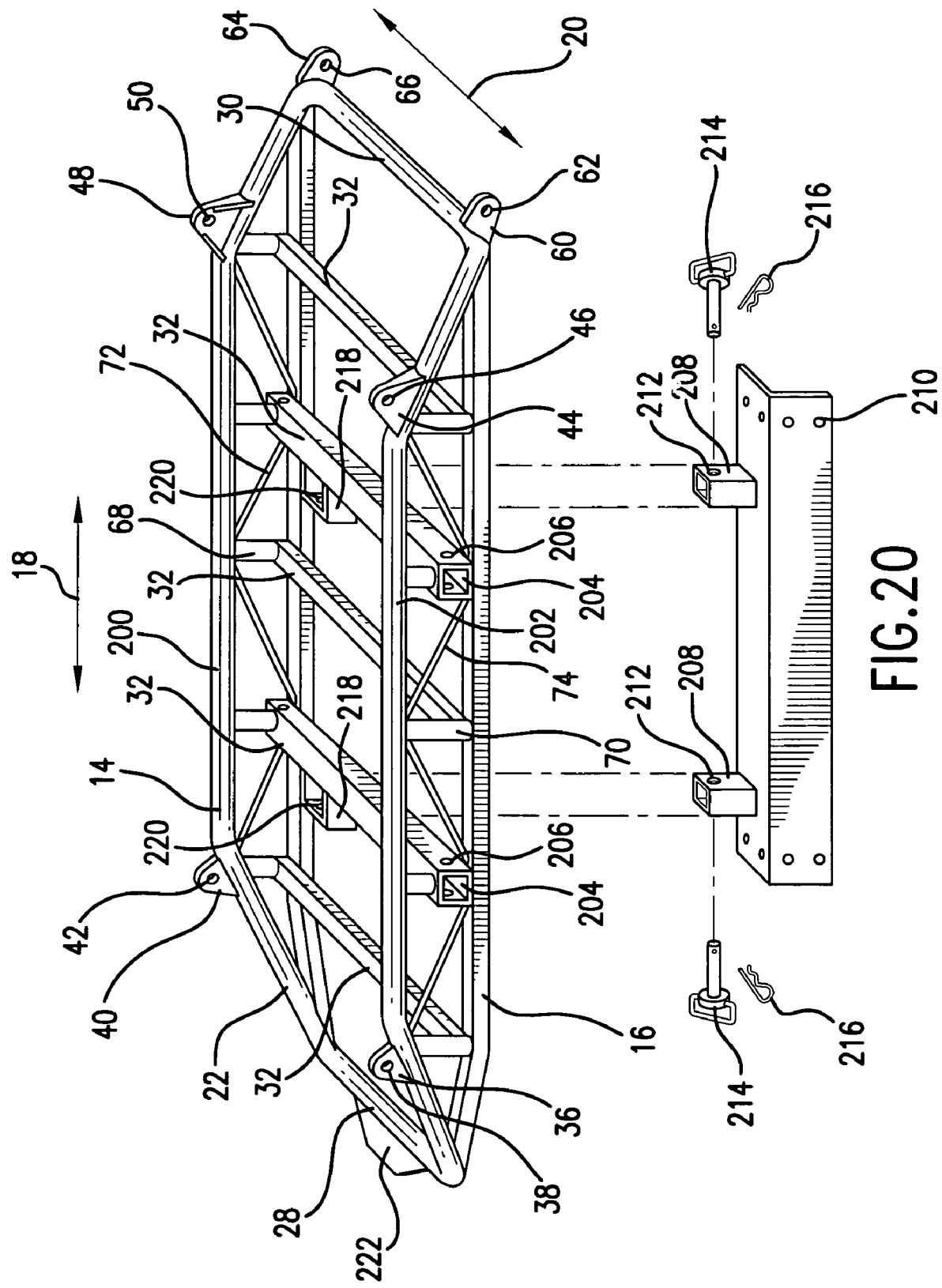
FIG. 20 is a perspective view of a multiple use vehicle accessory in accordance with one exemplary embodiment shown oriented with respect to a vehicle engagement bracket to act as a luggage rack.

FIG. 20 shows another exemplary embodiment of the multiple use vehicle accessory 10. The embodiment in FIG. 20 is substantially similar to that of FIGS. 14-19. However, the multiple use vehicle accessory 10 in FIG. 20 also includes longitudinal mounting members 60 and 64 that each define apertures 62 and 66. The longitudinal mounting members 60 and 64 can be arranged and can function as previously described with respect to other exemplary embodiments and as such a repeat of this description is not necessary. The longitudinal mounting members 60 and 64 are located on the female end 30 of the second member 16. In other arrangements, the longitudinal mounting members 60 and 64 may be located on the male end 28 or may be located on both the female end 30 and the male end 28.

The multiple use vehicle accessory 10 can be oriented as shown in FIG. 20 into a horizontal position for use as a luggage rack. In this regard, although described as luggage rack it is to be understood that luggage is not necessarily required to be placed upon the multiple use vehicle accessory 10 but that other items may be placed thereon. A vehicle engagement bracket 210 may again be provided with mounting posts 208. The mounting brackets 218 can be positioned over the mounting posts 208 in order to orient the multiple use vehicle accessory 10 into a horizontal position. The apertures 220 of the mounting brackets 218 can align with the apertures 212 of the mounting posts 208 and pins 214 and clips 216 can be used in order to secure these components together so that the multiple use vehicle accessory 10 is securely attached to the vehicle engagement bracket 210 in the horizontal position.

Figure 21:
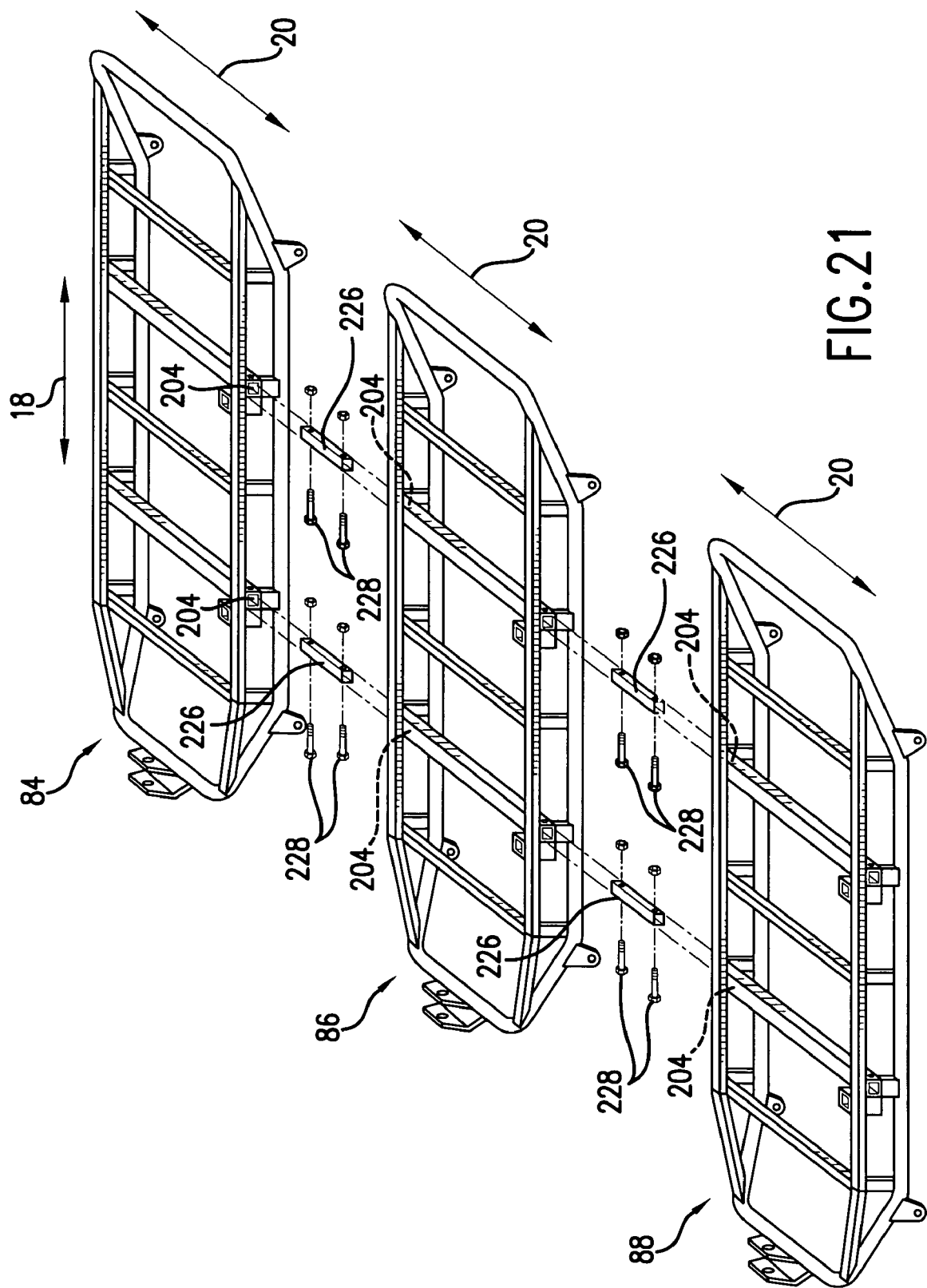
FIG. 21 is an exploded perspective view of multiple units of the multiple use vehicle accessory of FIG. 14 when configured for use as a trailer or for other various uses.

FIG. 21 shows an exploded view of the multiple use vehicle accessory 10 when configured for use as a trailer. As shown, a first unit 84, second unit 86 and a third unit 88 are present and are arranged next to one another in a side by side fashion. The units 84, 86 and 88 are arranged so that their mounting apertures 204 are side by side. A plurality of engaging members 226 can be present. The engaging members 226 can be inserted into the mounting apertures 204 and may be attached thereto through the use of fasteners 228. In this manner, the units 84, 86 and 88 can be attached to one another when used, for example, as a trailer as illustrated in a different exemplary embodiment in FIG. 8.

The multiple use vehicle accessory 10 can be arranged in a variety of manners in accordance with various exemplary embodiments. As shown in FIG. 22, units 84, 86 and 88 can be aligned in a generally linear manner to form a bridge or traction surface for a vehicle 12 when attempting to cross difficult terrain. The hooking member 222 of the first unit 84 can be placed over the end 30 of the second unit 86. Fasteners, such as a bolt or pin, can be inserted through the aperture 224 in order to secure the hooking member 222 to the end 30. In a similar manner, the hooking member 222 of the second unit 86 can be inserted over the end 30 of the third unit 88 and retained thereon through the use of a fastener. Although shown as being hooked onto the ends 30 of the units 86 and 88, the hooking member 222 can be hooked over one of the cross members 32 and retained thereon in accordance with other exemplary embodiments. Although described as being fastened, the hooking member 222 need not be fastened to the cross members 32 or the ends 30. The hooking member 222 can simply be fit over the cross member 32 or end 30 and held in place through a friction fit or through gravity or through the interlocking manner of the particular orientation of the various multiple use vehicle accessories 10.

An angled bridge is formed in FIG. 23 which makes use of a first unit 84 and a second unit 86. The first and second units 84 and 86 are oriented so that the hooking member 222 of the first unit 84 is secured to a cross member of the second unit 86. The second unit 86 is oriented at an angle to the first unit 84. The angled bridge may be used to allow a vehicle 12 to negotiate an obstacle 230. The vehicle 12 can first drive over the second unit 86 and can subsequently drive over the first unit 84. The units 84 and 86 are arranged in this manner in order to reduce the steepness at which the vehicle 12 must climb in order to negotiate the obstacle 230.

The front end of the multiple use vehicle accessory 10 can be angled or reduced in size in the lateral direction 20 in order fit within the female end or at parts along the length of the multiple use vehicle accessory 10. In this regard, the male end can be the portion of the multiple use vehicle accessory 10 that includes the 28 and the female end can be the portion of the multiple use vehicle accessory 10 that has the end 30. End 28 and portions of the second member 16 and end supports 22 can be shorter in the lateral direction 20 so as to be able to fit between the first member 14 along at least some of the length of the first member 14 and can be shorter in the lateral direction 20 to fit between the end supports 22 proximate to the end 30.

As with previously described exemplary embodiments, the multiple use vehicle accessory 10 shown in FIGS. 14-23 can have components that are of any cross sectional shape. For example, the first member 14, second member 16, cross members 32, and end supports 22 may all be of the same cross sectional shape or may be of various cross sectional shapes. Further, the multiple described components of the multiple use vehicle accessory 10 can be integrally formed pieces or may be separate components that are attached to one another through various means such as welding or mechanical fasteners. For example, the first component 14, end supports 22 and ends 28 and 30 may be integrally formed with one another while the remaining portions of the second component 16 and cross members 32 are separate components that are subsequently attached through welding. As such, it is to be understood that although described as being attached it is to be understood that this is broad enough to cover situations in which the components are integrally formed with one another, secured to one another through welding or mechanical fasteners or through some other means.

The multiple use vehicle accessory 10 can be used in conjunction with or to support a variety of vehicles 12. For example, cars, trucks, SUVs, tanks, military vehicles, lawn mowers or ATVs may be supported or may be used in conjunction with the multiple use vehicle accessory 10. The multiple use vehicle accessory 10 may be wide enough in the lateral direction 20 to only allow one side of tires of the vehicle 12 to be capable of traversing across. In these instances, one or more multiple use vehicle accessories 10 can be oriented in order to allow the other side of tires of the vehicle 12 to travel across. However, it is to be understood that in certain exemplary embodiments, the multiple use vehicle accessory 10 is wide enough to allow both the left and right side tires of the vehicle 12 to traverse across.

Various dimensions and placement of components of the multiple use vehicle accessory 10 can be made in accordance with various exemplary embodiments. For example, the spacing between the projecting mounting member 36 and the projecting mounting member 40 may be less than the spacing between the cross members 32 that have the pair of mounting apertures 204 shown in FIG. 14. In this regard, the projecting mounting members 36 and 40 can be mounted to the cross members 32 so that a pail of multiple use vehicle accessories 10 can be oriented in a generally perpendicular orientation to one another. Further, the spacing between the projecting mounting member 44 and the projecting mounting member 48 can be made smaller than the spacing between the cross members 32 that have the apertures 206 to allow for their connection.

In accordance with one further exemplary embodiment, the lateral spacing of portions of the second member 16 can be reduced so that these portions are shorter in the lateral direction 20 than portions of the first member 14 that may be generally above. This type of spacing will allow for multiple units of the multiple use vehicle accessory 10 to be nested and stacked upon one another. Further, varying the spacing allows the male portion of the multiple use vehicle accessory 10 to be inserted and attached to various cross members 32 of another unit.

As discussed, the multiple use vehicle accessory 10 can be used in a variety of applications. In one such example, a first unit 84 can be provided and a second unit 86 can be arranged therewith. Second unit 86 can be turned upside down from the first unit 84. The various projecting mounting members of the units 84 and 86 can be attached to one another in order to effect attachment of the units 84 and 86 so that the two units 84 and 86 can be used a jack.

As previously discussed, any number of multiple use vehicle accessories 10 can be attached and configured with one another in order to provide numerous structures for a variety of uses. FIGS. 24-28 show several examples of various structures that can be constructed by the multiple use vehicle accessory 10. It is to be understood, however, that the disclosed strictures are only certain examples and that numerous other structures are possible in accordance with various exemplary embodiments.

Figure 24:
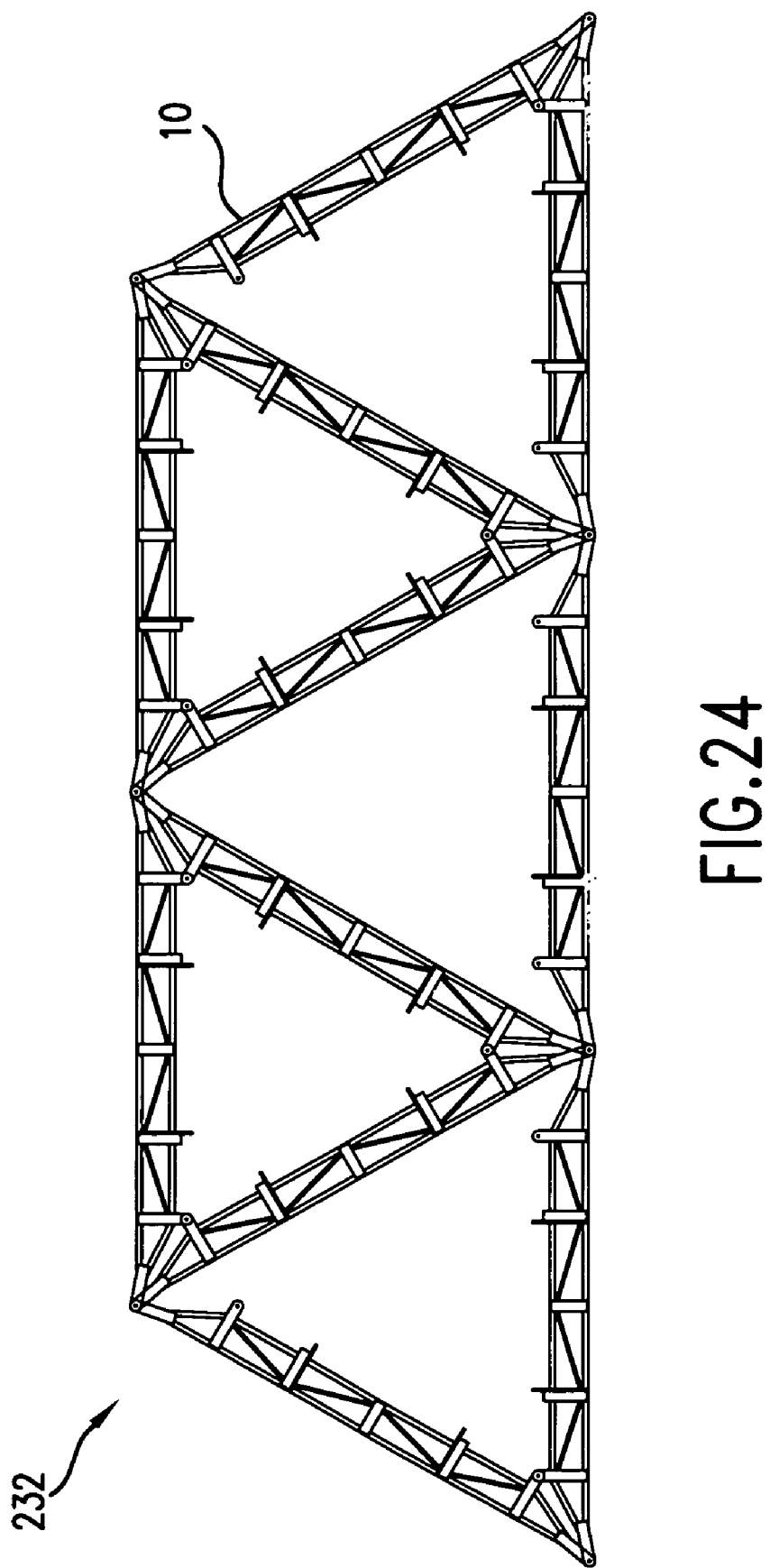
FIG. 24 is a side view of a plurality of multiple units arranged in a truss formation in accordance with one exemplary embodiment.

FIG. 24 shows a plurality of units 232 arranged in a truss configuration. The truss configuration can be used in order to build a bridge over which vehicles 12 such as trucks, ATVs or tanks can cross. In this regard, a pair of truss configurations can be constructed and a further plurality of units 232 can be set across the truss configurations to form the bridge structure. The plurality of units 232 can be attached to one another as previously discussed.

Figure 25:
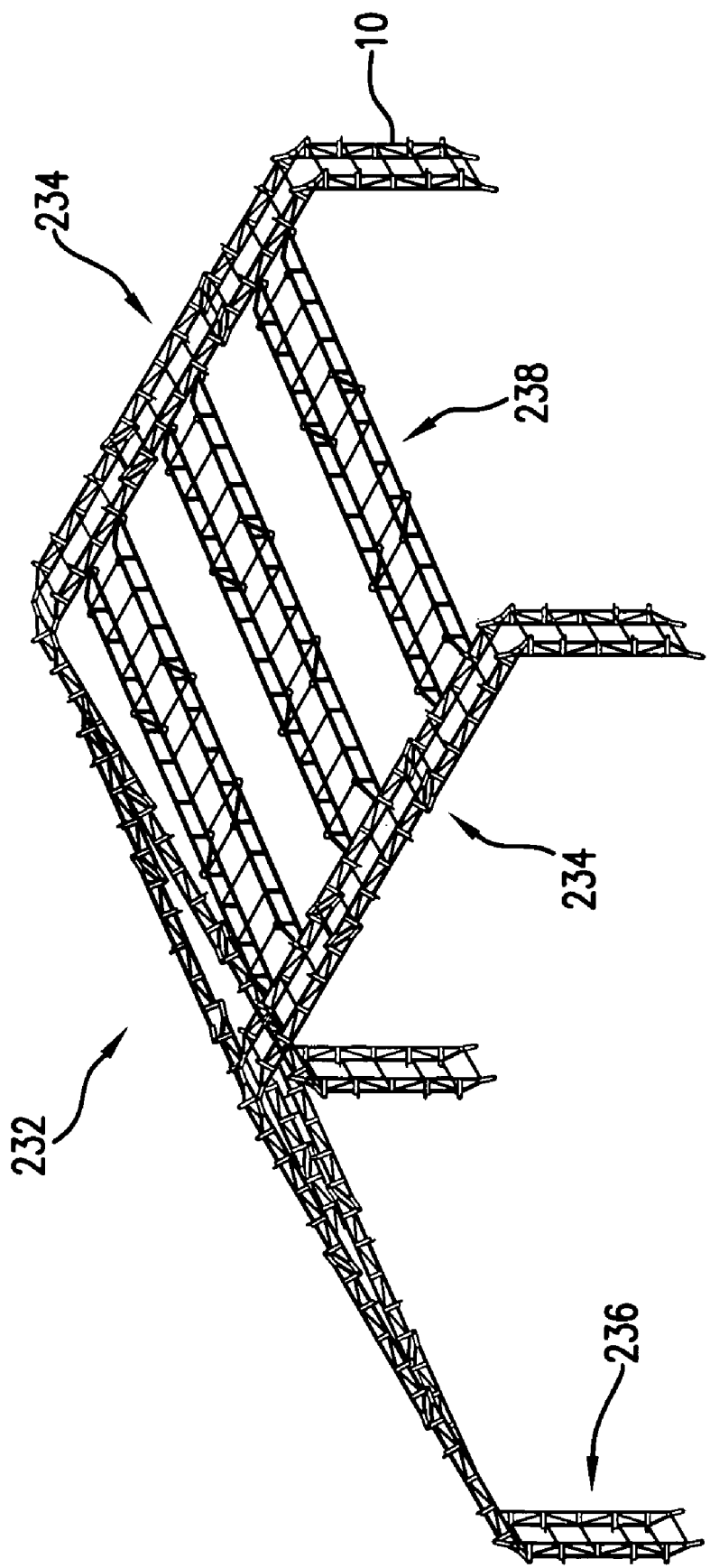
FIG. 25 is a perspective view of a plurality of multiple units arranged in a shelter configuration in accordance with one exemplary embodiment.

FIG. 25 is a shelter construction of a plurality of units 232. Four of the units 232 can be set in a vertical orientation and used as vertical supports 236 to provide height to the shelter. Other units 232 can be attached to the vertical supports 236 in order to form a pair of arch assemblies 234 on either end of the shelter construction. The arch assemblies 234 can be tied together through the use of a plurality of units 232 that function as cross assemblies 238. Once constructed, tarp, canvas or other suitable material can be draped over the top of the construction in order to provide a suitable enclosure. As shown, the plurality of units 232 can be arranged and attached to one another in a variety of manners as previously discussed.

Figure 26:
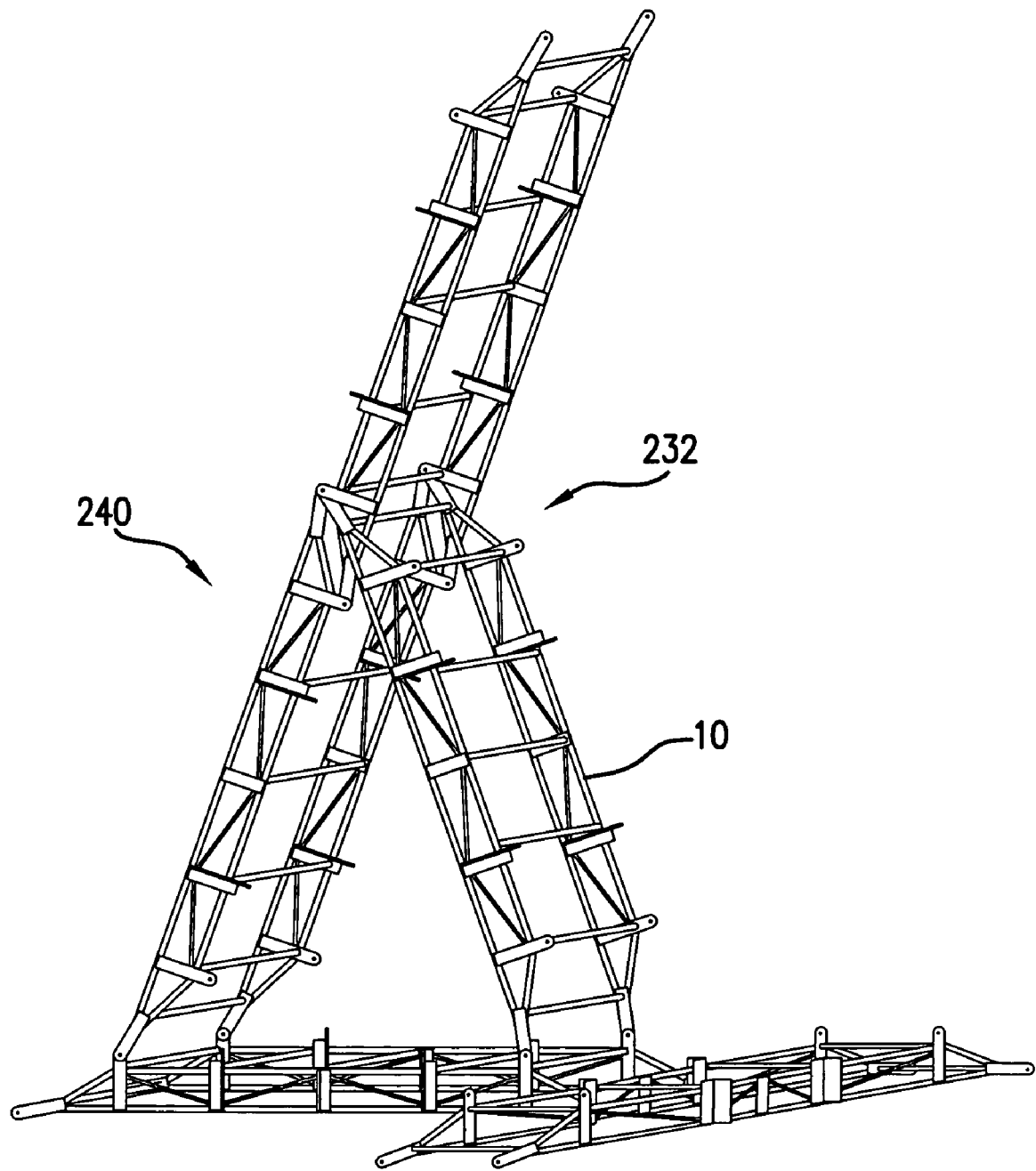
FIG. 26 is a perspective view of a plurality of multiple units arranged in a ladder configuration in accordance with one exemplary embodiment.

A further configuration of the plurality of units 232 is illustrated in FIG. 26. Here, the units 232 are arranged and connected so as to form a ladder 240. In this regard, the units 232 are set up so that an extended portion of the ladder 240 is supported at its midpoint by a unit 232 and at its base by a pair of units 232. As such, the ladder 240 can be constructed so that it enjoys a high degree of stability without the need to be supported by a separate structure. Alternatively, the ladder 240 can be arranged so that it is at least partially supported by a structure other than another unit 232.

Figure 27:
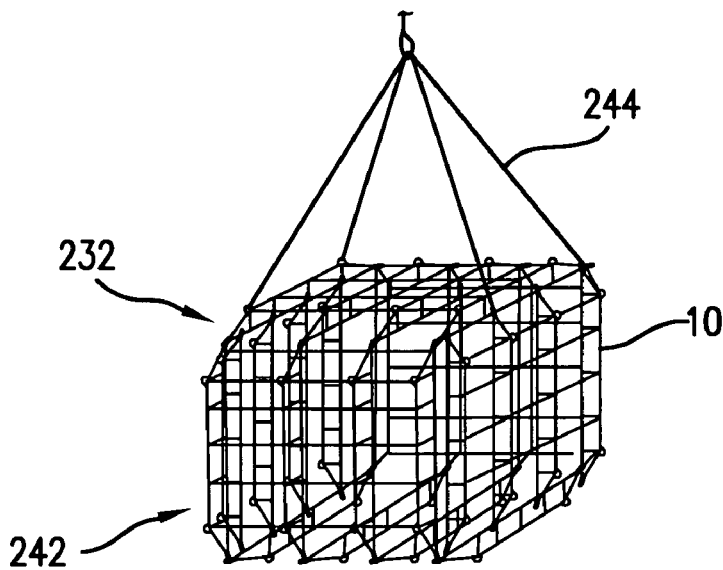
FIG. 27 is a perspective view of a plurality of multiple units arranged in a parachute box configuration in accordance with one exemplary embodiment.

A further example of a configuration of the plurality of units 232 can be seen in FIG. 27. Here, the units 232 are arranged in a box-like formation so as to form a parachute box 242. Such an arrangement may be advantageous for military applications. For example, the parachute box 242 can be partially constructed and then filled with a variety of items such as weapons, food, water, clothing or other equipment. Once desirably filled, the remaining units 232 can be attached in order to form the structure shown in FIG. 27. A parachute can then be attached to the structure. Parachute lines 244 are shown that can be attached to the plurality of units 232 so that they and any items contained therein can be safely deployed to a desired drop location. Once retrieved by military personnel, the parachute box 242 can be opened and the contents retrieved. Additionally, the parachute box 242 can be disassembled by the military personnel and then reconstructed into a desired structure such as a bridge, ramp, sand fort 246, lever or shelter.

Figure 28:
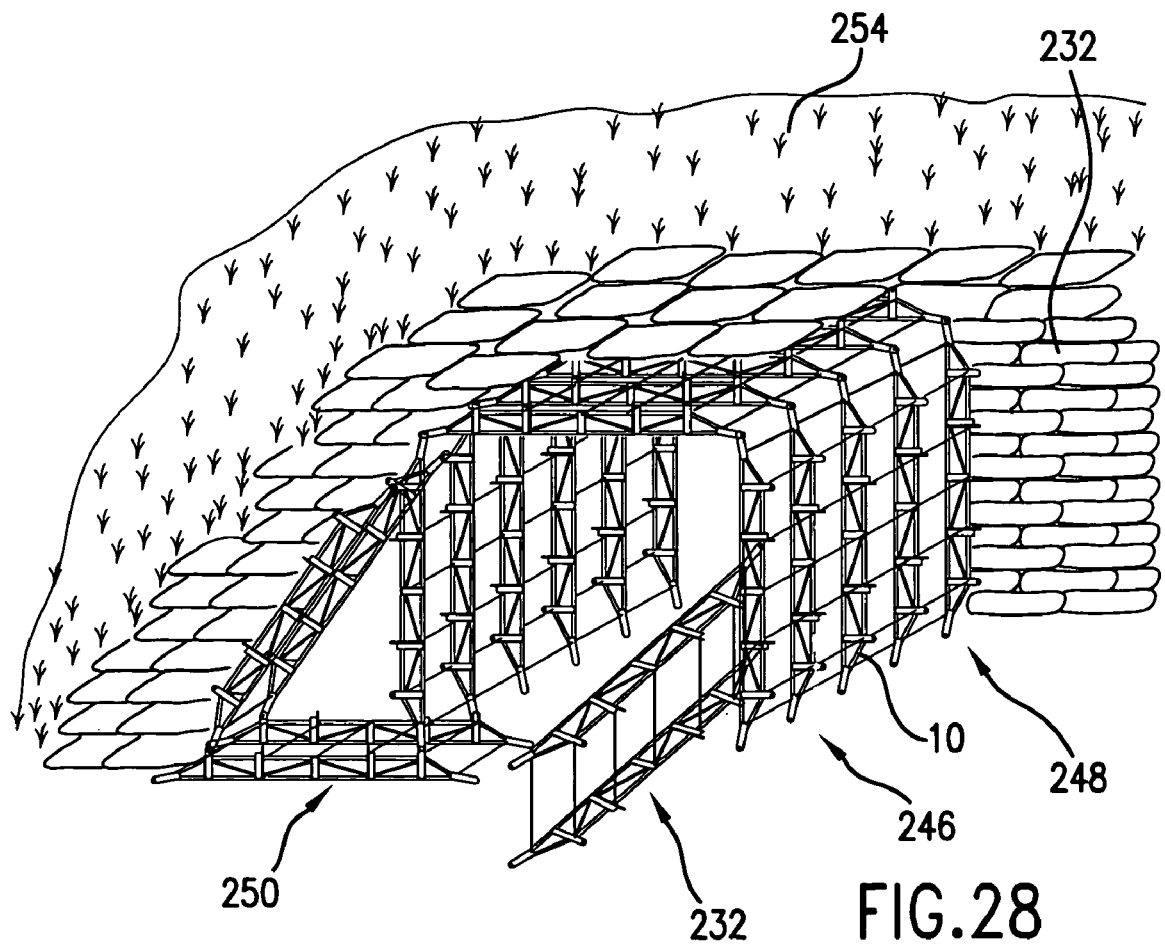
FIG. 28 is a perspective view of a plurality of multiple units arranged in a sand fort configuration in accordance with one exemplary embodiment.
Figure 29:
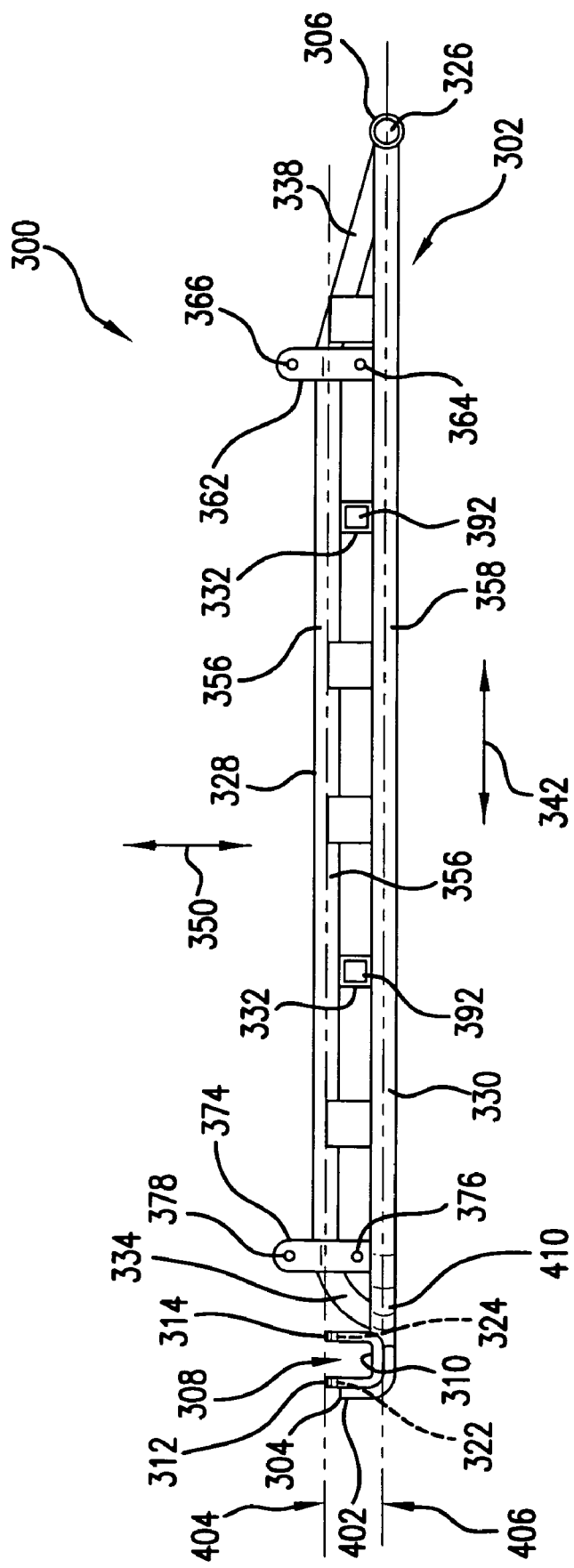
FIG. 29 is a side view of a multiple use vehicle accessory in accordance with another exemplary embodiment.
Figure 30:
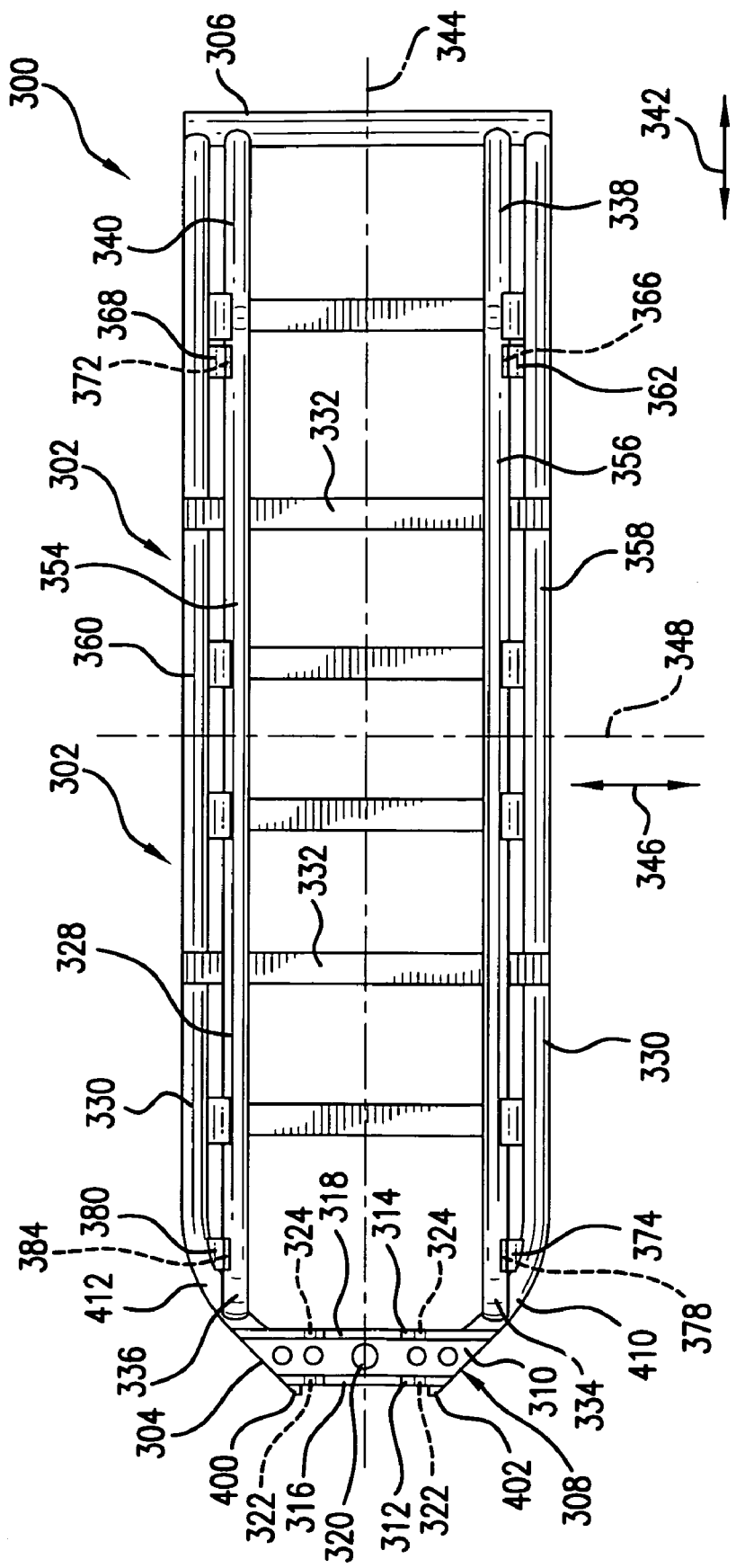
FIG. 30 is a top view of the multiple use vehicle accessory of FIG. 29.
Figure 31:
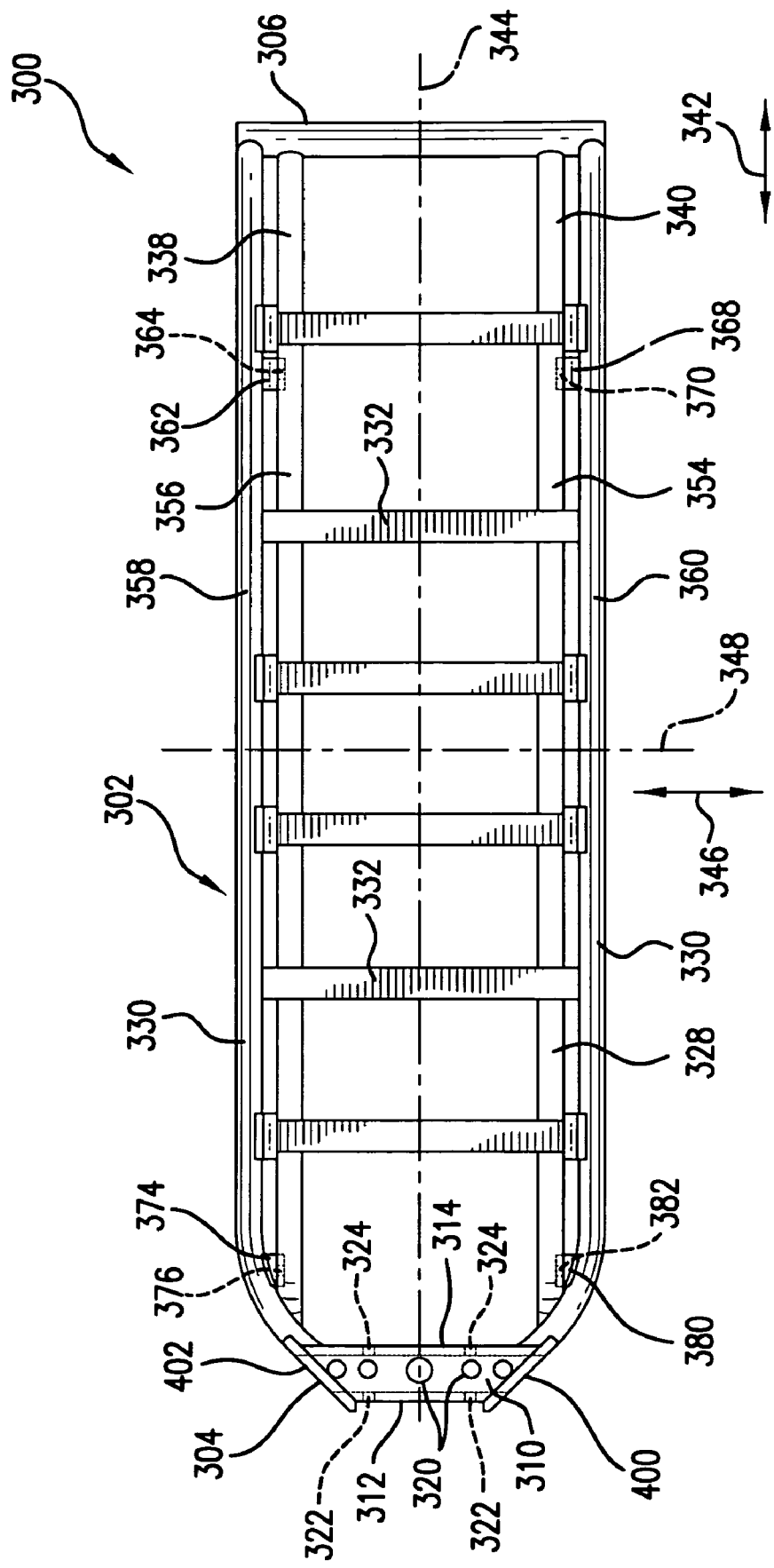
FIG. 31 is a bottom view of the multiple use vehicle accessory of FIG. 29.
Figure 32:
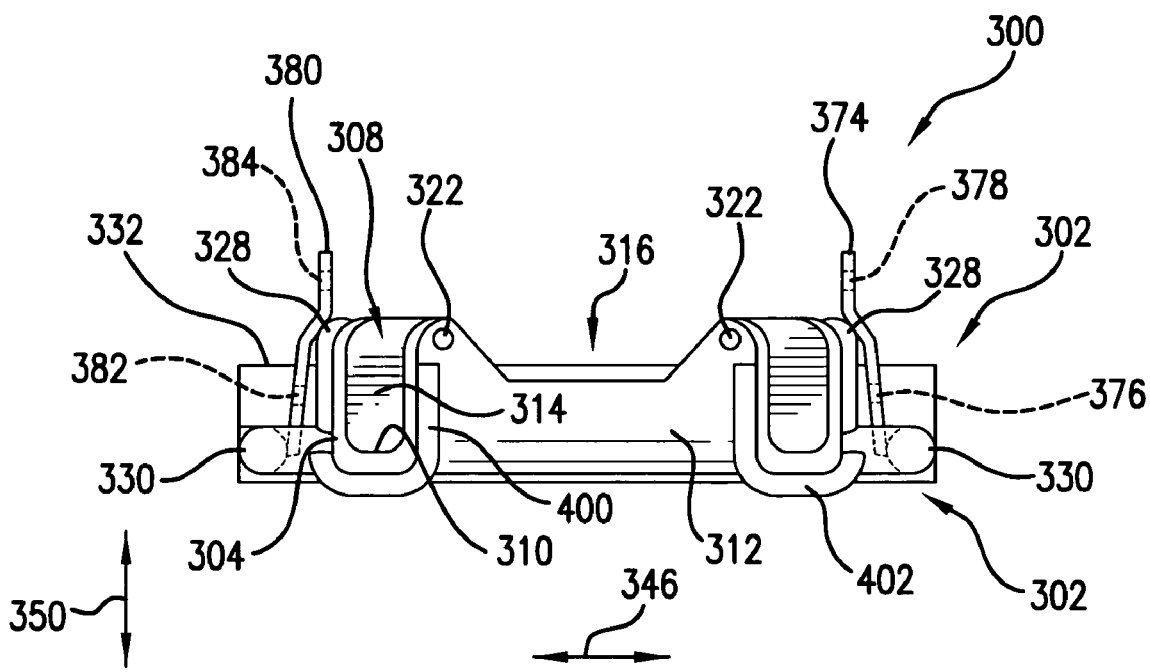
FIG. 32 is a front view of the multiple use vehicle accessory of FIG. 29.
Figure 33:
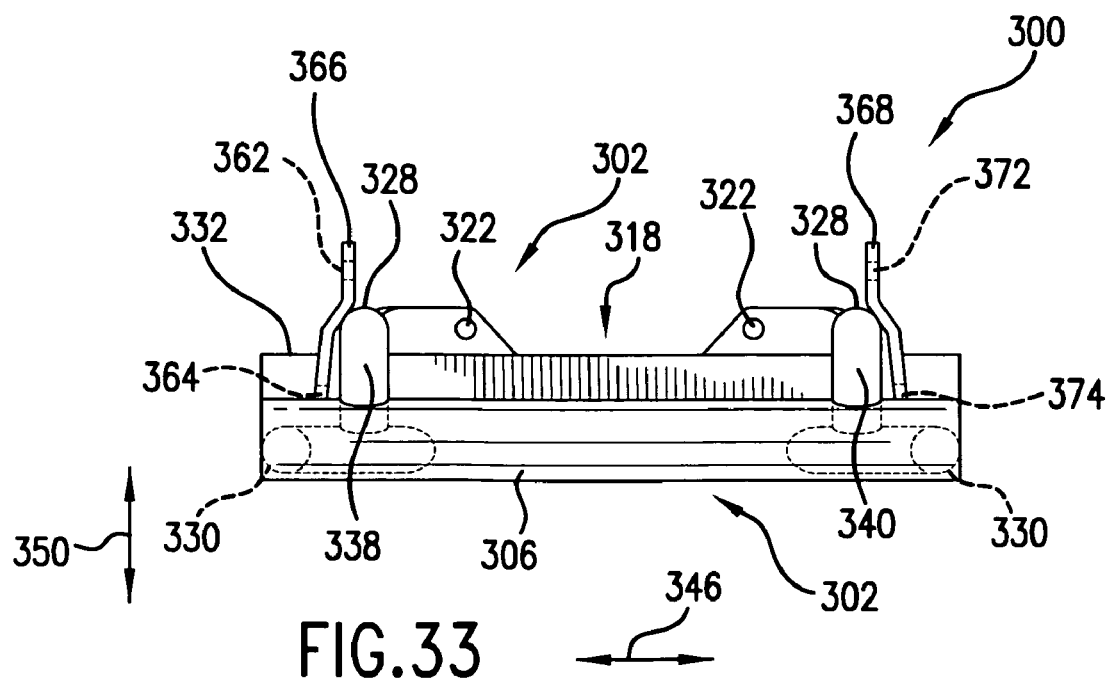
FIG. 33 is a back view of the multiple use vehicle accessory of FIG. 29.

FIG. 28 shows the plurality of units 232 arranged as a sand fort 246. The sand fort 246 may be constructed by military personnel from components of a parachute box 242 as previously discussed or may be made from other units 232. The sand fort 246 is composed of units 232 that are arranged as an enclosure 248 that is generally channel shaped. Additional units 232 can be utilized as side supports 250 and attached to the sides of the enclosure 248 in order to support the constructed structure. Sand bags 252 can be placed around the sand fort 246, that may be located adjacent a hillside 254, in order to form one side of the enclosure. However, the sand bags 252 and hillside 254 need not be present in accordance with other exemplary embodiments. Canvas, tarp or other material can be placed over the enclosure 248 in order to provide necessary shelter to the occupants or equipment located inside of the sand fort 246.

Another exemplary embodiment of the multiple use vehicle accessory 300 is illustrated in FIGS. 29-33. The multiple use vehicle accessory 300 includes a frame 302 that has a first end 304 located on one end and a second end 306 located on an opposite end. As shown, the first end 304 has a front side wall 312 and a rear side wall 314 that extend upwards from a bottom wall 310. The bottom wall 310, front side wall 312 and rear side wall 314 define a channel 308 that extends in the lateral direction 346 of the multiple use vehicle accessory 300. The front side wall 312 defines a first cut-out section 316, and the rear side wall 314 defines a second cut-out section 318. The cut-out sections 316 and 318 are located on the ends of the walls 312 and 314 that are opposite from the bottom wall 310. The bottom wall 310 may have opposite lateral ends that are not parallel to one another in the longitudinal direction 342 but are instead angled towards the longitudinal axis 344 in the direction away from the frame 302.

The bottom wall 310 defines a number of bottom wall apertures 320 therethrough. A tow ball of a vehicle 12 may be disposed through one of the bottom wall apertures 320 when the multiple use vehicle accessory 300 is attached to the vehicle 12 for use as a trailer or other transporting or connecting device. A pin or pins (not shown) can be located in and attached to the other ones of the bottom wall apertures 320 for use in contacting the vehicle 12 when the multiple use vehicle accessory 300 is put into pivotal engagement with another multiple use vehicle accessory 300 and used as a lever to lift the vehicle 12. Here, the pins allow for a more advantageous engagement with the vehicle 12 and thus facilitate lifting of the vehicle 12. Projections that surround two of the bottom wall apertures 320 are present on the bottom surface of the bottom wall 310. The projections afford additional surface space to which a pin or other member can be attached. Other uses of the bottom wall apertures 320 are possible in accordance with other exemplary embodiments.

The front side wall 312 defines a pair of front side wall apertures 322 therethrough. A pair of rear side wall apertures 324 are disposed through the rear side wall 314. The pair of front side wall apertures 322 may be aligned with the pair of rear side wall apertures 324. In one embodiment, the pair of apertures 322 and 324 are round holes that are coaxial with one another. Although disclosed as having front and rear side wall apertures 322 and 324, it is to be understood that these apertures 322 and 324 need not be present in other exemplary embodiments. Although shown as being planar surfaces, the front side wall 312 and the rear side wall 314 need not be planar in other embodiments. The front side wall 312 has a pair of ears between which a first cut-out section 316 is disposed. The first cut-out section 316 is defined on the bottom by a linear edge that extends between the ears. In other arrangements, the portion of the front side wall 312 between the ears need not be a linear edge but may still be located below the pair of ears. The rear side wall 314 may be arranged in manners similar to those previously discussed with respect to the front side wall 312. Further, the ears of the rear side wall 314 may be located the same distance apart from one another as the ears of the front side wall 312 or may be located a greater distance apart from one another than the ears of the front side wall 312. The front side wall 312 and rear side wall 314 may be integrally formed so that the center portion between the ears is a single piece. In other exemplary embodiments, the ears and/or center portion of the front side wall 312 and/or the rear side wall 314 are not integrally formed with one another.

The first end 304 may be provided with reinforcing members 400 and 402 that function to strengthen the first end 304. The reinforcing members 400 and 402 can be rods that are attached to both the bottom wall 310 and the front side wall 312.

The second end 306 may be cylindrically shaped in accordance with one exemplary embodiment. The second end 306 can define a through bore 326 that extends completely through the second end 306. The second end 306 can be variously configured in other embodiments. For example, the second end 306 can have a square cross-section or may be a solid cylinder without the bore 326 in yet other embodiments. The second end 306 and the first end 304 are configured differently from one another in accordance with certain exemplary embodiments. The diameter of the cylinder of the second end 306 may be less than the width of the channel 308. In this regard, the outer diameter of the cylinder of the second end 306 may be less than the distance between the front side wall 312 and the rear side wall 314.

The frame 302 that carries both the first end 304 and the second end 306 can be provided with a first member 328 and a second member 330. Both the first member 328 and the second member 330 may extend in the longitudinal direction 342 such that the members 328 and 330 are longer in the longitudinal direction 342 than the lateral direction 346. A series of cross-members 332 may extend in the lateral direction 346 and can extend generally across the lateral length of the first member 328 and the second member 330. The first member 328 can include a cylinder 354 and a cylinder 356. The cylinders 354 and 356 can be spaced from one another in the lateral direction 346 and can be parallel to one another in the longitudinal direction 342. The second member 330 may include cylinders 358 and 360 that are likewise spaced from one another in the lateral direction 346 and are parallel to one another in the longitudinal direction 342. The cross-members 332 can be attached to both the first member 328 and the second member 330. However, it is to be understood chat the cross-members 332 need not be attached to both the first member 328 and second member 330 in certain embodiments. Further, although described as cylinders 354, 356, 358 and 360, it is to be understood that these components can be variously configured in other embodiments. The first member 328 may have a shorter length in the lateral direction 346 than the second member 330.

A first end support 334 extends from the cylinder 356 of the first member 328 to the first end 304. A second end support 336 extends from cylinder 354 of the first member 328 to the first end 304. The end supports 334 and 336 function to attach the first member 328 of the frame 302 to the first end 304. Third and fourth end supports 338 and 340 extend from cylinders 356 and 354 of the first member 328 to the second end 306 to attach the second end 306 to the first member 328. The end supports 334, 336, 338 and 340 extend in both the longitudinal direction 342 and the height direction 350 of the multiple use vehicle accessory 300. A pair of inboard members 410 and 412 can be provided in order to connect the first end 304 to the cylinders 358 and 360 of the second member 330. The inboard members 410 and 412 may extend in both the longitudinal direction 342 and the lateral direction 346. The inboard members 410 and 412 need not extend in the height direction 350 in certain exemplary embodiments.

The first member 328 may lie in a first plane 404 and the second member 330 may lie in a second plane 406. The first plane 404 and second plane 406 can be parallel to and offset from one another a distance in the height direction 350. The channel 308 can be arranged so that the front side wall 312 and the rear side wall 314 extend upwards from the bottom wall 310 in a direction from the second plane 406 towards the first plane 404. Although described as being in a first plane 404 and second plane 406, it is to be understood that the first member 328 and second member 330 need not lie in planes in accordance with other exemplary embodiments. The multiple use vehicle accessory 300 may be symmetrical about the longitudinal axis 344 and can be asymmetrical about the lateral axis 348.

A series of projecting mounting members can be included in order to provide a way of attaching the multiple use vehicle accessory 300 to other accessory units or other objects. A first projecting mounting member 362 is present and has an aperture 354 that is located at a height that is between the first member 328 and the second member 330. Another aperture 366 is present through the first projecting mounting member 362 and is located at a height that is beyond both the first member 328 and the second member 330. A second projecting mounting member 368 is included and is offset a distance from the first projecting mounting member 362 in the lateral direction 346. The second projecting mounting member 368 defines an aperture 370 therethrough that is aligned with aperture 364. Aperture 370 is thus likewise located at a height that is between the height of the first member 328 and the second member 330. Another aperture 372 is included and is aligned with the aperture 366.

A third projecting mounting member 374 is present and is spaced from the first projecting mounting member 362 in the longitudinal direction 342. The third projecting mounting member 362 has an aperture 376 that is located at a height between the first member 328 and the second member 330. The third projecting mounting member 374 also defines an aperture 378 that is located at a height that is beyond both the first member 328 and the second member 330. A fourth projecting mounting member 380 is present and has an aperture 382 defined therethrough that is aligned with aperture 376. Another aperture 384 is defined by the fourth projecting mounting member 380 and is aligned with aperture 378. The fourth projecting mounting member 380 is positioned at the same distance in the longitudinal direction 342 as the third projecting mounting member 374 and is spaced from the third projecting mounting member 374 in the lateral direction 346.

The cross-members 332 may include apertures 392 for use in attaching the multiple use vehicle accessory 300 to other units as previously discussed. Further, two of the cross-members 332 may be hollow such that a bore is defined completely through two of the cross-members 332. The hollow cross-members 332 may allow for the multiple use vehicle accessory 300 to be mounted onto a vehicle 12 for use as a brush guard or luggage rack. Further, the hollow cross-members 332 may allow for the mounting of fog lights, a bike rack, or other accessories onto the multiple use vehicle accessory 300.

FIG. 34 shows a first unit 394 and a second unit 396 in a nested arrangement with one another. The units 394 and 396 may be each configured the same as the multiple use vehicle accessory 300 described in FIGS. 29-33. In this regard, the first unit 394 may have a first unit first end 304 and the second unit 396 may have a second unit first end 304. The other components of the first and second units 394 and 396 may be configured accordingly and it is not necessary to explicitly describe these additional elements. The inboard arrangement of the first member 328 with respect to the second member 330 allows the second unit 396 to be placed on top of and hence nested with the first unit 394. Placement of the first and second units 394 and 396 into a nested configuration causes aperture 366 of the first unit 394 to be aligned with aperture 364 of the second unit 396. A pin or other fastening member can be disposed through the aligned apertures 366 and 364 in order to lock the first and second units 394 and 396 in the nested position. Other apertures of the projecting mounting members can also be aligned with one another in the nested position. In this regard, aperture 372 of the first unit 394 is aligned with aperture 370 of the second unit 396. Aperture 378 of the first unit 394 is aligned with aperture 376 of the second unit 396, and aperture 384 of the first unit 394 is aligned with aperture 382 of the second unit 396. The various apertures can have pins disposed therethough in order to lock the first unit 394 and the second unit 396 together in the nested configuration.

The nested first and second units 394 and 396 can be mounted onto a vehicle 12 and used as a brush guard. In this regard, the hollow cross-members 332 of the first unit 394 can be slid onto male receiving members of the vehicle 12 so that the nested units 394 and 396 can be arranged as a brush guard of the vehicle 12. Additional units may be further nested onto the first and second units 394 and 396 in order to increase the width of the brush guard. The nested units 394 and 396 can also be used as a luggage rack, bike rack, roof rack, or side rack of the vehicle 12. Further, the use of nested units 394 and 396 may afford space savings in transport or storage of the multiple use vehicle accessory 300.

The first and second units 394 and 396 can be attached to one another in a different manner as illustrated in FIG. 35. Here, the second end 306 of the first unit 394 is located in the channel 308 of the second unit 396. A pin 408 is disposed through aligned front side wall aperture 322 and rear side wall aperture 324 of the second unit 396. A second pin 408 is disposed through the other aligned front side wall aperture 322 and rear side wall aperture 324 of the second unit 396. The second end 306 of the first unit 394 is thus retained in the channel 308 of the second unit 396 so that the attached units 394 and 396 can lay in line with one another to provide a longer surface over which a vehicle 12 may traverse in order to become dislodged when stuck. Further, the cylindrical shape of the second end 306 allows the first unit 394 to be both retained and rotated within the channel 308 so that the first unit 394 can be angled upwards with respect to the second unit 396 when using the attached units 394, 396 as a ladder, winch or lever.

Figure 36:
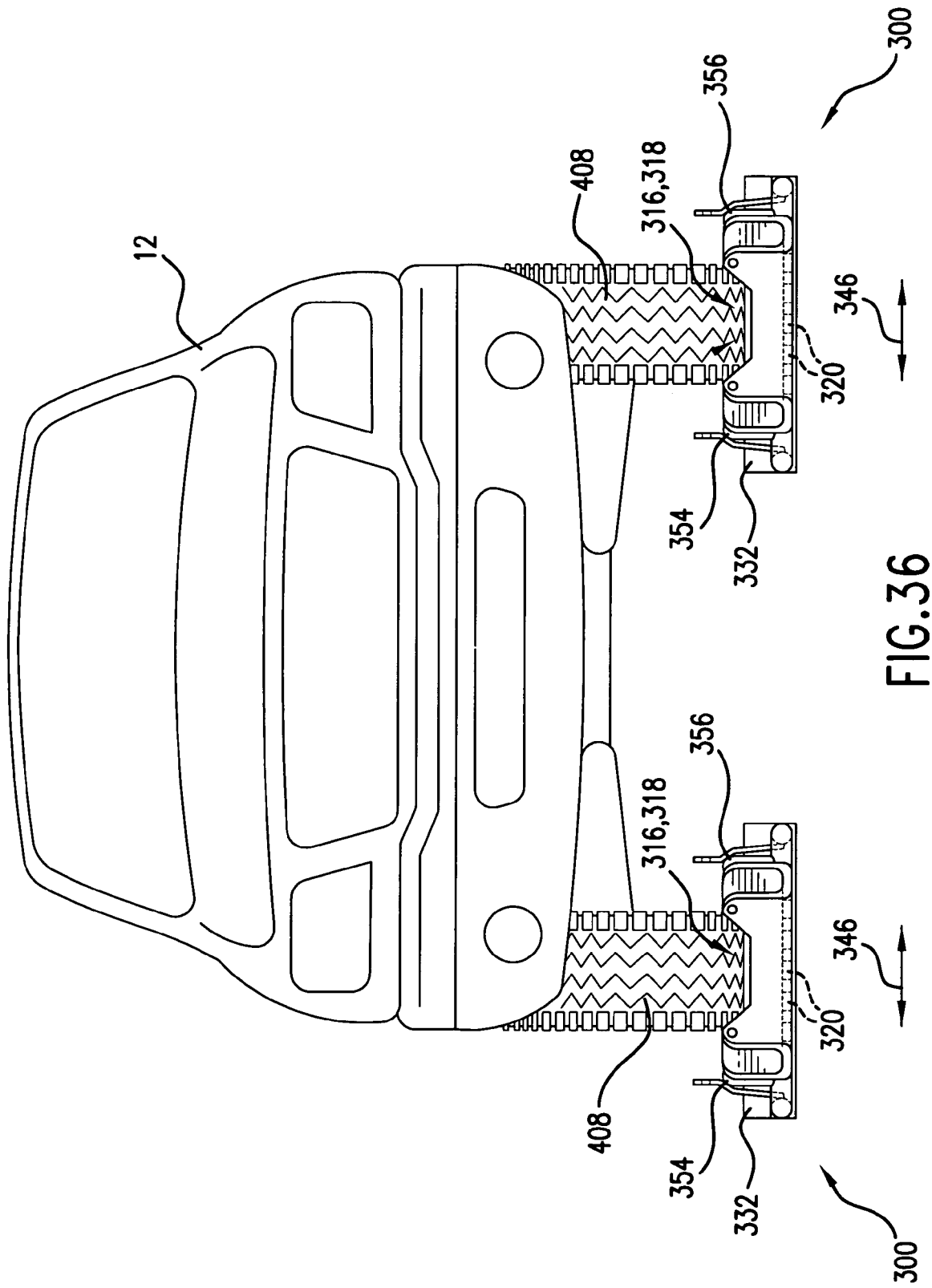
FIG. 36 is a front view of a pair of multiple use vehicle accessories configured as the embodiment of FIG. 29 traversed by a pair of tires of a vehicle.

FIG. 36 illustrates a pair of multiple use vehicle accessories 300 lying next to and spaced a distance from one another. The multiple use vehicle accessories 300 can be driven over by a vehicle 12 when traversing a cliff, hole or other obstacle. A tire 408 of the vehicle 12 can be positioned over the multiple use vehicle accessory 300 and can engage the first cut-out section 316. The first cut-out section 316 can have a shape and size suitable for accommodating the size of the tire 408. The front side wall 312 receives the tire 408 so that the sides of the tire 408 contact the ears of the front side wall 312 while the crown of the tire is received within the first cut-out section 316 and engages the center portion of the front side wall 312 that extends between the ears of the front side wall 312. The tire 408 may include cleats in certain exemplary embodiments that extend from the side walls of the tire 408 and function to engage the ears of the front side wall 312 so as to increase traction. The tire 408 can then be moved into the second cut-out section 318. The second cut-out section 318 can be sized and shaped the same as the first cut-out section 316 or may be deeper and wider than the first cut-out section 318 in accordance with other exemplary embodiments. In this regard, the ears of the second cut-out section 318 may be spaced farther apart from one another than those of the first cut-out section 316. The side walls of the tire 408 may again engages the ears of the second cut-out section 318 and the crown of the tire 408 may be disposed within the second cut-out section 318 and engage the portion of the rear side wall 314 that extends between the ears of the rear side wall 314. Further, the second cut-out section 318 may be narrower and shallower than the first cut-out section 316 in other arrangements. The tire 408 can then be positioned over the various cross-members 332 of the multiple use vehicle accessory 300. In certain embodiments, the width of the portion of the tire 408 contacting the accessory 300 is less than the spacing of cylinders 354 and 356 of the first member 328 in the lateral direction 346. When the multiple use vehicle accessory 300 is traversed by a vehicle 12, the bottom wall apertures 320 may function to provide gripping to the ground to allow for additional traction to the accessory 300.

Figure 37:
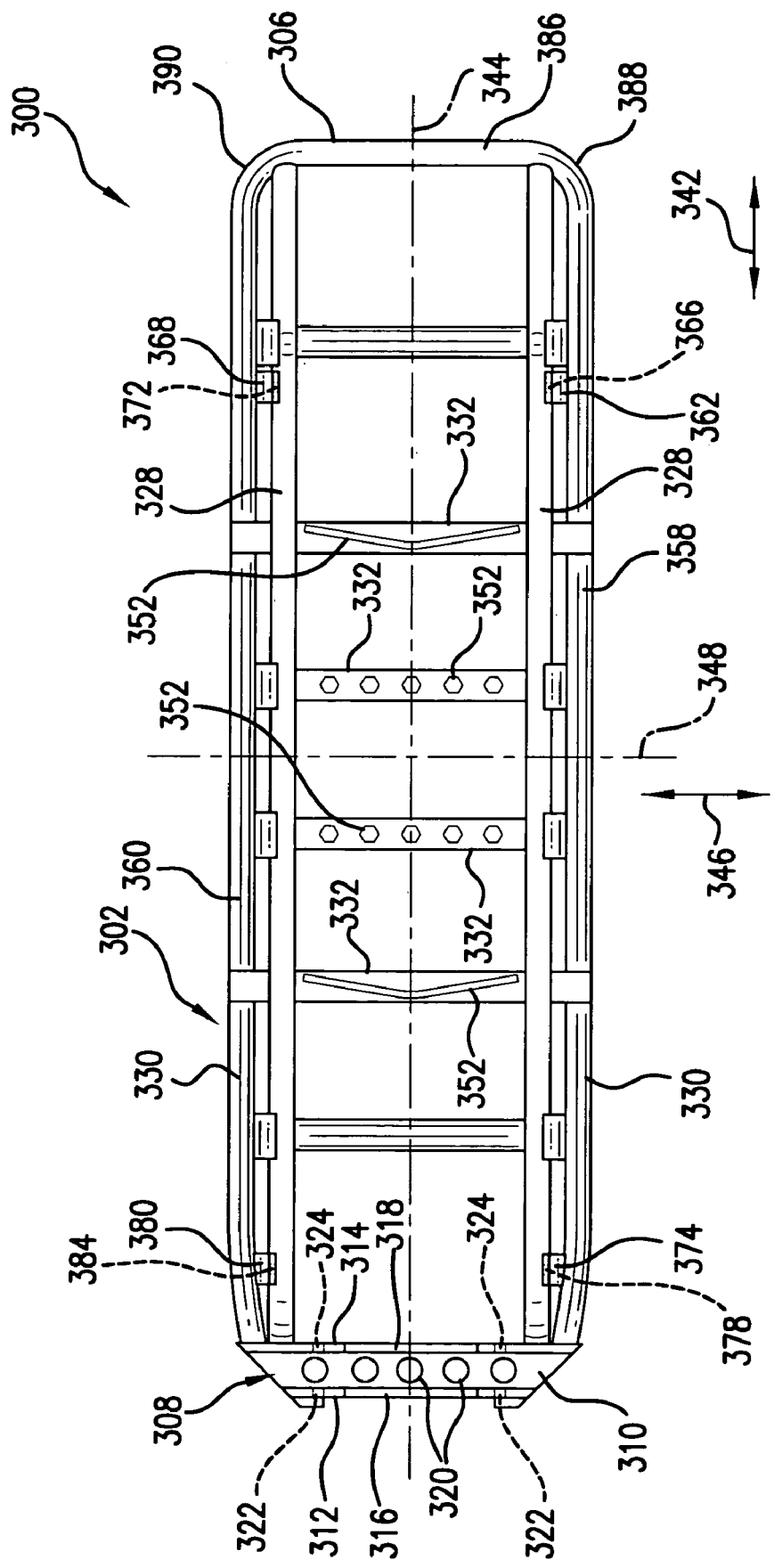
FIG. 37 is a top view of a multiple use vehicle accessory in accordance with another exemplary embodiment.

An alternative exemplary embodiment of the multiple use vehicle accessory 300 is shown in FIG. 37. Here, the second end 306 is arranged differently than the second end 306 of the embodiment illustrated in FIGS. 29-33. The second end 306 has a laterally extending member 386 that extends in the lateral direction 346. A pair of inboard members 388 and 390 are also included in the second end 306 that extend in both the longitudinal direction 342 and the lateral direction 346. The inboard members 388 and 390 are located at the ends of the cylinders 358 and 360 of the second member 330. A series of traction elements 352 such as nuts, rods or mesh wire can be welded or otherwise attached to the cross-members 332 to provide additional traction to the tire 408 when the vehicle 12 traverses the multiple use vehicle accessory 300.

Another exemplary embodiment of the multiple use vehicle accessory 500 is shown in FIGS. 38 and 39. The multiple use vehicle accessory 500 has a frame 502 that includes a first side member 536 and a second side member 538. The frame 502 has a longitudinal axis 544 and a lateral axis 548 and is longer in the longitudinal direction 542 than in the lateral direction 546. In this regard, the side members 536 and 538 may be longer in the longitudinal direction 542 than in the lateral direction 546. However, it is to be understood that other arrangements are possible in which the frame 502 is the same or longer in the lateral direction 546 than in the longitudinal direction 542. A plurality of cross members 532 extend in the lateral direction 546 and may be connected to both of the side members 536 and 538. Although shown as being angled in shape, the cross members 532 need not all be shaped the same way and may be variously shaped such as square, rectangular, triangular, channel shaped or cylindrically shaped in other embodiments. The lateral axis 548 and the longitudinal axis 544 may extend through the center of the frame 502 with respect to the outer most portions of the first end 504, second end 506, first side member 536, and second side member 538.

The frame 502 may also include a first end 504 that features a channel 508 that can be used as described previously in accordance with other exemplary embodiments. The first end 504 may include a bottom wall 510, front side wall 512, and rear side wall 514 that define the channel 508 and may be provided so that they do not have any apertures therethrough and have edges perpendicular to the lateral axis 548 and to the longitudinal axis 544. In other arrangements, one or more apertures may be disposed through one or more of the walls 510, 512, and 514. A second end 506 may be disposed on a side of the frame 502 opposite the first end 504 and may have a width in the longitudinal direction 542 that is less than the width of the channel 508 as discussed in previous exemplary embodiments. In other arrangements, the width of the second end 506 in the longitudinal direction 542 may be the same as or longer than the width of the channel 508 in the longitudinal direction 542 such that identical accessories 500 are not capable of being attached to one another using these parts as previously discussed. In other embodiments, the front side wall 512 can have notches or 45° cut outs at opposite ends in the lateral direction 546 so that the first and second side members 536 and 538 can be accommodated when two units 500 are attached to one another using the channel 508 and second end 506. The second end 506 can be cylindrical in shape and may have a bore 526 extending through its length in the lateral direction 546 in certain embodiments. The second end 506 can be variously shaped in other exemplary embodiments.

The frame 502 can include a first attachment member 592 that may be attached to the side of the first side member 536 that faces the longitudinal axis 544. The first attachment member 592 may extend in the lateral direction 546 and can be integrally formed or subsequently attached to the first side member 536. A first aperture 594 may be disposed through the first side member 536 and the first attachment member 592. In this regard, the first aperture 594 may extend completely through the first attachment member 592 or may extend into only a portion of the first attachment member 592. A pin aperture 596 may extend into the first attachment member 592 at a direction perpendicular to the direction of orientation of the first aperture 594. A second attachment member 604 can also be included and may be attached to the first side member 536. A second aperture 606 can extend through the first side member 536 and may extend completely through or partially through the second attachment member 604. A pin aperture 608 may be defined in the second attachment member 604 and can be arranged as previously discussed with respect to the pin aperture 596. The apertures 594 and 606 may be spaced an equal distance from the lateral axis 548 or may be spaced at different distances therefrom. The apertures 594 and 606 may be used as previously discussed in accordance with other exemplary embodiments in the same manner as the mounting apertures 204 and a repeat of this information is not necessary. The pin apertures 596 and 608 may receive pins therethrough that are used to help secure the frame 502 to the member or members disposed within the first and second apertures 594 and 606.

Although shown as extending through the first side member 536, the first and second apertures 594 and 606 need not extend through the first side member 536 in other embodiments. For example, the first and second attachment members 592 and 604 may be both located above or both located below the first side member 536 in the height direction 550 of the frame 502. The first and second attachment members 592 and 604 may be attached to the first side member 536 and can be located at the extreme outer edge of the frame 502 in the lateral direction 546.

The first and second attachment members 592 and 604 are shown attached to different cross members 532 that are angular in configuration. In other embodiments, the attachment members 592 and 604 need not contact the cross members 532. The first and second attachment members 592 and 604 may be integrally formed with the cross members 532 or can be separate components that are attached thereto. The attachment members 592 and 604 may form part of the cross members 532 in certain embodiments. Although shown as being distinct components, the attachment members 592 and 604 can be defined as being a part of the first side member 536 and/or cross members 532 in other embodiments and need not be distinct components.

Frame 502 may include a third attachment member 598 and a fourth attachment member 614 that are attached to a side of the second side member 538 that faces the longitudinal axis 544. A third aperture 600 is defined through the second side member 538 and into or through the third attachment member 598, and a fourth aperture 616 extends through the second side member 538 and the fourth attachment member 614. Pin aperture 602 is defined in the third attachment member 598, and pin aperture 618 is defined in the fourth attachment member 614. The various elements, 598, 600, 602, 614, 616, 618 may be arranged as previously discussed with respect to elements 204, 592, 594, 596, 604, 606 and 608 and need not be repeated. The first aperture 594 may be aligned with the third aperture 600 in the longitudinal direction 542, and the second aperture 606 may be aligned with the fourth aperture 616 in the longitudinal direction 542. The various apertures 594, 600, 606 and 616 may be identically shaped and configured or may be shaped or configured differently in other exemplary embodiments.

The first and second side members 536 and 538 may have cross sectional shapes that are channel shaped in which the open channel portions face away from one another and the longitudinal axis 544. In another version, the channel portions of the first and second side members 536 and 538 may face one another and the longitudinal axis 544. The first and second side members 536 and 538 need not have a cross sectional shape in the form of a channel but may be variously configured in other exemplary embodiments. The frame 502 can be arranged so that the first and second side members 536 and 538 extend to the vertically highest and vertically lowest portions of the multiple purpose vehicle accessory 500 in the height direction 550. Vertically highest and vertically lowest may be defined as at the top and bottom of the frame 502 in the height direction 550 as shown in FIG. 39 when the accessory 500 is oriented in this type of position. The first and second side members 536 and 538 may each be a single component. The first and second side members 536 and 538 may also have a single consistent height in the height direction 550 that extends along the entire length of the first and second side members 536 and 538 in the longitudinal direction 542. In the arrangement shown, the frame 502 does not have a second member as described in previous embodiments and is arranged so that the side members 536 and 538 and the ends 504 and 506 are in a single plane.

Figure 40:
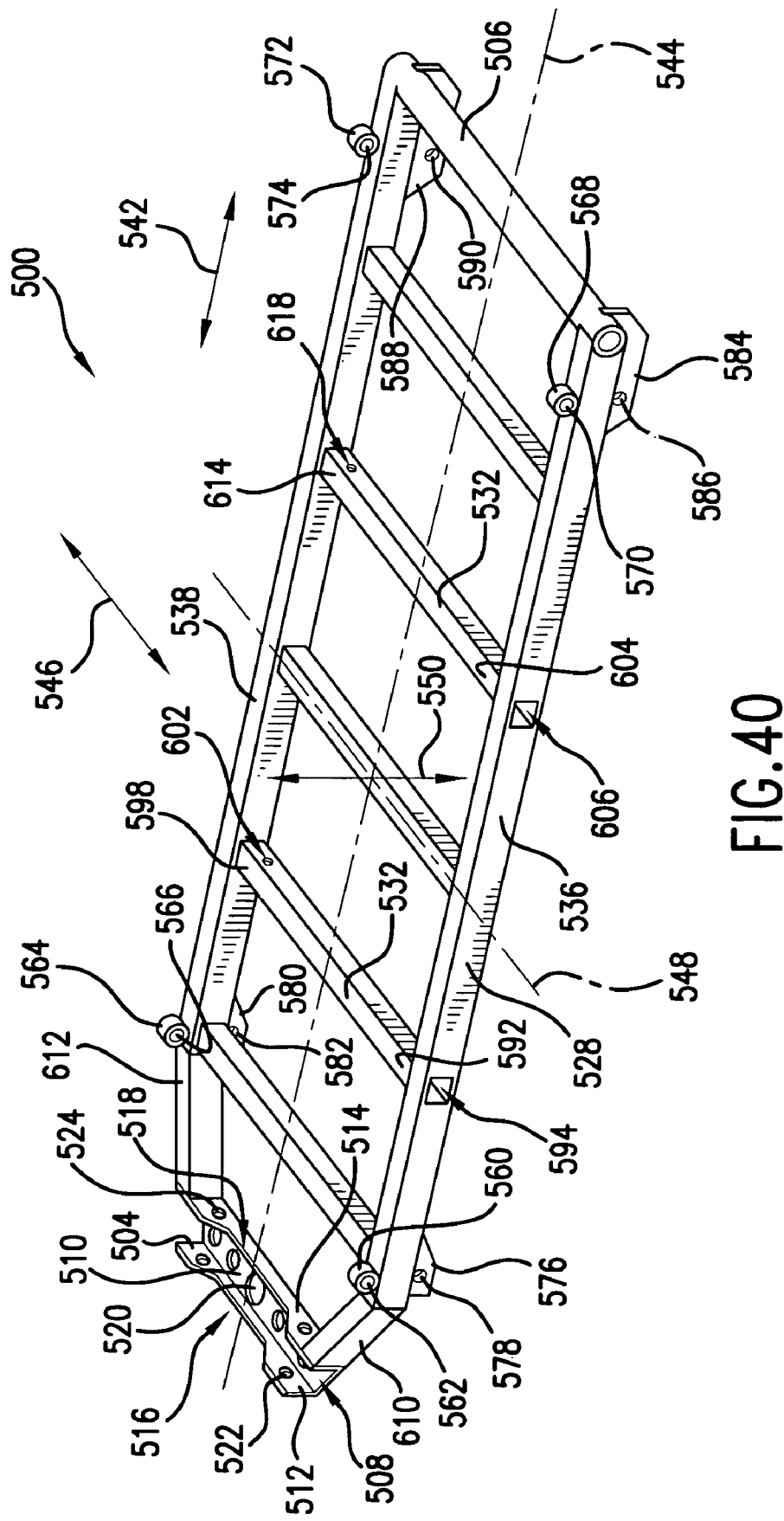
FIG. 40 is a perspective view of a multiple use vehicle accessory in accordance with another exemplary embodiment.

Another exemplary embodiment of the multiple use vehicle accessory 500 is illustrated in FIG. 40 and includes features that are similar to those previously discussed with the embodiment in FIGS. 38 and 39 and those discussed in earlier embodiments and their description need not be repeated. The first end 504 is different than the first end 504 of the embodiment in FIGS. 38 and 39 in that cut out sections 516 and 518 are formed in the front and rear side walls 512 and 514. Further, bottom wall apertures 520, front side wall apertures 522, and rear side wall apertures 524 are present. The aforementioned features have been previously discussed in accordance with earlier exemplary embodiments and their description need not be repeated. Also included are first, second, third, and fourth attachment members 592, 604, 598 and 614 that define first, second, third, and fourth apertures 594, 606, 600, and 616 that also extend through the first side member 536 and the second side member 538. The attachment members 592, 604, 598 and 614 are integrally formed with the cross members 532 and have an outer surfaces that have the same shape and size therewith. In effect, the cross members 532 may be thought of as including the attachment members 592, 604, 598 and 614. The apertures 594, 606, 600, and 616 and the cross members 532 are square shaped in the illustrated embodiment but may be rectangular shaped or variously configured as previously discussed.

The frame 502 includes a first projecting mounting member 560 that defines an aperture 562, and a second projecting mounting member 576 that defines aperture 578. The first projecting mounting member 560 is located above the first side member 536 in the height direction 550, and the second projecting mounting member 576 is located below the first side member 536 in the height direction 550. The projecting mounting members 560 and 576 may contact the first side member 536, or one or both of these components can contact the inboard member 610 of the first end 504. The frame 502 may also include a fifth projecting mounting member 568 that defines an aperture 570, and a sixth projecting mounting member 584 that defines aperture 586 that both contact the first side member 536. In certain exemplary embodiments, the sixth projecting mounting member 584 may also contact the second end 506. The aforementioned apertures 562, 578, 570, and 586 may be arranged so that they are on opposite sides of the first and second apertures 594 and 606 in the longitudinal direction 542. In this regard, the apertures 594 and 606 are both closer to the lateral axis 548 in the longitudinal direction 542 than the apertures 562, 578, 570, and 586 in the longitudinal direction 542.

The frame 502 also includes a third projecting mounting member 564 that defines an aperture 566, and a fourth projecting mounting member 580 that defines aperture 582. The third and fourth projecting mounting members 564 and 580 are located above and below respectively the second side member 538 and contact the second side member 538. In other arrangements, both or one of the members 564 and 580 may contact the inboard member 612 of the first end 504. Also included in the frame 502 are a seventh projecting mounting member 572 defining aperture 574, and an eighth projecting mounting member 588 that defines aperture 590. Projecting mounting members 572 and 588 contact the second side member 538. The eighth projecting mounting member 588 may also contact the second end 506 in certain embodiments. The seventh projecting mounting member 572 is located vertically above the second side member 538 in the height direction 550, and the eighth projecting mounting member 588 is located vertically below the second side member 538 in the height direction 550. The third and fourth apertures 600 and 616 are each closer to the lateral axis 548 in the longitudinal direction 542 than the apertures 566, 582, 574 and 590 in the longitudinal direction 542.

The apertures are arranged so that apertures 562 aid 566 are aligned with one another in the longitudinal direction 542. Also aligned in the longitudinal direction 542 are apertures 578 and 582, apertures 586 and 590, and apertures 570 and 574. The various projecting mounting members and apertures may be used and configured as previously described with respect to earlier exemplary embodiments during use and attachment of the multiple use vehicle accessory 500 and their features and descriptions need not be repeated.

The projecting mounting members 560, 568, 564 and 572 may be located at the uppermost vertical height of the frame 502 in the height direction 550 so that no other components of the accessory 500, such as the first side member 536, second side member 538, first end 504 or second end 506 are located at the same height or higher than the projecting mounting members 560, 568, 564 and 572. In a similar manner, the projecting mounting members 576, 580, 584, and 588 may be located at the lowest portion of the frame 502 so that no other portion of the accessory 500 is located below the projecting mounting members 576, 580, 584, and 588 in the height direction 550. The first and second side members 536 and 538 may be single members that have a single consistent height that extends in the height direction 550 and that extends along the entire length of the members 536 and 538 in the longitudinal direction 542. In this regard, the first and second side members 536 and 538 in addition to the first end 504 and second end 506 lie in a single plane of the frame 502.

The apertures 578, 562, 566, 582, 586, 570, 574, and 590 are all oriented in the lateral direction 546. The first and second side members 536 and 538 may have rectangular cross sectional shapes. In other arrangements, the members 536 and 538 are channel in cross sectional shape and arranged so that the channel portions face one another and the longitudinal axis 544. In yet other arrangements, the channel shaped members 536 and 538 face away from one another and the longitudinal axis 544.

Although described as having certain uses, it is to be understood that the exemplary embodiments disclosed in FIGS. 29-33 and 37-40 can be arranged and used and interactively attached with one another in a variety of manners as disclosed previously herein in accordance with other exemplary embodiments. Further, it is to be understood that the vehicle 12 may be variously configured in accordance with different exemplary embodiments. For example, the vehicle 12 may be a truck, a car, a tractor, an All-Terrain Vehicle (ATV), an amphibious vehicle, a golf cart, a 4×4 truck, an SUV, an MRAP, a tank, a toy vehicle or a motorized toy vehicle in accordance with various exemplary embodiments. As such, the vehicle 12 may simply be an object capable of motion whether self-propelled or otherwise.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A multiple use vehicle accessory configured for attachment to a vehicle, comprising:
   a frame that includes a first side member and a second side member wherein the first side member is spaced from the second side member in a lateral direction of the multiple use vehicle accessory, wherein the first side member carries a first aperture and a second aperture, wherein the first aperture is spaced from the second aperture in a longitudinal direction of the multiple use vehicle accessory, wherein the first aperture and the second aperture are both oriented in the lateral direction, wherein the frame includes a plurality of cross members that extend in the lateral direction from the first side member to the second side member and engage both the first side member and the second side member, wherein the frame includes a first end that engages both the first side member and the second side member and extends from the first side member to the second side member, wherein the first end at least partially defines a channel that extends in the lateral direction, wherein a portion of the channel is located an equal distance in the lateral direction from the lateral position of the first side member and the lateral position of the second side member, wherein the frame includes a second end that engages both the first side member and the second side member and extends from the first side member to the second side member, wherein the channel is open in a height direction of the multiple use vehicle accessory, wherein the height direction is perpendicular to both the longitudinal direction and the lateral direction.

2. The multiple use vehicle accessory as set forth in claim 1, wherein the length of the second end in the longitudinal direction is less than the length of the channel in the longitudinal direction.

3. The multiple use vehicle accessory as set forth in claim 1, wherein the second side member carries a third aperture and a fourth aperture, wherein the third aperture is spaced from the fourth aperture in the longitudinal direction, wherein the third aperture and the fourth aperture are both oriented in the lateral direction, wherein the first aperture is aligned with the third aperture in the longitudinal direction, and wherein the second aperture is aligned with the fourth aperture in the longitudinal direction.

4. The multiple use vehicle accessory as set forth in claim 1, wherein the first aperture extends through the first side member, and wherein the second aperture extends through the first side member.

5. The multiple use vehicle accessory as set forth in claim 4, wherein the first aperture extends into a first attachment member, wherein the second aperture extends into a second attachment member, wherein the first attachment member and the second attachment member are both attached to the first side member and are located on a side of the first side member that faces a longitudinal axis of the multiple use vehicle accessory.

6. The multiple use vehicle accessory as set forth in claim 5, wherein the second side member carries a third aperture and a fourth aperture that both extend through the second side member, wherein the third aperture extends into a third attachment member, wherein the fourth aperture extends into a fourth attachment member, wherein the third attachment member and the fourth attachment member are both attached to the second side member and are located on a side of the second side member that faces the longitudinal axis of the multiple use vehicle accessory, wherein the third aperture is spaced from the fourth aperture in the longitudinal direction, wherein the third aperture and the fourth aperture are both oriented in the lateral direction, wherein the first aperture is aligned with the third aperture in the longitudinal direction, and wherein the second aperture is aligned with the fourth aperture in the longitudinal direction.

7. The multiple use vehicle accessory as set forth in claim 6, wherein the first attachment member and the third attachment member are both attached to a common cross member, and wherein the second attachment member and the fourth attachment member are both attached to a common cross member.

8. The multiple use vehicle accessory as set forth in claim 1, further comprising a first attachment member and a second attachment member that are both attached to the first side member, wherein the first attachment member defines the first aperture, and wherein the second attachment member defines the second aperture.

9. The multiple use vehicle accessory as set forth in claim 8, wherein the first attachment member and the second attachment member are located below the first side member in a height direction of the multiple use vehicle accessory, further comprising a third attachment member and a fourth attachment member that are both attached to the second side member, wherein the third attachment member defines a third aperture, and wherein the fourth attachment member defines a fourth aperture, wherein the third attachment member and the fourth attachment member are located below the second side member in the height direction, wherein the first aperture is aligned with the third aperture in the longitudinal direction, and wherein the second aperture is aligned with the fourth aperture in the longitudinal direction, and wherein the first attachment member, the second attachment member, the third attachment member, and the fourth attachment member are below the first end, the second end, the first side member, the second side member, and the cross members in the height direction.

10. A multiple use vehicle accessory configured for attachment to a vehicle, comprising:
a frame that includes a first side member and a second side member wherein the first side member is spaced from the second side member in a lateral direction of the multiple use vehicle accessory, wherein the first side member carries a first aperture and a second aperture, wherein the first aperture is spaced from the second aperture in a longitudinal direction of the multiple use vehicle accessory, wherein the first aperture and the second aperture are both oriented in the lateral direction, wherein the frame includes a plurality of cross members that extend in the lateral direction, wherein the frame includes a first end that is attached to both the first side member and the second side member, wherein the first end at least partially defines a channel that extends in the lateral direction;
wherein the first side member is a single member and has a single consistent height in a height direction of the multiple use vehicle accessory along the entire longitudinal length of the first side member, wherein the second side member is a single member and has a single consistent height in the height direction of the multiple use vehicle accessory along the entire longitudinal length of the second side member.

11. A multiple use vehicle accessory, comprising:
a frame that includes a first side member and a second side member wherein the first side member is spaced from the second side member in the lateral direction, wherein the frame includes a plurality of cross members that extend in the lateral direction from the first side member to the second side member and engage both the first side member and the second side member, wherein the frame includes a first end that engages both the first side member and the second side member and extends from the first side member to the second side member, wherein the first end at least partially defines a channel that extends in the lateral direction, wherein the frame includes a first projecting mounting member that is located at a height that is vertically above the first side member in a height direction of the multiple use vehicle accessory, wherein the first projecting mounting member defines an aperture that extends in the lateral direction, wherein the frame includes a second projecting mounting member that is located at a height that is vertically below the first side member in the height direction, wherein the second projecting mounting member defines an aperture that extends in the lateral direction, wherein a portion of the channel is located an equal distance in the lateral direction from the lateral position of the first side member and the lateral position of the second side member, wherein the channel is open in the height direction, wherein the height direction is perpendicular to both the lateral direction and a longitudinal direction of the multiple use vehicle accessory.

12. The multiple use vehicle accessory as set forth in claim 11, wherein the first projecting mounting member contacts the first side member, and wherein the second projecting mounting member contacts the first side member.

13. The multiple use vehicle accessory as set forth in claim 11, wherein the frame includes a third projecting mounting member that is located at a height that is vertically above the second side member in the height direction, wherein the third projecting mounting member defines an aperture that extends in the lateral direction, wherein the frame includes a fourth projecting mounting member that is located at a height that is vertically below the second side member in the height direction, wherein the fourth projecting mounting member defines an aperture that extends in the lateral direction, wherein the apertures of the first and third projecting mounting members are aligned with one another in the longitudinal direction, and wherein the apertures of the second and fourth projecting mounting members are aligned with one another in the longitudinal direction.

14. The multiple use vehicle accessory as set forth in claim 13, wherein the frame includes a fifth projecting mounting member that is located at a height that is vertically above the first side member in the height direction, wherein the fifth projecting mounting member defines an aperture that extends in the lateral direction, wherein the frame includes a sixth projecting mounting member that is located at a height that is vertically below the first side member in the height direction, wherein the sixth projecting mounting member defines an aperture that extends in the lateral direction, wherein the frame includes a seventh projecting mounting member that is located at a height that is vertically above the second side member in the height direction, wherein the seventh projecting mounting member defines an aperture that extends in the lateral direction, wherein the frame includes an eighth projecting mounting member that is located at a height that is vertically below the second side member in the height direction, wherein the eighth projecting mounting member defines an aperture that extends in the lateral direction, wherein the apertures of the fifth and seventh projecting mounting members are aligned with one another in the longitudinal direction, and wherein the apertures of the sixth and eighth projecting mounting members are aligned with one another in the longitudinal direction.

15. A multiple use vehicle accessory as set forth in claim 14, wherein the first side member carries a first aperture and a second aperture that both extend through the first side member, wherein the first aperture is spaced from the second aperture in the longitudinal direction, wherein the first aperture and the second aperture are both oriented in the lateral direction, wherein the locations of the first aperture and the second aperture in the longitudinal direction are both between the locations of the aperture of the first projecting mounting member and the aperture of the fifth projecting mounting member in the longitudinal direction.

16. The multiple use vehicle accessory as set forth in claim 11, wherein the first side member carries a first aperture and a second aperture, wherein the second side member carries a third aperture and a fourth aperture, wherein the first, second, third and fourth apertures are all oriented in the lateral direction, wherein the first and third apertures are aligned with one another in the longitudinal direction, wherein the second and fourth apertures are aligned with one another in the longitudinal direction, and wherein the first, second, third and fourth apertures are all located closer to a lateral axis of the multiple use vehicle accessory in the longitudinal direction than the apertures of the first and second projecting mounting members in the longitudinal direction.

17. The multiple use vehicle accessory as set forth in claim 16, wherein one of the cross members includes a first attachment member that defines a portion of the first aperture and a third attachment member that defines a portion of the third aperture, wherein another one of the cross members includes a second attachment member that defines a portion of the second aperture and a fourth attachment member that defines a portion of the fourth aperture, wherein the plurality of cross members have a cross sectional shape that is selected from the group consisting of rectangular, square, circular, channel and angle.

18. The multiple use vehicle accessory as set forth in claim 11, wherein the first side member is a single member and has a single consistent height in a height direction of the multiple use vehicle accessory along the entire longitudinal length of the first side member, wherein the second side member is a single member and has a single consistent height in the height direction of the multiple use vehicle accessory along the entire longitudinal length of the second side member, wherein the first projecting mounting member is located at the highest point of the multiple use vehicle accessory in the height direction, and wherein the second projecting mounting member is located at the lowest point of the multiple use vehicle accessory in the height direction.

19. The multiple use vehicle accessory as set forth in claim 11 wherein the first side member has cross sectional shape in the form of a channel, wherein the second side member has a cross sectional shape in the form of a channel, and wherein the open portions of the channels of the first side member and the second side member face one another.

20. A multiple use vehicle accessory, comprising:
a frame that is longer in a longitudinal direction of the multiple use vehicle accessory than in a lateral direction of the multiple use vehicle accessory that includes a first side member and a second side member wherein the first side member is spaced from the second side member in the lateral direction, wherein the frame includes a plurality of cross members that extend in the lateral direction, wherein the frame includes a first end that is attached to both the first side member and the second side member and at least partially defines a channel that extends in the lateral direction, wherein the frame includes first and second projecting mounting members that are connected to the first side member and that each define an aperture that is oriented in the lateral direction, wherein the first projecting mounting member is located at the highest point of the multiple use vehicle accessory in the height direction, and where the second projecting mounting member is located at the lowest point of the multiple use vehicle accessory in the height direction.

* * * * *